United States Patent
Pyers et al.

(10) Patent No.: US 8,364,857 B2
(45) Date of Patent: Jan. 29, 2013

(54) WIRELESS MODEM WITH CPU AND AUXILIARY PROCESSOR THAT SHIFTS CONTROL BETWEEN PROCESSORS WHEN IN LOW POWER STATE WHILE MAINTAINING COMMUNICATION LINK TO WIRELESS NETWORK

(75) Inventors: James Pyers, San Diego, CA (US); George Wiley, San Diego, CA (US); James J. Willkie, Poway, CA (US); Brian Steele, Denver, CO (US); Apul Nahata, San Diego, CA (US); Karthik Raj Kaliannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 12/551,530

(22) Filed: Aug. 31, 2009

(65) Prior Publication Data

US 2011/0055434 A1    Mar. 3, 2011

(51) Int. Cl.
*G06F 3/00* (2006.01)
*G06F 12/00* (2006.01)

(52) U.S. Cl. .......... 710/14; 710/8; 710/9; 710/10; 710/15; 710/16; 710/17; 710/18; 710/19; 455/556; 455/556.2; 713/300; 713/323; 713/320

(58) Field of Classification Search .......... 713/300, 713/323, 320; 710/8–10, 14–19; 455/556.2, 455/556; 712/20
See application file for complete search history.

(56) References Cited

U.S. PATENT DOCUMENTS

| | | | | |
|---|---|---|---|---|
| 5,768,164 | A * | 6/1998 | Hollon, Jr. | 708/174 |
| 6,223,293 | B1 * | 4/2001 | Foster et al. | 713/300 |
| 6,240,521 | B1 * | 5/2001 | Barber et al. | 713/323 |
| 6,501,999 | B1 * | 12/2002 | Cai | 700/82 |
| 6,528,974 | B1 * | 3/2003 | Mirov et al. | 323/267 |
| 7,152,171 | B2 * | 12/2006 | Chandley et al. | 713/320 |
| 7,275,167 | B2 * | 9/2007 | Chandley et al. | 713/320 |
| 7,493,109 | B2 * | 2/2009 | Munje et al. | 455/418 |
| 7,664,996 | B2 * | 2/2010 | Matsuo et al. | 714/48 |
| 7,882,377 | B2 * | 2/2011 | Lagnado et al. | 713/320 |
| 7,898,500 | B2 * | 3/2011 | Fuller et al. | 345/1.1 |
| 2002/0173344 | A1 * | 11/2002 | Cupps et al. | 455/566 |
| 2004/0204050 | A1 * | 10/2004 | Krishnan et al. | 455/556.1 |
| 2005/0066209 | A1 * | 3/2005 | Kee et al. | 713/323 |
| 2006/0129861 | A1 * | 6/2006 | Kee et al. | 713/323 |
| 2006/0212733 | A1 | 9/2006 | Hamilton | |

(Continued)

OTHER PUBLICATIONS

"International Search Report and Written Opinion—PCT/US2010/047273, International Search Authority—European Patent Office—Dec. 16, 2010."

*Primary Examiner* — Tammara Peyton
(74) *Attorney, Agent, or Firm* — James T. Hagler

(57) ABSTRACT

A computing device includes a low power auxiliary processor, such as a processor on a wireless card or sub-system, which is able to takeover processing in place of the computing device's central processing unit (CPU). Operating the computing device on the auxiliary processor draws less power from the computing device battery, enabling extended operation in an auxiliary processor mode. When in this mode, the auxiliary processor controls peripherals and provides the system functionality while the CPU is deactivated, such as in "off," "standby" or "sleep" modes. In the auxiliary processor mode, the computing device can accomplish useful tasks, such as sending/receiving electronic mail, displaying electronic documents and accessing a network while drawing minimal power from the battery. Transitions between the normal operating mode and auxiliary processor mode may be transparent to users. Such a computer may display instant on, always on and always connected operating features.

99 Claims, 35 Drawing Sheets

U.S. PATENT DOCUMENTS

2007/0271475 A1 11/2007 Hatasaki et al.
2008/0288748 A1 11/2008 Sutardja et al.
2008/0305831 A1 12/2008 Krishnan et al.
2010/0111066 A1* 5/2010 Mehta ........................... 370/345

* cited by examiner

WIRELESS MODEM WITH CPU AND AUXILIARY PROCESSOR THAT SHIFTS CONTROL BETWEEN PROCESSORS WHEN IN LOW POWER STATE WHILE MAINTAINING COMMUNICATION LINK TO WIRELESS NETWORK

FIELD OF THE INVENTION

The present invention relates generally to personal computer systems, and more specifically to methods and devices for operating a computer under a low power auxiliary processor.

BACKGROUND

While personal computers have become essential tools for many people, they continue to suffer from a number of limitations. The development of lightweight notebook computers has released computer users from the confines of their desktop. However, notebook computers suffer from the problem of limited battery life. Notebook computer manufactures emphasizing portability have reduced component weight, which has limited the size and weight of the battery. At the same time, computer developers have increased the processing power of notebook computers to keep up with the complexity of operating systems and application programs. Increasing processing power has tended to limit battery life as more powerful processors consume more power, even in an idle mode. Users may attempt to extend the life of a single battery charge by turning off their computer or placing it in standby mode whenever they are not actively using the machine. However, most notebook computers require a noticeable amount of time to restart, even when recovering from standby mode. Thus, such efforts to extend battery life can lead to user frustration.

SUMMARY

The various embodiments provide a computing device (e.g., a notebook computer, netbook computer, UMPC, PDA, or desktop computer) with an auxiliary processor, such as a wireless modem (MSM/MDM) processor, which, in combination with computer hardware interfaces, is able to act in place of the computing device's central processing unit (CPU) and operating system (OS). In such an auxiliary processor operating mode, the auxiliary processor controls peripherals and provides system functionality while the computer's main processor system (i.e., the CPU and OS) may be deactivated or placed in a standby or sleep configuration. In the auxiliary processor mode, the computing device may be used to accomplish limited tasks, such as sending and receiving electronic mail, viewing electronic documents, listening to audio files, viewing video (e.g., DVD) files, accessing the Internet, etc. without significantly draining the computer battery or the auxiliary processor may take over the user experience by performing tasks normally associated with the main processor and operating system. In a preferred embodiment, the auxiliary processor is a processor within a wireless modem within the computing device. A wireless modem processor may maintain communication links with a wireless network enabling continued reception of electronic mail or messages, for example, even when other computer functions are shutdown. When the computer's main processor system (i.e., the CPU and OS) is active, such a wireless modem may function as a 3G data modem with its processor performing functions associated with data communications. Transitions between the normal operating mode and the auxiliary processor mode may be performed by the computing system in a manner that appears transparent to users, or may be controlled by users. Operating in the auxiliary processor mode may enable the computer to exhibit instant on, always on and continuously networked operating features.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
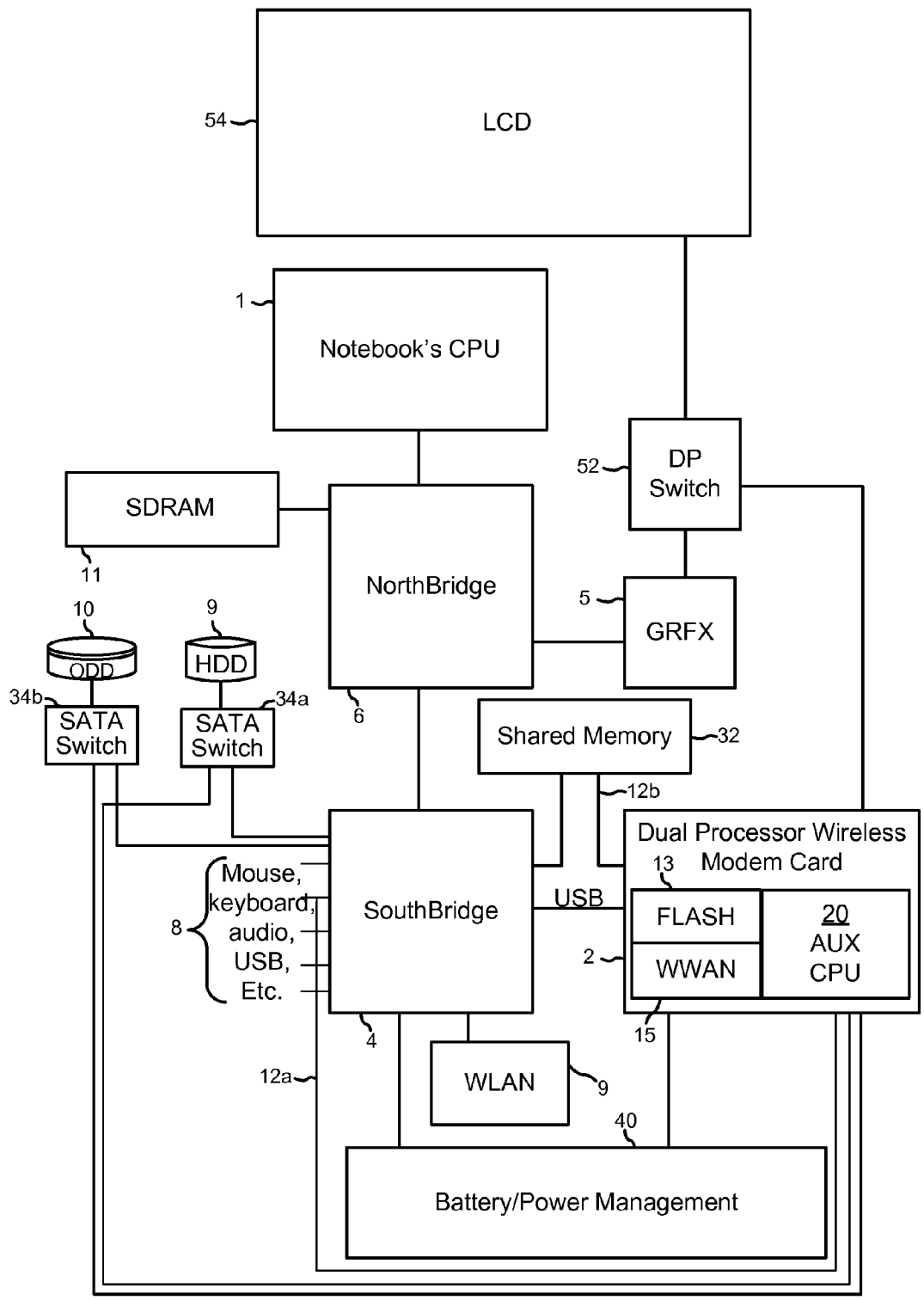
FIGS. 1A-1C are component block diagrams of a personal computer according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile computing device" and "notebook computer" refer to any one or all of laptop computers, netbook computers, battery-operated personal computers, mini-notebook computers, UMPC, personal data assistants (PDA's), tablet computers, palm-top computers, and similar personal electronic devices which include a programmable processor and memory, and a wireless communication transceiver. While many of the embodiment descriptions refer to mobile computing devices or notebook computers, these references are for example purposes only, as the various embodiments may also be implemented in non-mobile computers, such as desktop computers, workstations, servers, routers, access points, and computing systems embedded in non-mobile systems.

To simplify the description of the various embodiments, the term "document" is used herein as a general reference to any type of user-viewable or editable file or application data. Examples of "documents" for the purpose of the descriptions include text files, word processing documents, spread sheet files, electronic mail items, calendar entries, notes, contact data records, programming scripts, photographs, sound recordings, videos, and presentation chart files (e.g., PowerPoint® charts). Thus, references to a "document" are not intended and should not be construed to limit the scope of the claims to a particular type of electronic file or displayed data.

While mobile computing devices such as laptop computers, netbook and notebook computers have become essential tools for the mobile businessman, students and people "on the go," their limitations are well-known. Notebook computer designs typically reflect compromises between the opposing priorities of portability (e.g., light weigh), processing power and battery life. In most cases, battery life (i.e., the time that the notebook computer can operate on a single battery charge) is sacrificed in favor of greater processing power and lighter weight. As a consequence, users are frequently forced to adjust their use of notebook computers in order to extend the battery life until they have an opportunity to recharge. Such efforts may include turning off the computer or placing it in a standby condition when it is not in active use. Additionally, notebook computers can be configured to "go to sleep"—powering down to a standby condition—when no user inputs have been received for a period of time. While such actions will extend the effective battery life, they nevertheless can result in user frustration because the notebook computer must reboot or restore operating conditions to the pre-shutdown/standby conditions before the user can use the computer. This restart time can be significant in some situations, such as when the user merely needs to check an appointment, view a document, or access electronic mail prior to getting on an airplane, for example.

Another issue common to many notebook computer users involves connecting to external networks, such as the Internet. It is now common for notebook computers to come equipped with a wireless modem card which can access cellular telephone networks and/or wireless networks (e.g., WiFi or WiMax). Using such wireless modem cards, notebook computers can connect to the Internet, such as via a 3G cellular data network, without being tied to a wired connection, allowing users to check their electronic mail and surf the Internet from practically anywhere. However, the drain on the battery due to the notebook's CPU may force users to may limit the amount of time they connect to wireless networks in order to further extend their battery life.

In contrast, the other essential electronic device of the modern age—the cellular telephone—typically has a long battery life under normal usage despite the small size of a typical cell phone battery. This is because modern wireless modems used in cellular telephones have been optimized to minimize power consumption, thereby enabling telephones to be made smaller and use smaller batteries. Further, cellular telephones are configured to remain registered with and monitor cellular networks for incoming calls and data messages (e.g., simple message system (SMS)). Due to these design trade-offs, cellular telephones can remain connected to wireless networks for days at a time without recharging even though their battery is a small fraction of the size of those in a typical notebook computer. On the other hand, the processor in a typical cellular phone does not have the processing capacity to perform the functions required by typical notebook application and operating system software.

The various embodiments take advantage of advances in cellular telephone and wireless network communication modems to provide portable computers, such as notebook computers, with auxiliary processor modes that enable users to perform simple functions on the computer with very low power consumption. The embodiments enable computers to exhibit "instant on" and "always on" operating features. Further, the embodiments enable computers to monitor wireless communication networks continuously (such as to receive electronic mail) without significantly reducing effective battery life, thereby exhibiting "always connected" operating features.

Such operational advantages may be achieved by configuring the notebook computer to allow an auxiliary processor, such as the processor within a wireless modem card, to take over selected functions so the computer's central processing unit (CPU) can be deactivated or placed into a low-power state. In an embodiment, the wireless modem card processor draws low power allowing it to function for extended periods of time powered by the notebook computer battery. The notebook computer may be configured to provide the wireless modem processor with access to notebook components such as the battery and power control circuitry, memory (e.g., random access memory, flash memory, and hard disk memory), displays, and user input devices, such as keyboards, touchpad, and other pointing devices. The modem processor may be further configured with software instructions to perform selected application functions or run scaled-down versions (i.e., versions of applications which require less processing power to support) of applications that normally run on the notebook computer CPU. The wireless modem card may be further configured to maintain a communication link with a wireless network while the notebook computer CPU is deactivated, thereby allowing the notebook computer to receive wireless electronic messages, as well as be available for instant access to the Internet if desired by the user. The wireless modem card may further be configured to operate the notebook computer in modes which enable some functionality to be running at all times, even when a power consuming component, such as the display and hard disc memory are deactivated to conserve battery power. Being able to remain connected to wireless networks even when the computer is effectively shut down may enable the notebook computer to receive electronic mail and other electronic messages continuously so that electronic mail is available as soon as the computer is turned on. Also, notebook computers implementing the various embodiments may be accessed and controlled via electronic messaging even when the computer is otherwise shutdown, which may enable a number of useful applications.

In the various embodiments, a computing device (e.g., a notebook computer, UMPC, PDA, or desktop computer) includes an auxiliary processor, such as one of the processors in a wireless mobile station modem (MSM) or mobile data modem (MDM), which, in combination with computer hardware interfaces, is able to "takeover" and act in place of the computer's CPU. When in such an auxiliary processor operating mode, the auxiliary processor (e.g., the processor within the MSM/MDM) controls the computing device's peripherals and provides system functionality while the main processing system (i.e., the CPU and OS) is deactivated, such as in "off," "standby" or "sleep" modes. In this auxiliary processor mode, users can use the computing device to accomplish limited tasks, such as sending and receiving electronic mail, viewing electronic documents, listening to audio files (e.g., playing a compact disc (CD) or MP3 file), viewing a movie on a digital video disc (DVD), and accessing the Internet. Using a low power auxiliary processor, such as the processor within an MSM, the drain on the computer's battery may be limited to little more than that of a typical cellular telephone. Further, an MSM/MDM processor may maintain communication links with a wireless network (such as 3G cellular and data networks) and continue to receive electronic mail even when all other functions are shut down. When the main system (i.e., the CPU and OS) is active—which is the normal operating mode of the computing device—the MSM/MDM functions as an advanced 3G data modem. Transitions between the normal operating mode and the auxiliary processor mode may be performed by the computing system in a manner that is transparent to users, or may be controlled by users.

An MSM/MDM wireless modem card suitable for use in the various embodiments may include a dual core processor, with one processor dedicated to application services (e.g., interfacing with a host computing device) and the other processor dedicated to modem services (e.g., sending and receiving data via a wireless transceiver). This duel core processor capability, in conjunction with many other features of the MSM/MDM hardware and software, enables a new set of applications and functionality that can be implemented in notebook computers, UMPC's, desktop computers, and even servers, routers and access terminals.

The various embodiments enable a number of useful applications and desirable operational features. For ease of description, three operational features referred to herein are "always on;" "instant on" and "always connected." As used herein, "always on" refers to the operational feature of a computing device implementing an embodiment that provides users with prompt access (i.e. no boot up time required) to certain functionality whether the main processor is on, off or in standby mode. As used herein, "instant on" refers to the operational feature that certain applications will launch immediately without any boot up time, much like a dedicated electronic device. For example, entertainment functions, such as a DVD player, a music player, a photo viewer and certain games, may be configured to operate instantly. Further, being supported by the processor in an MSM/MDM, such entertainment functions may be accessed for extended periods of time without depleting the computing devices memory. As used herein, "always connected" refers to the operational feature of a computing device that can remain connected to and receive messages from wireless networks even when the computing device is otherwise shutdown. The always connected functionality enables users to keep the electronic mail folder on their hard drive up to date and in synch with their e-mail system. The always connected functionality may also enable the computing device to download information from the Internet to maintain up-to-the-minute information, such as news, stock reports, etc. The always connected functionality may also work with a global positioning system (GPS) receiver, which may be included as part of the MSM/MDM wireless modem card, to maintain current information regarding the computing device's location and surroundings. Thus, users could open their notebook computer and instantly view their present location in a mapping application without having to wait for the system to boot up and access GPS satellites. In the various embodiments, the always on, instant on and always connected operational features may be provided without significantly reducing the useful battery life of the computing device.

The auxiliary processor may be a separate power-efficient processor on the motherboard, a processor (or co-processor) within a component of the computing device, or a processor within a component or peripheral device connected to the computer by a cable (e.g., a USB cable). For example, the auxiliary processor may be a processor in a MSM/MDM wireless modem, a GPS receiver, a network interface controller, a compact disc (CD) player, a digital video disc (DVD) player, a cellular telephone (e.g., a detachable cellular telephone as described below with reference to FIG. 11), or other component having its own processor. As another example, the auxiliary processor may be a processor in an external peripheral device coupled to the computer by a cable, such as a printer, an external multi-function device, an external modem, an external router, an external compact disc (CD) player, an external DVD player, a cellular telephone, or an auxiliary processor configured in a USB device. For ease of description, some of the embodiments are described in terms of the auxiliary processor being a processor within a wireless modem card. However, the descriptions of such wireless modem embodiments are intended merely to serve as an example of how the components may be assembled and function. The same functionality may be implemented in other processor-based components. Further, the component layout of other types of processor-based components would be similar to those illustrated in the figures and described below with respect to components relevant to the various embodiments.

In a particular embodiment, the auxiliary processor is provided on an MSM/MDM wireless modem card which includes a single module a graphics processor, a GPS receiver, a 3-G wireless transceiver, a modem processor, and an applications processor configured with application platform software, such as BREW®, Linux®, or Windows Mobile®. Implementing these components and capabilities in a single module or card allows it to take over much of the functionality of the computing device CPU without significantly degrading the user experience. For example, the graphics processor on the wireless modem card can drive the computing device display, while the applications processor can receive inputs from a keyboard, a computer mouse, and touchpad, as well as control the computing device power system, data storage/input (e.g., DVD/CD or any disc format player, hard drive, etc.), and network interfaces (e.g., USB port).

In order to affect a seamless transition between auxiliary processor modes and normal operating modes, the central processing unit (CPU) of the computing device and the auxiliary processors, such as the processor in a wireless modem card, may be configured to store system data, application data and application context data in shared memory or to communicate system data application data and application context data (or a combination of both) from one to the other prior to a control transition. The term "shared memory" and "shared storage" are used herein to refer to memory units or portions (or all) random access memory (e.g., RAM and FLASH memory) that both processors can access. Such shared memory may be any portion of internal memory accessible by both the CPU processor and the auxiliary processor. Shared memory may be positioned on a module including the auxiliary processor (such as on a wireless modem card), may be on the computer's mother board, or a combination of both. Shared memory can be used to store status and state information reflecting a current operating state so that when control is shifted from the CPU processor to the auxiliary processor, or vice versa, current operating states can be maintained. A communication channel may be any channel between the CPU and the auxiliary processor by which either processor can pass overall system data, application data, application context data and other state information needed to affect a transition of control. In a further embodiment, a portion of system data, application data and application context data may be stored in shared memory and a portion of such data may be passed between the CPU and the auxiliary processor via a communication channel. In this manner, a user may be unaware of the shift in the operating mode since the current state of open applications and data can't be passed from one processor to the other.

In the various embodiments, the auxiliary processor, such as a wireless modem card processor, may be configured to run scaled-down versions of the applications which normally run on the computing device CPU. Running scaled-down versions of some sophisticated applications in the auxiliary processor mode may provide users with sufficient functionality as well as acceptable performance when run on an auxiliary processor with less processing power than the computer's CPU. If users need the full functionality of such applications, they may activate the computing device CPU and load the full version of the application by switching to the normal operating mode. For example, if the computing device is configured with the Microsoft Word® application, the auxiliary processor may be configured to operate a document viewer application which may be a scaled-down version of Microsoft Word® or a Word® viewer that is capable of displaying Word® documents but does not provide all of the editing, formatting, spellchecking, and template features of that software program. Similarly, the auxiliary processor may be configured to operate a scaled-down version of Microsoft Office® sufficient to receive, display, generate and send simple e-mail messages without some of the sophisticated search and formatting features of the standard version. Considering these examples, users may receive and read e-mails while in the auxiliary processor mode. If an e-mail includes an attached Word® document, a user may open and read the document as if the computing device were in normal operating mode. However, if the user wants to edit the document, the computing device's CPU may need to be activated and the computer switched to normal operating mode in order to provide the full editing and formatting functionality of Microsoft Word®. The transition from the auxiliary processor mode to normal operating ground may be accomplished in a manner that appears seamless to the user, such as the display so that displayed documents do not change when the operating mode changes.

Transitions between normal operating mode and auxiliary processor mode, and back again, may be initiated in a variety of ways. In an embodiment, users may instruct the computing device to change operating modes, such as by pressing a button, activating a menu prompt, or closing the lid of a notebook computer. In another embodiment, the computing device may sense from the active applications or the user's activities when processing should shift from normal operating mode to auxiliary processor mode to conserve battery power. This may be accomplished in one direction by the CPU monitoring the user's interactions with the computer, and particularly the usage made of open applications, to determine whether current usage can be supported by the auxiliary processor, such as the usage is limited to functionality provided by the applications that run on the auxiliary processor. If so, the CPU may automatically (i.e., without user a command) initiate a control shift by signaling the auxiliary processor to assume control of computer peripherals. Similarly, an automatic shift from the auxiliary processor mode to the CPU mode may be initiated by the auxiliary processor monitoring the user's interactions to determine when a user's activities require the CPU functionality, such as detecting a function call (e.g., an edit command) that is not supported by an auxiliary processor application. In response to determining that the user desires functionality not supported by the auxiliary processor applications, the auxiliary processor may automatically signal the CPU to assume control in response to the auxiliary processor determining that an application cannot provide such functionality. For example, the computer CPU may be configured with software instructions to sense when the user is only viewing documents (i.e., not editing documents which may require a CPU application to accomplish), and thus a shift to the auxiliary processor mode can be accomplished without degrading the user's experience (which may depend upon the functions being utilized). As another example, the auxiliary processor may be configured with software instructions to shift from auxiliary processor mode to normal operating mode when greater processor capability is required to accomplish a user task.

In a further embodiment, the computing device CPU and the auxiliary processor may be configured to anticipate when an operating mode transition may take place and prepare for such a shift in advance. For example, if a user activates a DVD player while in normal operating mode, the computing device CPU may prepare to transition control to the auxiliary processor in order to conserve power in embodiments in which the DVD player application can run on the auxiliary processor. As another example, if a user activates a document viewer application while in auxiliary processor mode, the auxiliary processor may prepare to transfer control to the computing device CPU in anticipation of the user performing edit functions on the document that are not supported by the document viewer application configured on the auxiliary processor. By anticipating when an operating mode transition is likely to occur and taking preliminary steps to support such a transition, such as storing current state information (or a portion of current state information) in shared memory and/or beginning to communicate system data, application data and application context data via a communication channel, the actual transition can be accomplished more rapidly, thereby enhancing the user experience.

Figure 19:
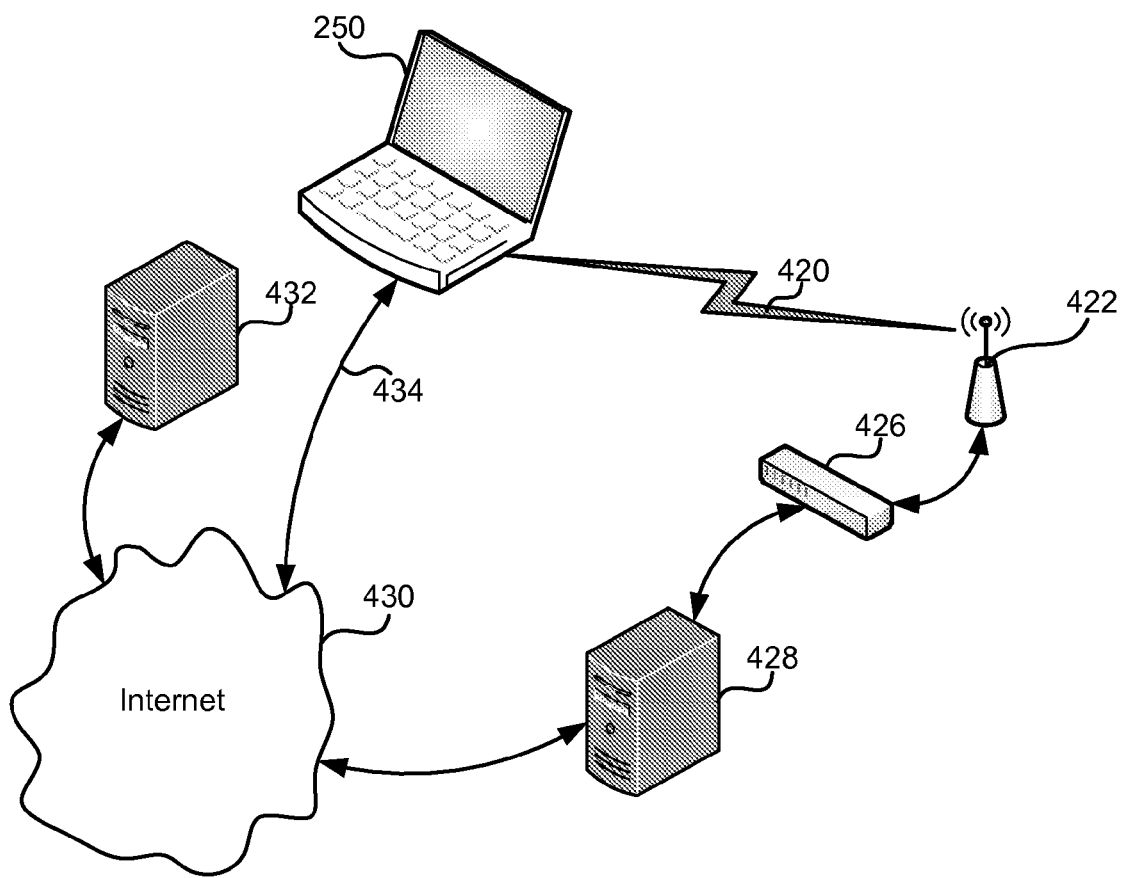
FIG. 19 is a communications system diagram illustrating a communications system suitable for use with an embodiment.

In a further embodiment in which the auxiliary processor is a processor within a wireless data modem, the computing device CPU and the auxiliary processor may be configured to maintain a wireless data communication link during a control transition from the CPU to the auxiliary processor and back again. In this embodiment, the wireless data modem can maintain a data call to a wireless communication network (such as described below with reference to FIG. 19) during a transition from one processor to the next since continuous power is provided to the modem and the physical layer remains the same. A new end-to-end connection may need to be negotiated with the processor assuming control. When the processor assuming control launches an application using the wireless data connection, the processor will request a physical connection, but since the data call is already established, this process is accomplished immediately. Data packets may then be sent from the processor assuming control through the established data call to initiate negotiation of the new end-to-end connection.

A top level component diagram of an example embodiment is illustrated in FIG. 1A. A computing device will typically include a central processor unit (CPU) 1 that may be coupled to various peripheral and memory devices via a bus architecture, such as a Northbridge 6 and Southbridge 4 chip set. Through the bus, that the CPU 1 may connect to memory, such as synchronous dynamic random access memory (SDRAM) 11, and a graphics processor 5 which is coupled to a display 54, such as a liquid crystal display (LCD). The CPU 1 may be coupled to a second bus, such as a Southbridge 4 chip, which in the architecture illustrated in FIG. 1 is coupled via the Northbridge bus 6 and provides connections to various computer components and peripherals, including a keyboard, mouse, audio outputs, and external devices which are collectively labeled as input/output peripherals 8. The CPU 1 also is typically coupled to high-capacity memory storage such as a hard disk drive 9 or an optical disk drive 10. In the architecture illustrated in FIG. 1A, each CPU 1 connection to a hard disk drive 9 and/or an optical disk drive 10 is via a Serial Advanced Technology Attachment (SATA) switch 34a, 34b coupled to the Southbridge bus 4, but other memory access switching circuits may be used. Additionally, the CPU 1 may control the power management module 40, which will include a battery in the case of a notebook or similar computer, via a bus such as the Southbridge chip 4. The CPU 1 may also communicate with wired local area networks via a network access modem 9 via a bus, such as the Southbridge 4.

The architecture illustrated in FIG. 1A employs the Southbridge 4 and Northbridge 6 chipset which is a well-known Intel, Inc. chipsets that serves to communicate with a CPU 1 and control interactions with memory, peripheral buses, cache memory, and graphics processors. Typically, the Northbridge 6 chip communicates with the CPU 1 using a front side bus, while the Southbridge chip 4 handles input/output functions of the Northbridge/Southbridge chipset. This particular bus architecture is provided as one example of a computer architecture in which the various embodiments may be implemented. However, other processor interface chipsets or bus architectures may be implemented without departing from the scope of the claims.

In an embodiment, the computing device also includes a wireless modem card 2 that is coupled to the CPU 1 by a bus, such as the Southbridge chip 4. For example, the wireless modem card 2 may connect to the Southbridge chip 4 via a universal serial bus (USB) link. In an embodiment the wireless modem card 2 may includes dual core processors, including one processor dedicated to applications which can serve as an auxiliary processor 20. The wireless modem card 2 may also include internal memory, such as flash memory 13, and a wide area wireless wide area network transceiver 15 which connects to an antenna (not shown in FIG. 1A).

Unlike a conventional computing device that includes a wireless modem card, the various embodiments provide additional connections between the wireless modem card 2 and peripherals of the computing device. For example, the wireless modem card 2 may be coupled to the battery/power management module 40 to receive power directly from the battery (in the case of a notebook computer for example) as well as to control the battery/power management functions. Additionally, the wireless modem card 2 may be coupled to the SATA switch 34a giving it direct access to the computing device hard disk drive 9 and to the SATA switch 34b giving it direct access to the computing device optical disk drive 10. Further, the wireless modem card may be coupled to the display 54, such as by means of a switch 52 so that the auxiliary processor 20 can directly drive graphics on the display 54.

A portion of memory designated for sharing between the notebook CPU 1 and the wireless modem card 2, shown as shared memory 32, may be coupled directly to the wireless modem card 2. In an embodiment the shared memory 32 may be some or all random access memory accessible by the CPU 1. In such an embodiment, a communication channel between the CPU 1 and the auxiliary processor 20 (e.g., the SouthBridge 4 via a USB connection as shown in FIG. 1A) may be used by the CPU 1 to inform the auxiliary processor 20 of system data and application data memory addresses before control is passed to the auxiliary processor 20 (and vice versa when returning processing to the CPU 1). In another embodiment, the shared memory 32 may be a separate memory module, such as a separate memory chip on the computing device motherboard accessible by the auxiliary processor via an optional connection 12b, or a portion of memory within the modem 2. In such an embodiment, the CPU 1 may load into the shared memory 32 all or a portion of the information required by the auxiliary processor 20 to assume control, such as memory addresses within commonly accessible memory of data associated with currently open applications. For ease of reference, the term "shared memory" is used herein to refer to any random access memory accessible by both the CPU 1 and the auxiliary processor 20, and therefore the term should not be construed as limiting the scope of the claims to a particular physical memory structure.

The auxiliary processor 20 within the wireless modem card 2 may be configured to access the computing device peripherals, including, such as, the mouse, keyboard, audio output, USB ports, etc., collectively 8, via the USB connection to the Southbridge bus 4 or via an optional separate USB communication channel 12a.

Figure 1B:
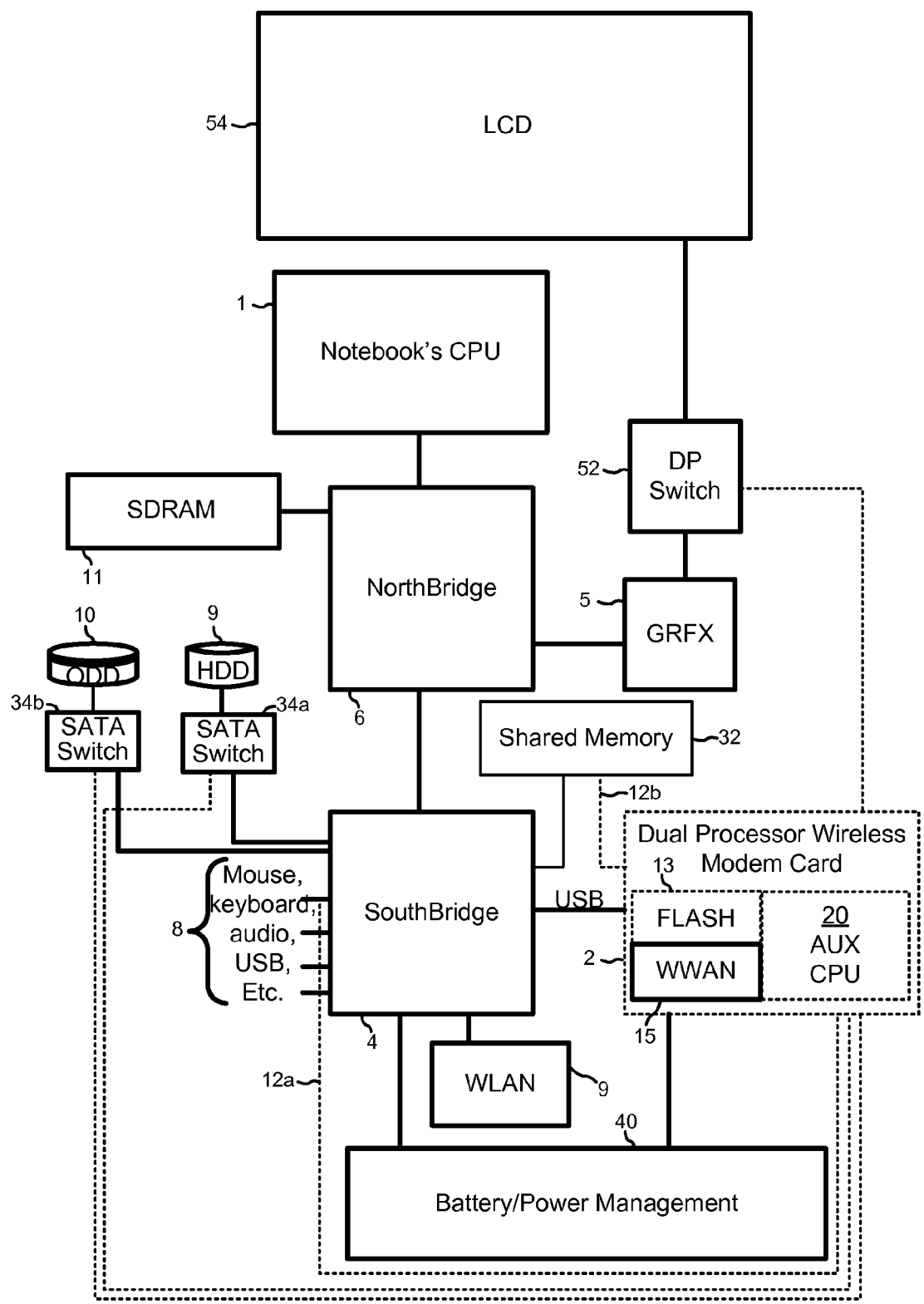

FIG. 1B shows the component of the computing device that are active in the normal operating mode (i.e., when the notebook CPU 1 has functional control over the computing device). As this figure illustrates, all peripherals of the computing device are active in a normal operating mode with the possible exception of some wireless modem card 2 elements. For example, the wireless modem card 2 transceiver 15 will typically be active to provide wireless, activity for the computing device, but the auxiliary processor 20 may be idle or active but limited to performing modem functions.

Figure 1C:
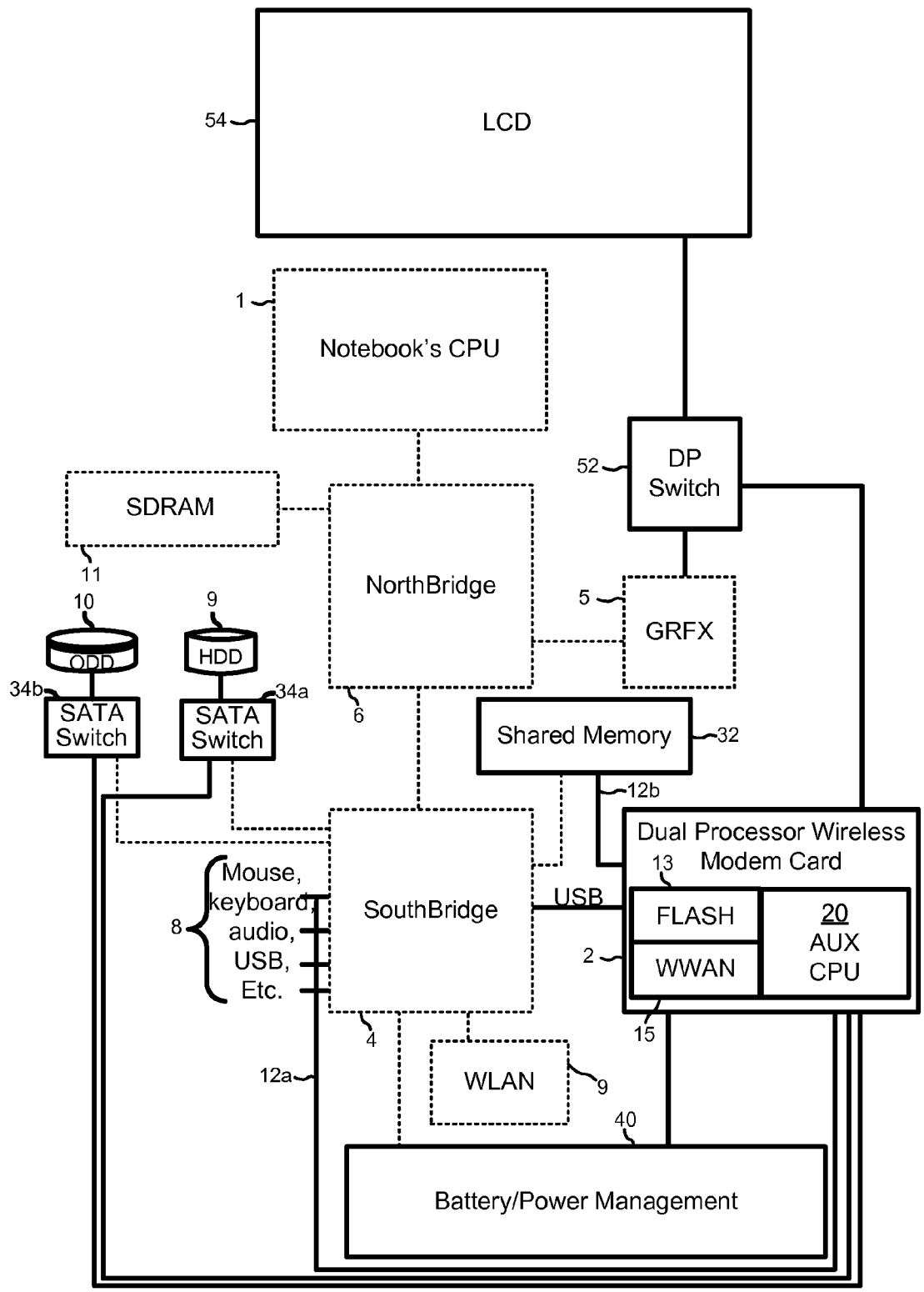

In contrast, FIG. 1C illustrates component of the computing device that may be active in the auxiliary processor mode (i.e., when the wireless modem card 2 auxiliary processor 20 has functional control over the computing device). In this operating mode, the computer's CPU 1 may be deactivated, as well as those components which are only used in the normal operating mode. For example, certain memory, such as the SDRAM 11 and the computer's graphics card 5 may be deactivated. Additionally, a portion of the main bus, such as the Northbridge chip 6, may be deactivated as well. In the auxiliary processor mode, the wireless modem card 2 may be fully activated as the auxiliary processor 20 has taken over for the computers at CPU 1. Auxiliary processor mode instructions for the ancillary processor 20 may be stored in internal memory, such as the flash memory 13, of the wireless modem card 2, while system and application data may be obtained from shared memory 32 via a memory connection 12b, as well as the computer's hard disk drive 9 and optical disk drive 10 via the STAT switches 34a and 34b, respectively. Alternatively, system and application data may be obtained by the auxiliary processor 20 from the CPU 50 via a communication channel, such as a USB channel connected to the SouthBridge 4 or via an optional separate USB communication channel 12a. In a further alternative, a portion of system and application data may be obtained from shared memory 32 while the remaining system and application data are obtained via a communication channel. Additionally, the auxiliary CPU 20 of the wireless modem card 2 may drive the display 54 via the Display Port (DP) 52.

As illustrated in FIG. 1C, users may have access to much of the computing device peripherals while in the auxiliary processor mode via the functionality provided by the auxiliary processor 20. Due to the power-efficient design of the processors within a wireless modem card 2, this operating mode requires far less power than the normal operating mode when the computer's CPU 1 is energized.

FIGS. 1A-1C provides one example of a top-level architecture suitable for use in the various embodiments. This top-level architecture may be implemented in a variety of hardware architectures, some examples of which are illustrated in FIGS. 2 through 9.

Figure 2:
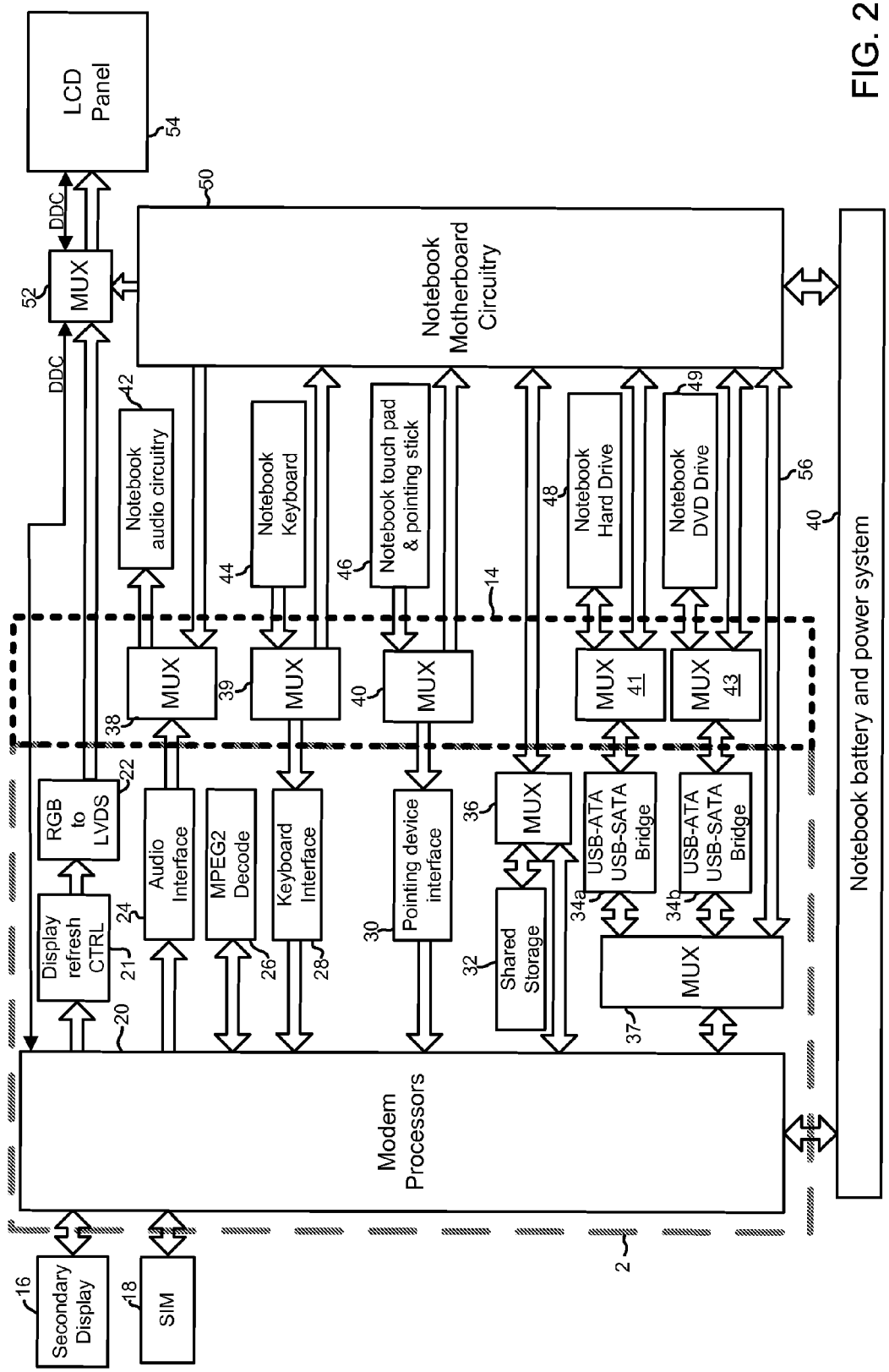
FIG. 2 is a circuit block diagram of a portion of a computer according to one embodiment.

FIG. 2 illustrates a hardware implementation of an embodiment showing an example of how the wireless modem card 2 can interface with the computing device motherboard circuitry 50. In this embodiment, a multiplexer array 14 can serve as an interface between the motherboard 50 and the computer's keyboard 44, pointing devices 46, DVD drive 48, and audio circuitry 42, as well as the wireless modem card 2. The auxiliary processor 20 may receive keyboard inputs from the keyboard 44 via the multiplexer circuit 39 and a keyboard interface circuit 28 within the wireless modem card. Similarly, the auxiliary processor 20 may receive pointing inputs from the computer's pointing devices 46 via a multiplex circuit 40 and a pointing device interface circuit 30. Audio output from the auxiliary processor 20 may be provided to the computer's audio circuitry 42 via an audio interface circuit 24 communicating with a multiplexer circuit 38. To provide for decoding of audio and video information, the modem processor 20 may be coupled to an MPEG2 decoder 26.

Commands to and data from the computer's hard drive 48 and DVD drive 49 may be transmitted via a multiplexer circuit 41, USB disk drive access switches 34a, 34b (e.g., a SATA bridge) and the second multiplexer circuit 37. It should be noted that the second multiplexer circuit 37 may be eliminated by coupling the disk drive access switches 34a, 34b to the modem processor 20. Further, the motherboard 50 and the modem processor 20 may access the hard drive 48 and DVD drive 49 via a common set of disk drive access switches 34a, 34b coupled to either processor by multiplexers 41, 43 as described below with reference to FIGS. 6B and 8B.

Shared memory storage 32 may be accessed by both the modem processor 20 and the motherboard circuitry 50 via a multiplexer circuit 36. FIG. 2 illustrates the shared memory storage 32 residing on the wireless modem card 2; however, and the shared memory 32 may alternatively be positioned on the motherboard circuitry 50. Further, as mentioned above, the shared memory may be all or a portion of the random access memory on the motherboard circuitry 50 provided the auxiliary processor 20 may access the memory, such as via a multiplexer 36 or other communication bus, such as the SouthBridge 4.

The motherboard circuitry 50 may also be coupled directly to the modem processors 20 with a communication channel 56, such as via a multiplexer circuit 37. Such a communication channel 56 may be used in the normal operating mode to enable communications with wireless networks via the wireless modem card 2. The communication channel 56 may also be used during the process of switching control between the CPU 1 and the auxiliary processor 20, and vice versa, such as to communicate operating application information and state data, synchronize processing, and coordinate the control transfer process.

The battery and power system 48 may be coupled directly to the computer's motherboard circuitry 50 as well as the wireless modem card 2 so that the power system can be managed by either the CPU or the artillery processor 20 depending upon the operating mode. The auxiliary processor may also be coupled directly to a secondary display 16 if one is present and to a system identity module (SIM) 18 as may be necessary to communicate with a cellular wireless network. Further, the auxiliary processor 20 may drive the computing device display 54 via a display refresh control circuit 21 driving an RGB to LVDS converter circuit 22 which couples to the display 54 via a multiplexer circuit 52.

Figure 3:
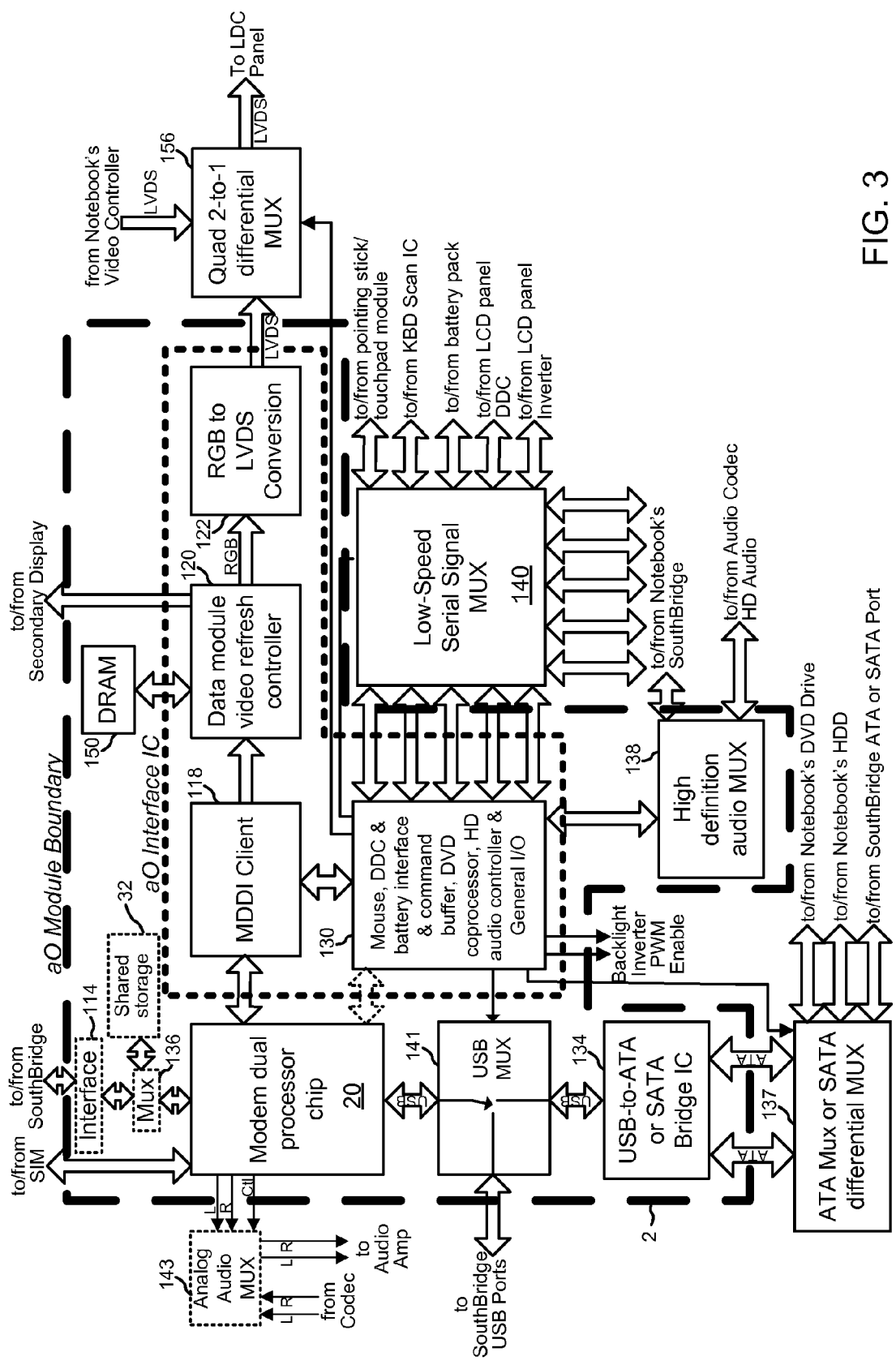
FIG. 3 is a circuit block diagram of a portion of a computer according to an alternative embodiment.

FIG. 3 is a component block diagram of an embodiment implementation of a wireless modem chip 2 that may be used in the architecture illustrated in FIG. 2. In this example embodiment, the wireless modem chip 2 may include a duel processor chip 20 coupled to a USB multiplexer circuit 141 which couples to the Southbridge chip 4 on the computer motherboard 50. One or more USB or SATA bridge chips 134 may be coupled to the USB multiplex 141 and connect with one or more interfacing multiplexer or SATA differential multiplexers 137 on the motherboard 50. Video output from the modem processor chip 20 may be provided via a Mobile Display Digital Interface (MDDI) client chip 118 coupled to a data modem video refresh controller 120 which outputs an RGB signal to an RGB-to-LVDS conversion chip 122 which outputs an LVDS signal to a quad differential multiplexer chip 156 coupled to the display panel 54. The video circuit may further be supported by a dynamic RAM 150 coupled to the data module video refresh controller 120. A peripheral interface chip 130 may be provided within the wireless modem chip 2 to interface with the computer mouse, battery control circuitry, DVD coprocessor, hard drive, audio controllers, and general input/output peripherals. The modem processor 20 may couple directly to the peripheral interface chip 130 or via the MDDI client ship 118. The peripheral interface chip 130 may connect to a low-speed serial signal multiplexer circuit 140 on the motherboard 50 which connects to the various components to the computer's Southbridge chip 4. In this example embodiment, the low-speed serial signal multiplexer 140 corresponds to the multiplexer array 14 illustrated in FIG. 2. High-definition audio signals may be output from the modem processor 20 to the computer's audio circuitry via a high definition audio multiplexer circuit 138. The modem processor 20 may also access shared memory 32 via a multiplexer circuit 136. It should be noted that the shared storage 32 may be alternatively positioned on the wireless modem card 2 (as shown in dashed lines) or in memory positioned on the motherboard 50. It should also be noted that the communication of system data, application data, application context data and other state information required for shifting control from one processor to the other may be communicated via a communication channel, such as via a USB connection to the SouthBridge via the USB multiplexer 141.

Figure 4:
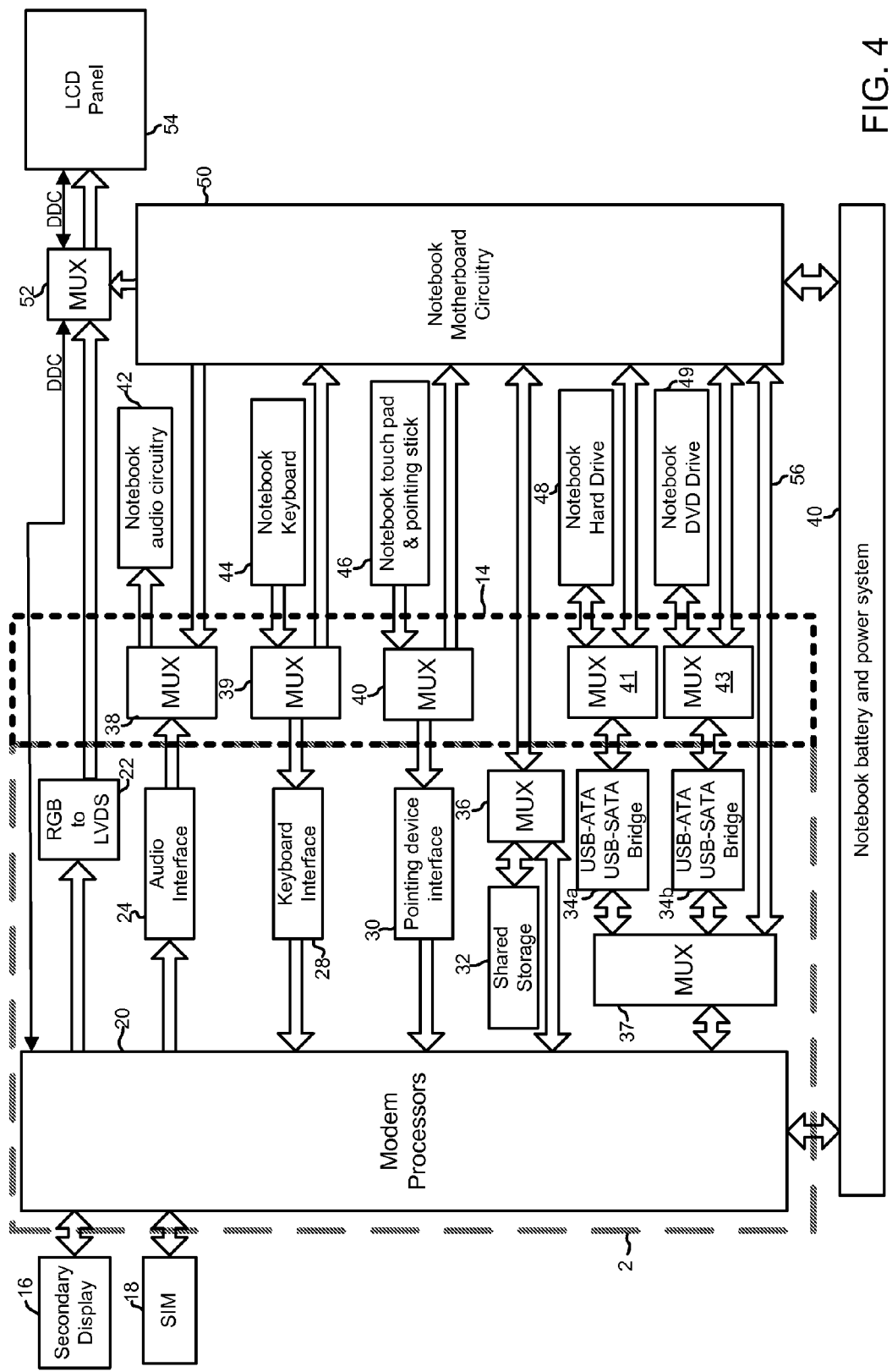
FIG. 4 is a circuit block diagram of a portion of a computer according to a further alternative embodiment.

FIG. 4 illustrates an alternative hardware architecture embodiment. This architecture is similar to that illustrated in FIG. 2 (and thus the preceding descriptions of like numbered components apply) with the exception that the wireless modem card 2 does not include an MPEG2 decoder 26 or a display refresh controller or circuit 21. In this embodiment the modem processor 20 may perform the same or similar functions, thereby eliminating the need for these circuits.

Figure 5:
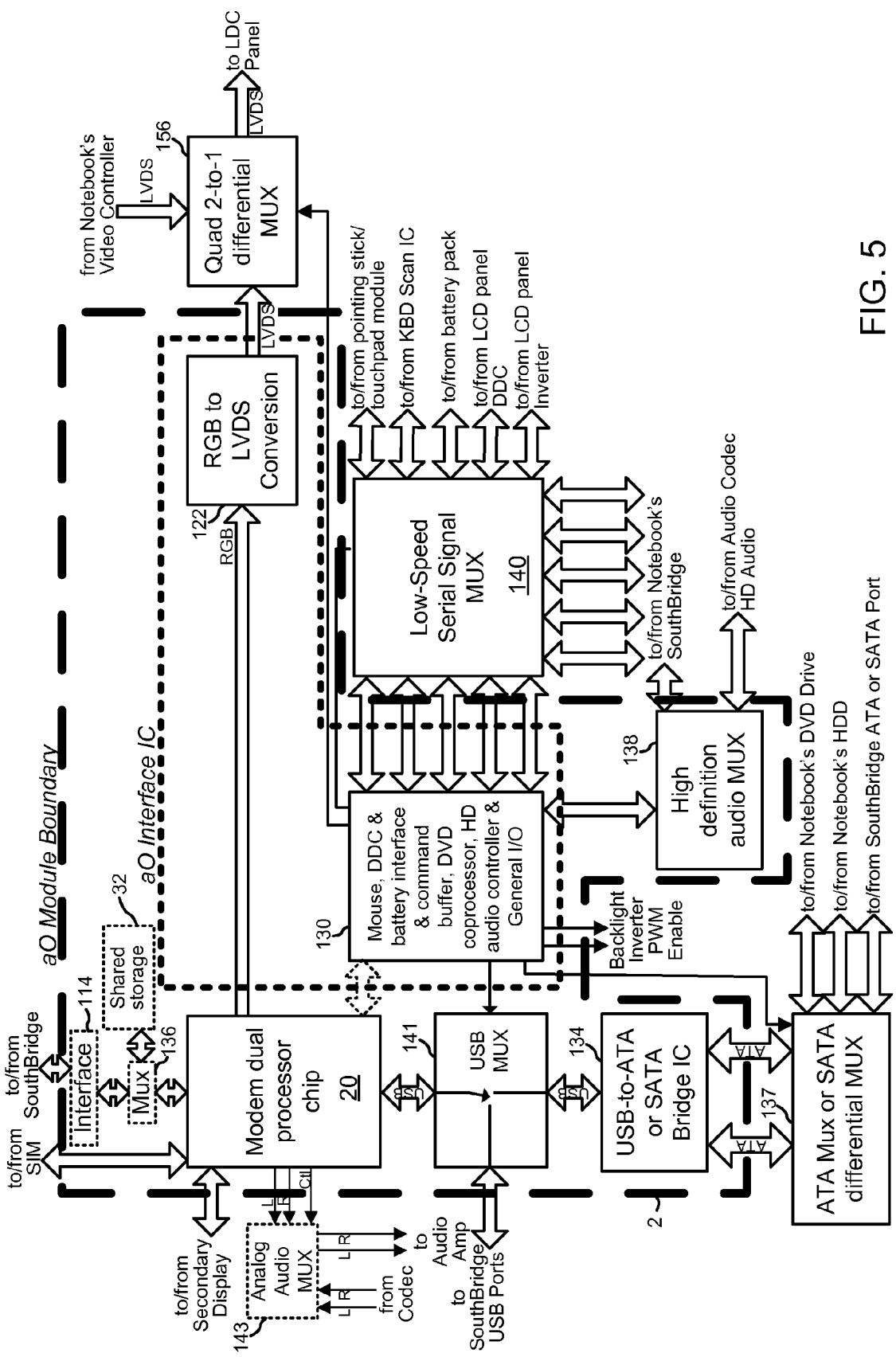
FIG. 5 is a circuit block diagram of a portion of a computer according to a further alternative embodiment.

FIG. 5 is a component block diagram of an embodiment wireless modem chip 2 that may be used in the architecture illustrated in FIG. 4. This embodiment of the wireless modem card 2 is similar to that illustrated in FIG. 3 (and thus the preceding descriptions of like numbered components apply) with the exception that the modem processor 20 may directly output an RGB signal to the RGB-to-LVDS conversion chip 122. Thus, this embodiment may be suitable for modem processors 20 which include video generation capability within the processor itself The embodiment illustrated in FIG. 5 also eliminates the MDDI chip 118, so the peripheral interface chip 130 may be coupled directly to the modem processor 20.

The auxiliary processor 20 may be integrated with the computing device motherboard circuitry 50 in a variety of ways, some examples of which are illustrated in FIGS. 6A through 9.

Figure 6A:
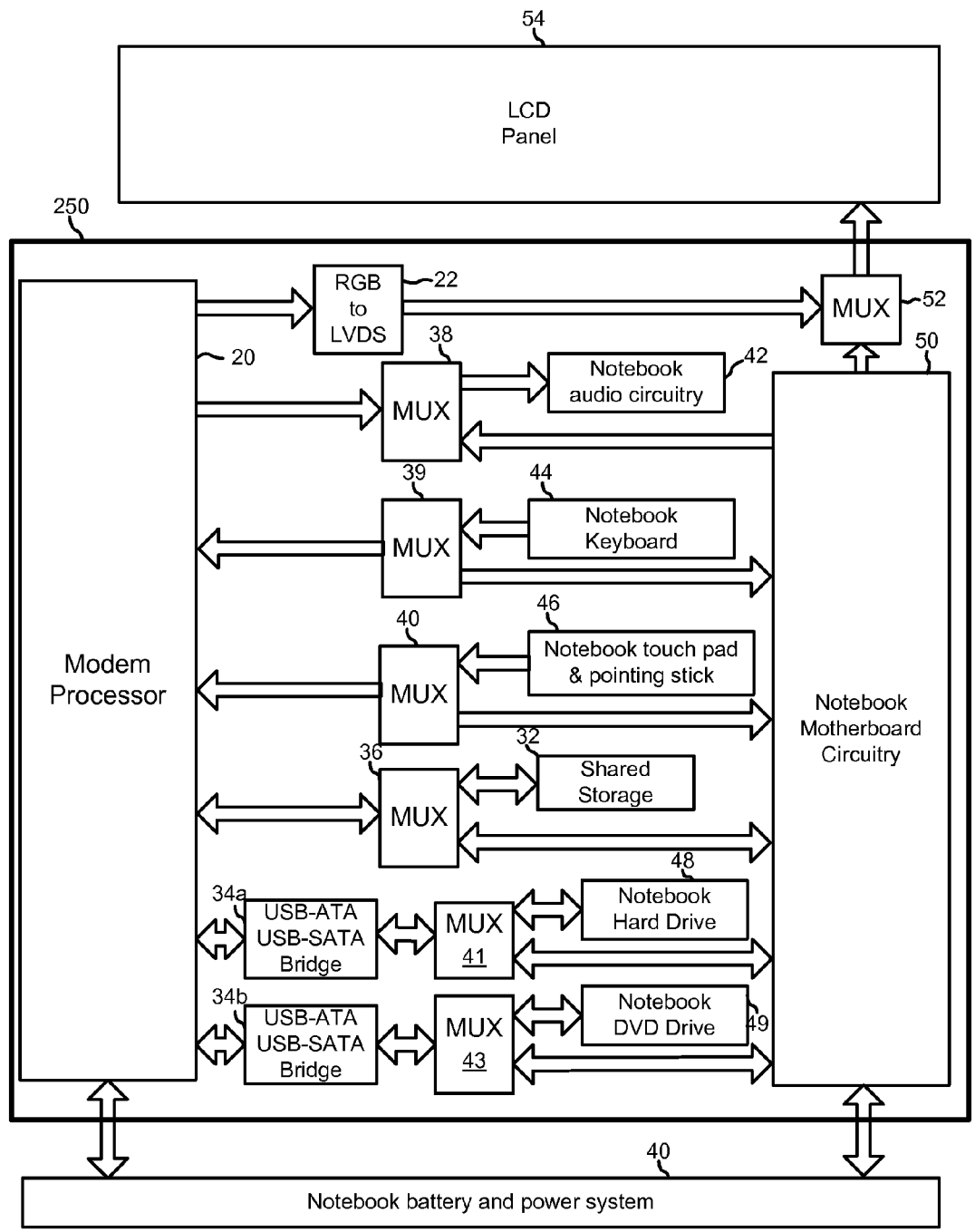
FIGS. 6A and 6B are circuit block diagrams of a portion of a computer according to further alternative embodiments.

In the architecture illustrated in FIG. 6A, the auxiliary processor 20 and the motherboard 50 are couple to various input, output and data storage peripheral devices via a series of multiplexer circuits 38, 39, 40, 36, 41, 43, 52. In this example architecture, both the motherboard 50 and the auxiliary processor 20 access peripheral devices through common multiplexer circuits so that the peripherals can be accessed in either operating mode simply by controlling the multiplexer circuits. This architecture is similar to the architecture illustrated in FIG. 2, so the description of like numbered components is applicable to FIG. 6A as well.

Figure 6B:
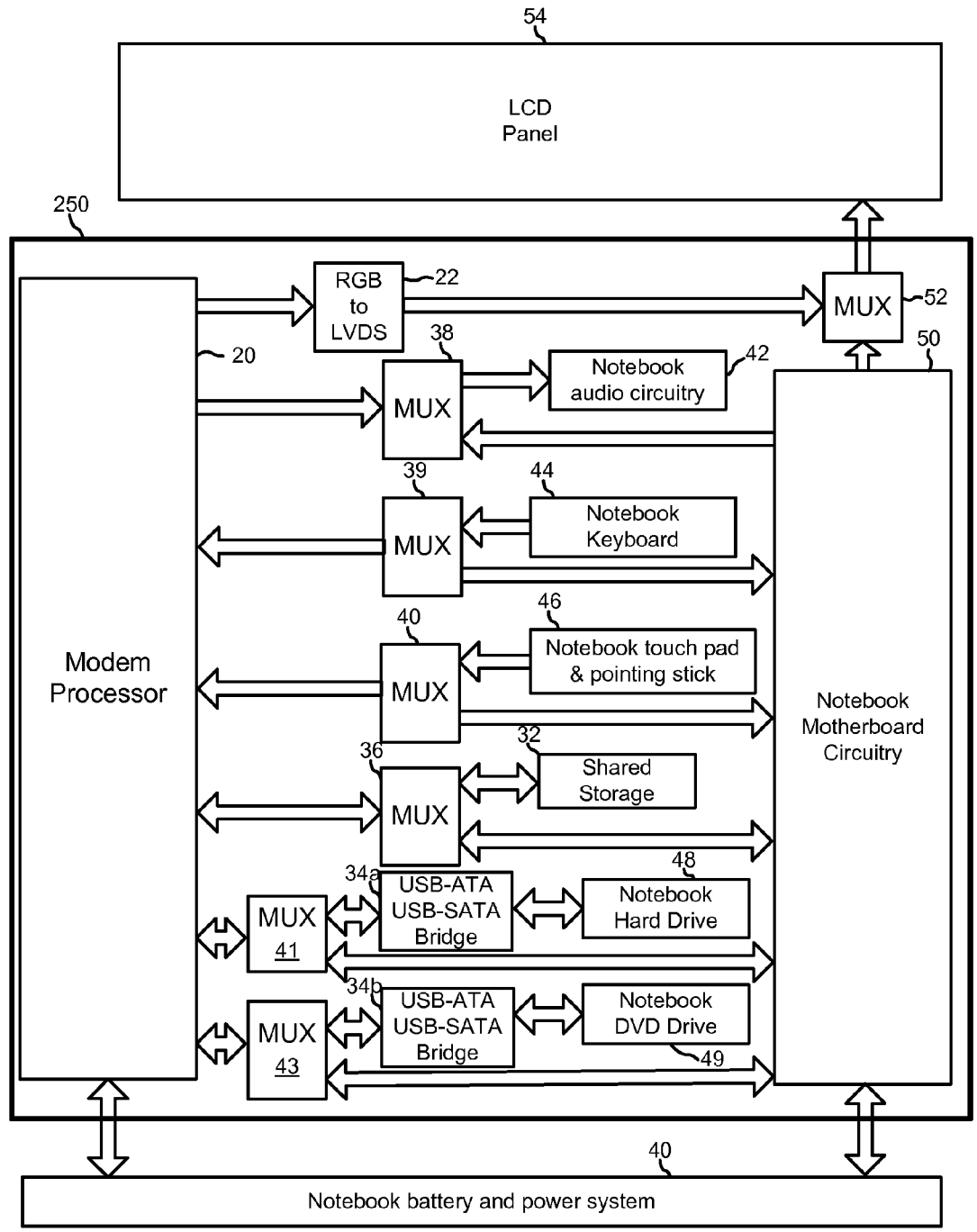

The architecture illustrated in FIG. 6B is similar to that in FIG. 6A except that the motherboard circuitry 50 and auxiliary processor 20 access the computing device hard drive 48 and DVD drive 49 through common USB-ATA or USB-SATA bridges 34a, 34b, respectively, which are addressed via multiplexers 41, 43, respectively. Like FIG. 6a, the descriptions of like numbered components provided above with reference to FIG. 2 apply to the components shown in FIG. 6B.

Figure 7:
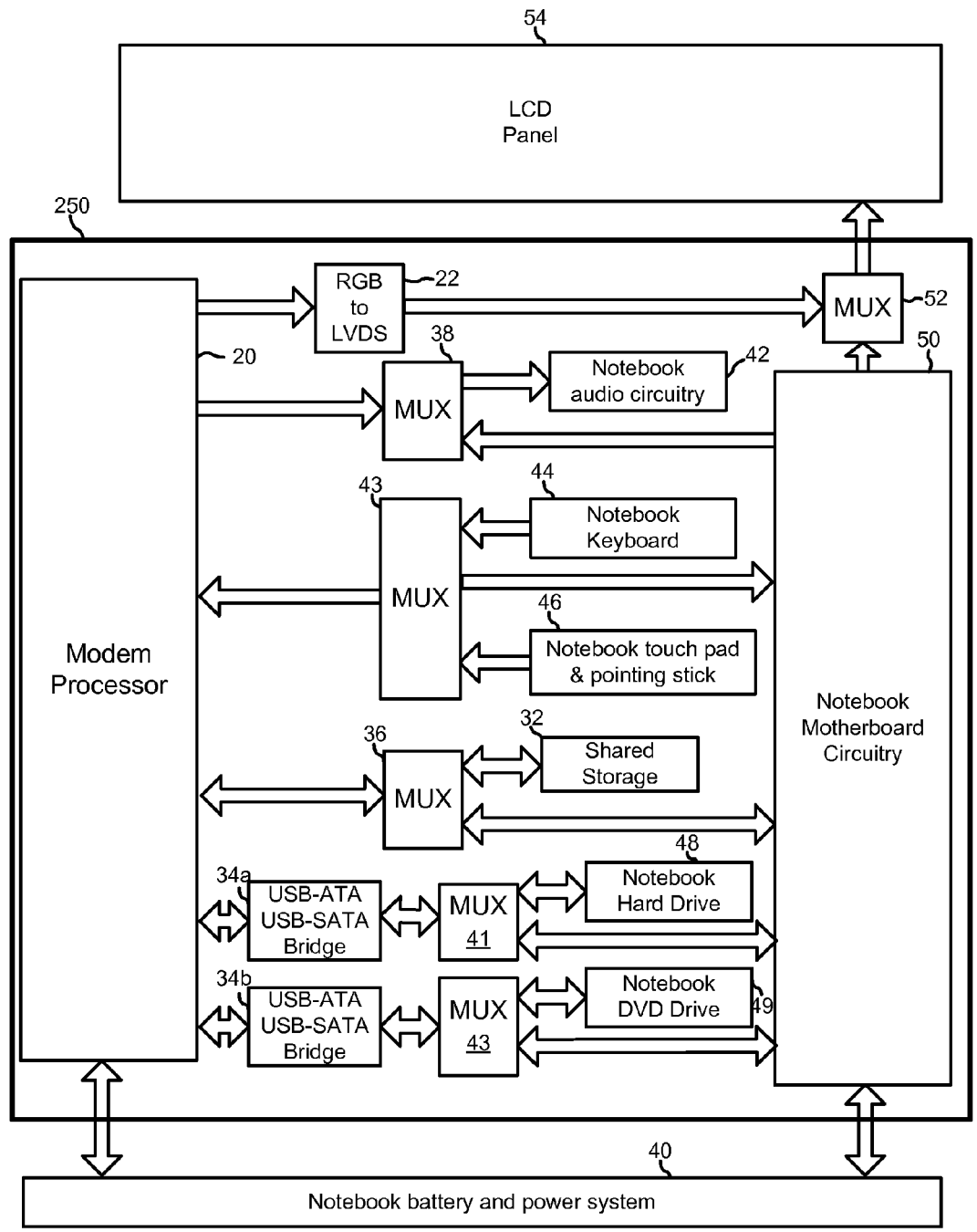
FIG. 7 is a circuit block diagram of a portion of a computer according to a further alternative embodiment.

FIG. 7 illustrates an alternative architecture in which a single user input device multiplexer circuit 41 is coupled to the computing device keyboard 44 and pointing devices 46. Thus inputs received from either the keyboard 44 or pointing devices 46 are routed to either the auxiliary processor 20 or the computer's motherboard circuitry 50 through that multiplexer circuit 41. Otherwise this architecture is similar to the architecture illustrated in FIG. 2, so the description of like numbered components is applicable to FIG. 7 as well.

Figure 8A:
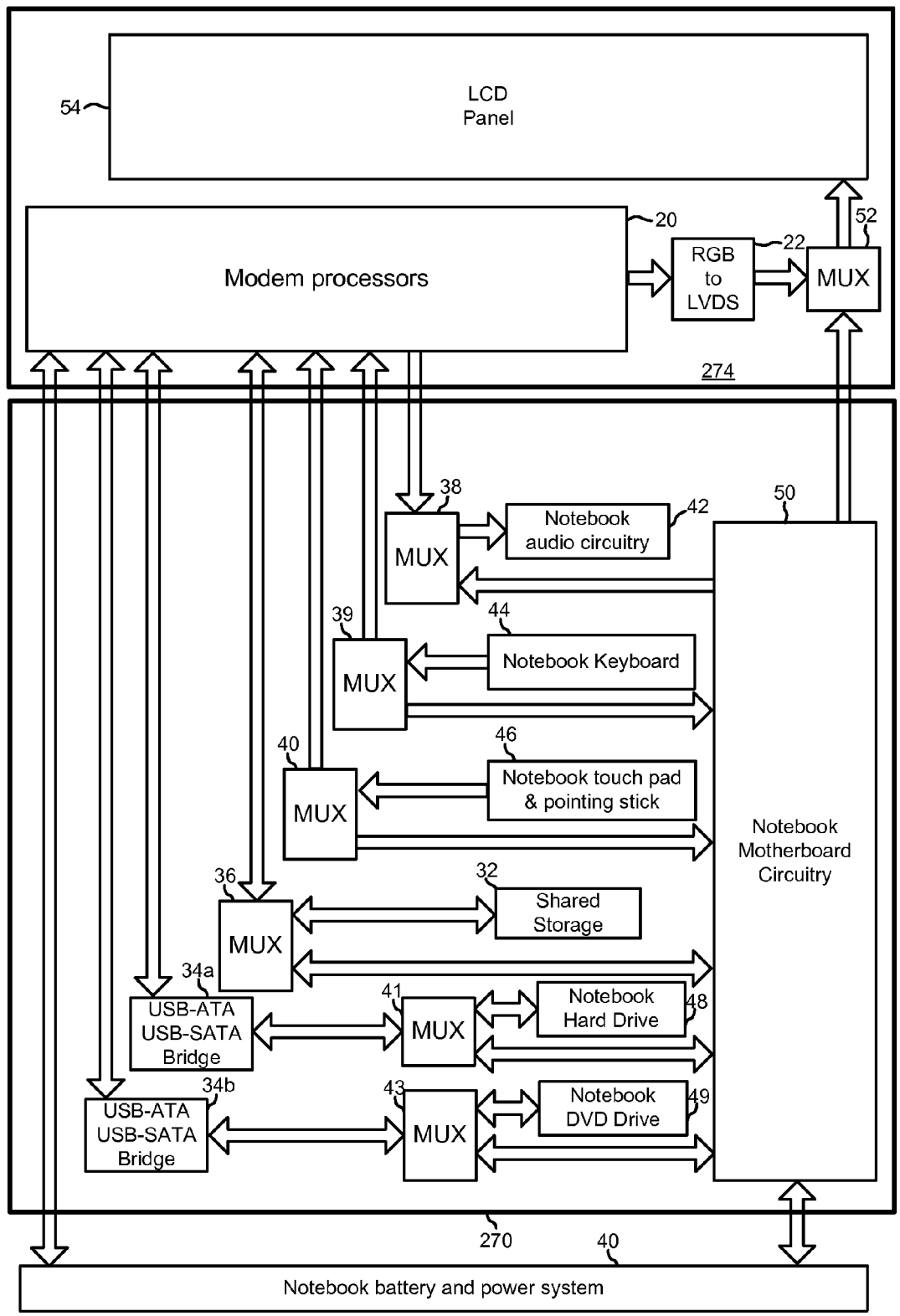
FIGS. 8A and 8B are circuit block diagrams of a portion of a computer according to further alternative embodiments.

FIG. 8A illustrates an alternative architecture in which the auxiliary processor 20 is positioned within the display housing 274 which includes the display 54. This architecture may be advantageous in notebook computers since positioning the wireless modem card 2 within the display housing 274 places the transceiver in a relatively low noise portion of the notebook computer and in close proximity to the built-in antennas which are typically positioned within the display housing 274. Also, positioning the wireless modem card 2 in the display housing 274 means that the connector between antennas and the transceiver does not have to pass through the hinge between the display housing 274 and the base housing 270 of the notebook computer. In the architecture illustrated in FIG. 8, communications between the auxiliary processor 20 and the motherboard circuitry 50 are accomplished via a series of multiplexer circuits 38, 39, 40, 36, 41, 43, 52, so the descriptions above with reference to FIGS. 2 and 6A of like numbered components are applicable to FIG. 8A as well.

Figure 8B:
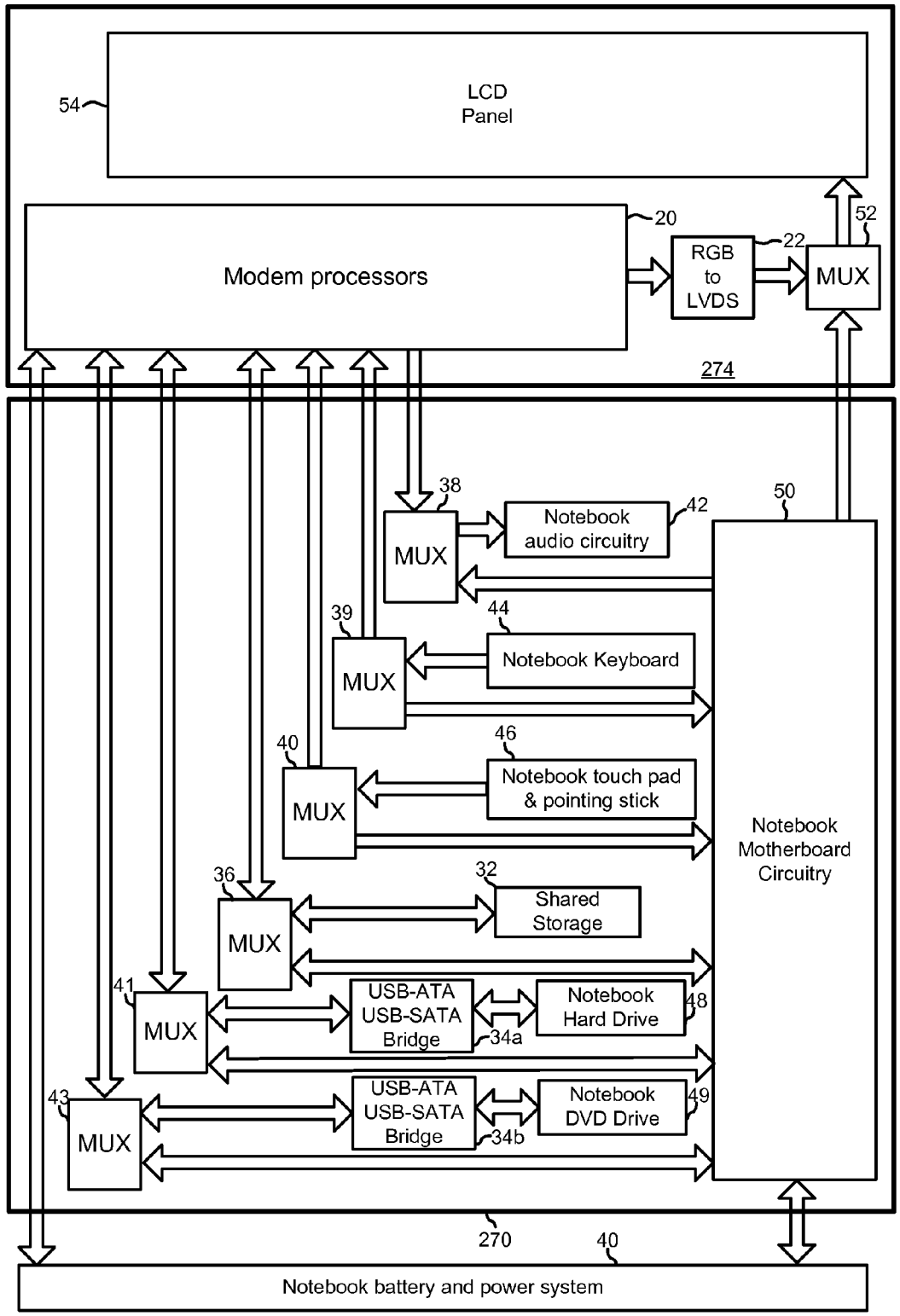

The architecture illustrated in FIG. 8B is similar to that in FIG. 8A except that the motherboard circuitry 50 and auxiliary processor 20 access the computing device hard drive 48 and DVD drive 49 through common USB-ATA or USB-SATA bridges 34a, 34b, respectively, which are addressed via multiplexers 41, 43, respectively. Like FIG. 8a, the descriptions of like numbered components provided above with reference to FIGS. 2 and 6B apply to the components shown in FIG. 8B.

Figure 9:
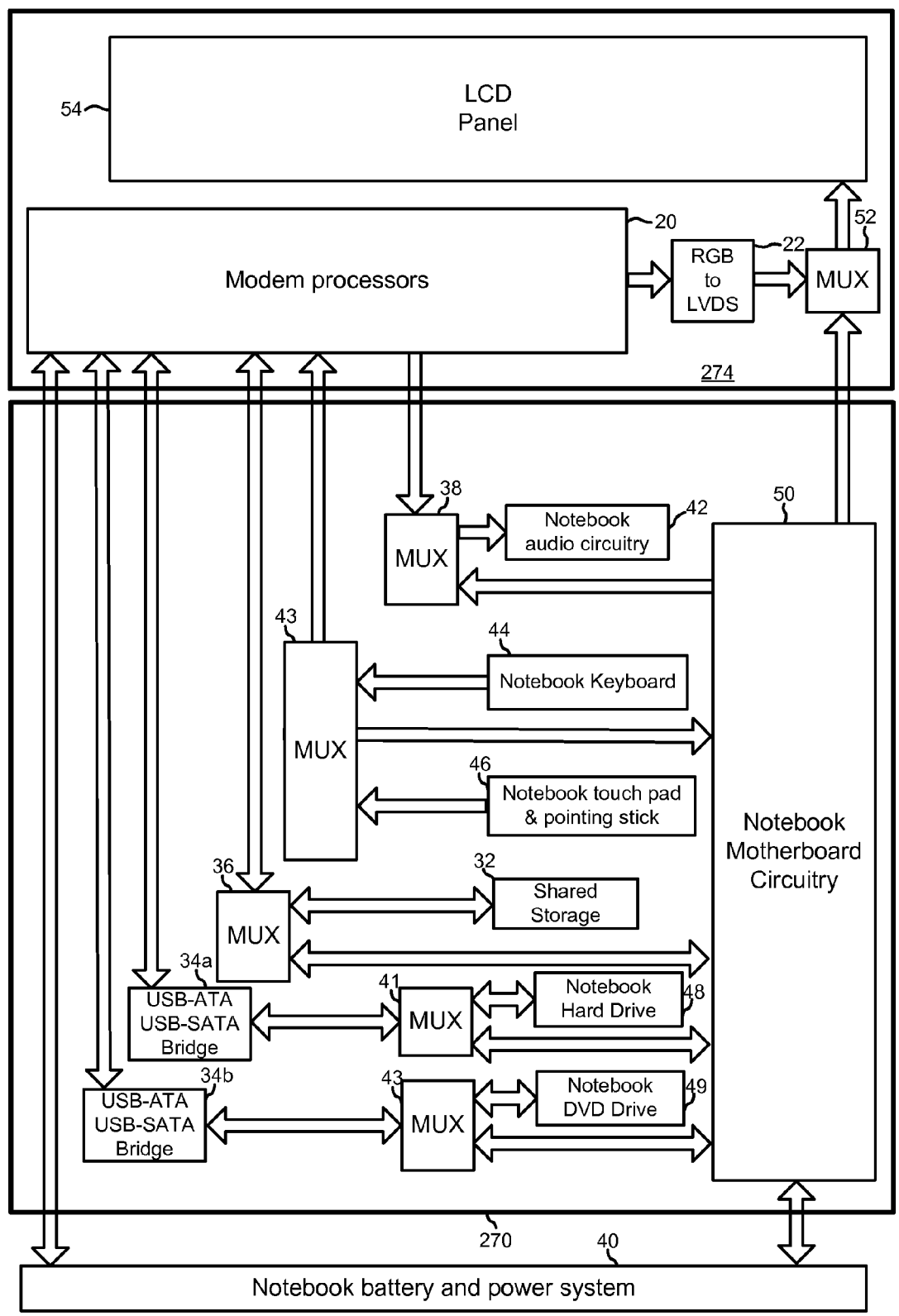
FIG. 9 is a circuit block diagram of a portion of a computer according to a further alternative embodiment.

FIG. 9 illustrates an alternative architecture that is similar to the architecture illustrated in FIG. 7 with the exception that the wireless modem card 2 and its auxiliary processor 20 are positioned within the display housing 274. Accordingly, the descriptions above with reference to FIGS. 2 and 7 of like numbered components are applicable to FIG. 9 as well.

Figure 10A:
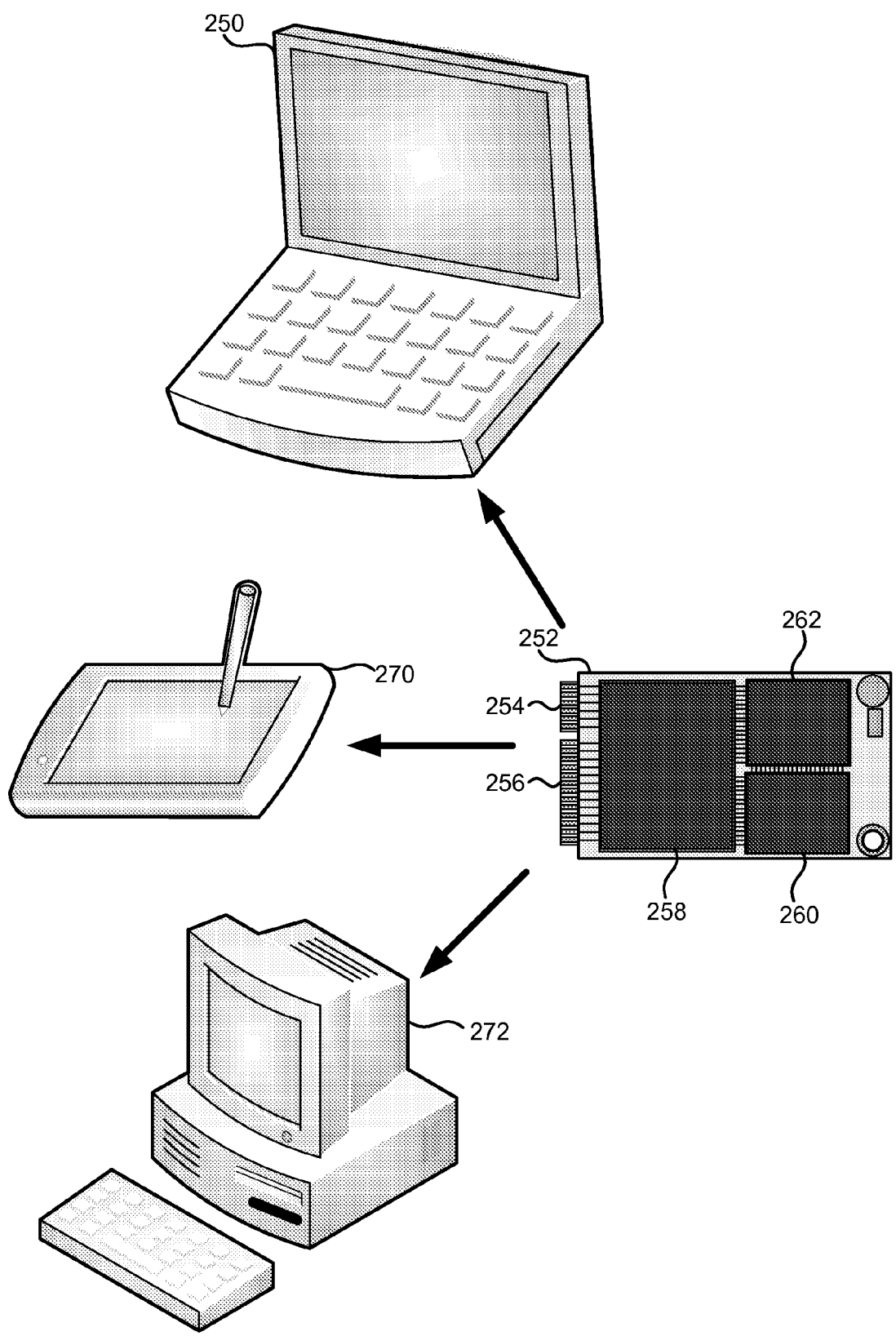
FIG. 10A is an illustration of a wireless modem card that may be implemented in various computing devices according to an embodiment.

In a preferred embodiment, the auxiliary processor 20 may be included within a wireless modem card 2 or chipset that can be connected to a variety of standard computer bus architectures. FIG. 10A illustrates an example layout of an integrated wireless modem card 252. In this form factor, the wireless modem card 252 may include a dual processor chip 260, a radio frequency transceiver chip 262, and a combined interface circuitry chip 258 which serves as an input/output interface to electrical connectors 254, 256. The electrical connectors 254, 256 are configured to slide into and electrically connect with matching connector clips coupled to the computing device motherboard 50, such as with a standard connection bus like a PCMCI connector, PCI Minibus Express or PCI Minicard provided on the motherboard 50. In some embodiments, the radio frequency transceiver chip 262 may include both a cellular telephone network transceiver and an IEEE 802.11 (WiFi) transceiver, as well as a GPS receiver. Although FIG. 10A shows a wireless modem card 252 including only three large integrated circuits, one of skill in the art would appreciate that the components of such a device may be integrated within more or fewer integrated circuits and in a variety of different form factors.

Providing a wireless modem card 252 in a standard form enables the card to be implemented within a variety of different computing devices. For example, the same basic wireless modem card 252 having the capability to take over operation with an auxiliary processor could be incorporated into a notebook computer 250, a tablet computer 270 or PDA, or a desktop computer 272.

Figure 10B:
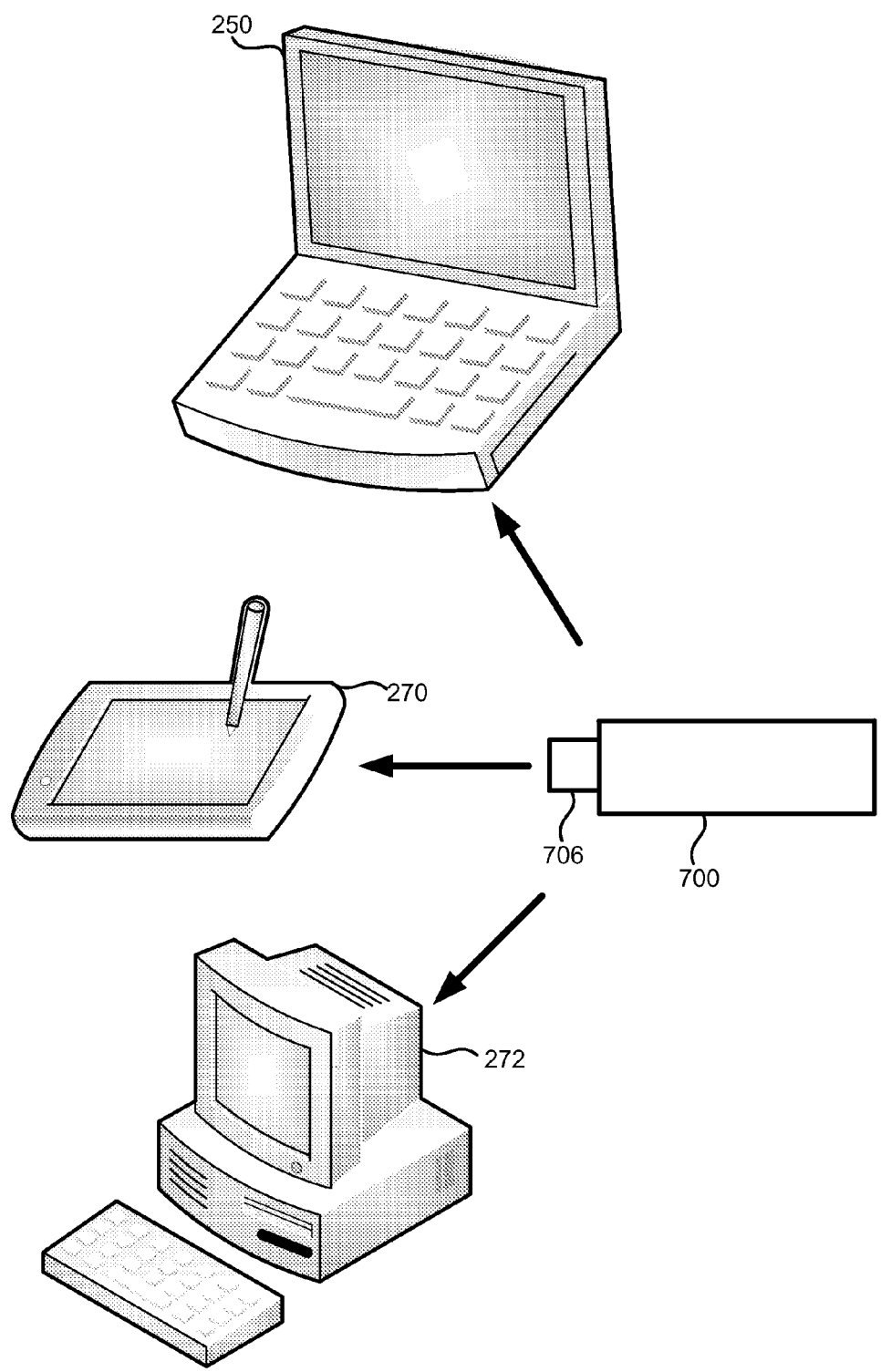
FIG. 10B is an illustration of a wireless modem in a USB device that may be used with various computing devices according to an embodiment.

In another embodiment illustrated in FIG. 10B, a portable USB modem device 700 may be configured in a small package with a built in USB connector 706, and include a MSM/MDM configured and programmed according to the various embodiments. Further description of components included within a portable USB modem device 700 are provided below with reference to FIG. 30. A battery may be included within the portable USB modem device 700 to power the MSM/MDM when it is undocked from a computing device, enabling the MSM/MDM to remain on and receiving data and messages from a wireless communication network. Such portable USB modem device 700 can be carried in the pocket of a user like a USB memory device or a fat credit card. The USB hub enables the device to be plugged into computers 250, 270, 272 or peripherals (not shown), such as larger displays or printers. When plugged into a computer 250, 270, 272 or a peripheral, such a portable modem device may act as 3G modem and/or auxiliary processor as described above with communications with the computer or peripheral motherboard accomplished through the USB port in a manner similar to the embodiments described above. Also, the portable USB modem device 700 may function as an auxiliary processor while plugged into a computer 250, 270, 272, enabling computer functions and applications to remain available while the computer's CPU is powered down, such as to conserve battery power. When removed from a computer or peripheral, the MSM/MDM can remain on and connected to an external wireless communication system (i.e., operating in auxiliary processor mode) to continue to receive e-mails and data running on battery power. Then when the user plugs the portable USB modem device 700 back into a computer 250, 270, 272, the user's messages are instantly available, eliminating the need to download messages to view them on the computer.

It should be noted that a portable USB modem device 700 may not be configured to control all computer peripherals, such as a computer's display, or to control some peripherals in a slower-access/refresh mode consistent with the data transmission capabilities of the USB bus connection.

Figure 11:
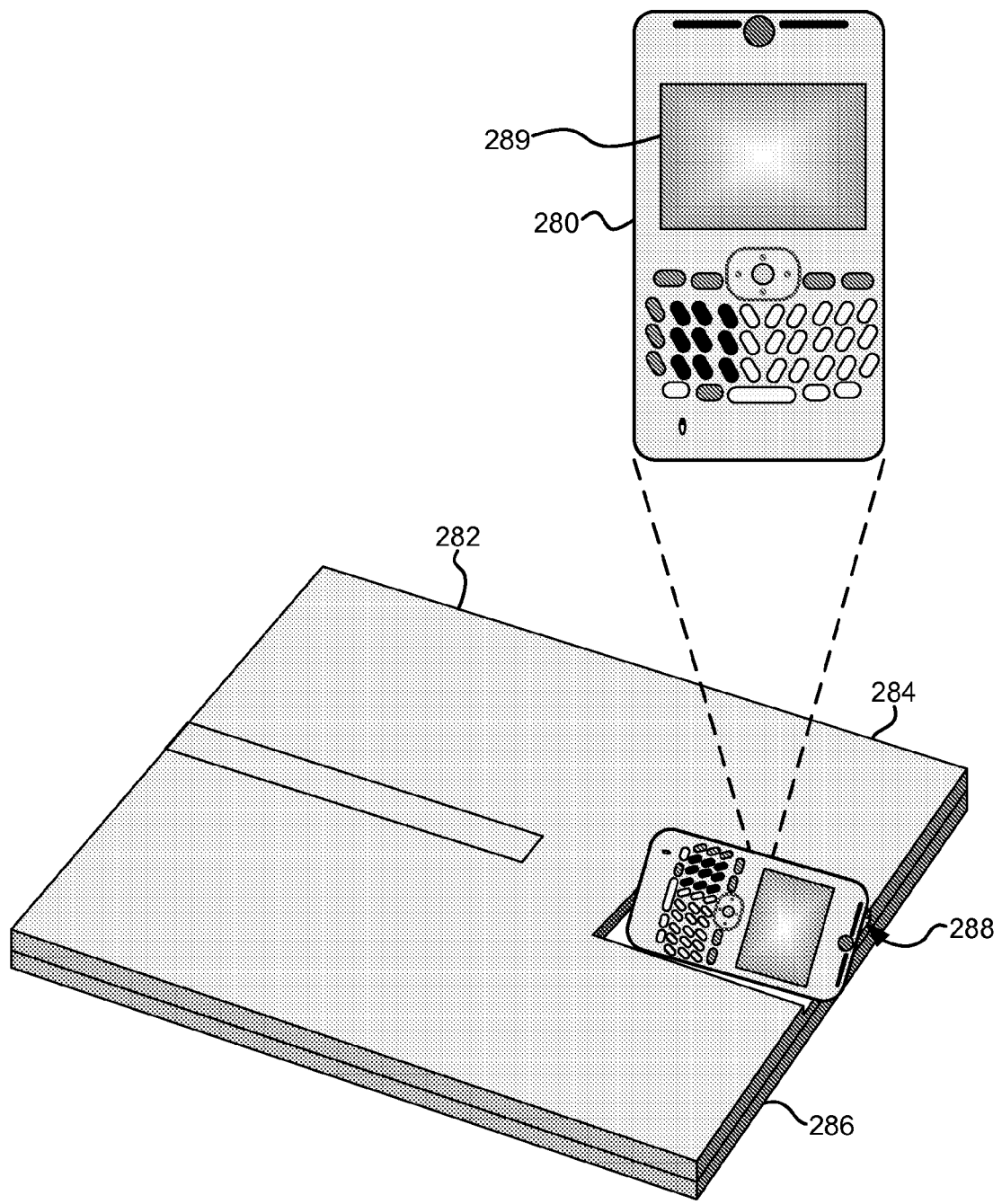
FIG. 11 is an illustration of an embodiment in which the wireless modem processor is implemented within a mobile device that can be plugged into a personal computer.

In a particular embodiment illustrated in FIG. 11, the wireless modem incorporating power efficient coprocessors may be incorporated as the airlink of a cellular telephone 280. In this configuration, the processors associated with the wireless modem controls the functions of the cellular telephone 280. In a further embodiment, such a cellular telephone 280 may be configured as a detachable cellular telephone which can plug into a personal computer, such as a notebook computer 282. Such a notebook computer 282 may include a receiver slot 288 into which the cellular telephone 280 can be inserted, such as in the display portion 284. The cellular telephone 280 and the receiver slot 288 could include connector sockets and leads to enable the wireless modem processor within the cellular telephone 282 to connect to the motherboard of the notebook computer 282 such as illustrated in FIGS. 6A-9. Such connections may be via an interface chip within the computer 282 (not shown) which provides a series of multiplexer circuits such as described above with reference to any of FIGS. 2-9. Additionally, the electrical connectors between the cellular telephone 280 and the receiving slot 288 may include a connection to the battery system of the notebook computer 282 so that the cellular telephone 280 can draw power from the computer's battery when inserted.

While FIG. 11 shows a detachable cellular telephone configuration, a similar embodiment involves connecting a cellular telephone to the computer via a data cable, such as a USB cable (not shown). Such a cable-connected cellular telephone could employ a cable that provides the same connectivity and control as a connector socket within a receiver slot 288.

The embodiment illustrated in FIG. 11 would enable users to access wireless networks on their notebook computer 242 whenever their cellular telephone 280 is inserted into the receiving slot 288. When not using their notebook computer 282, users could use their cellular telephones in a conventional manner. Further, the notebook computer 282 and the cellular telephone 280 may be configured according to the various embodiments so that the processor and the cellular telephone 280 can function as a low-power auxiliary processor of the notebook computer 282. When the cellular telephone 280 is installed in the receiving slot 288, the notebook computer 282 CPU may be deenergized, thereby enabling the computer to operate in the auxiliary processor mode with the always on, instant on, and always connected operational features enabled by the various embodiments. When cellular telephone 280 is installed in the receiving slot 288, the phone's display 289 may serve as a secondary display for the computing device, such as allowing users to view e-mail and documents while the notebook computer 282 is in the closed configuration. In an embodiment, the notebook computer 282 may be able to function normally, albeit without access to a wireless network, when the cellular telephone 280 is not installed.

Figure 30:
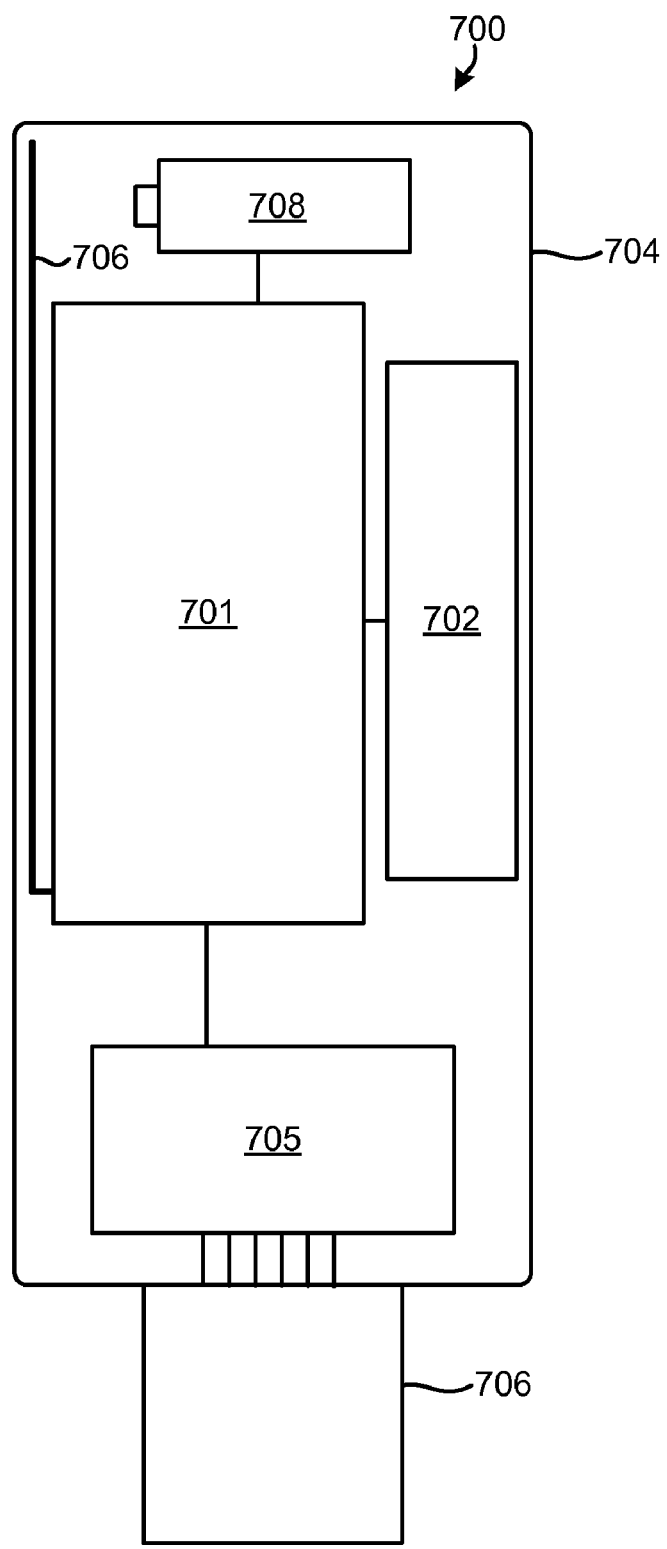
FIG. 30 is a component block diagram of an embodiment portable modem device suitable for use with the various embodiment systems and methods.

Similar to the detachable cellular telephone 280, a processor within other detachable components may be used as the auxiliary processor according to the various embodiments. For example, the processor within a detachable CD or DVD player that plugs into a receiver slot 288 for such a device may function as the auxiliary processor. Similarly, an auxiliary processor may be configured within a USB device that can plug into a USB port as illustrated in FIGS. 10B and 30 (which may be functionally similar to the receiver slot 288). For example, the processor within a USB wireless network connection modem 700 could be configured to function as the auxiliary processor when the device is plugged into a USB port of the computer. As another example, the auxiliary processor may be packaged as a dedicated auxiliary processor USB device that functions as the auxiliary processor when plugged into a USB connection but has no other function or purpose.

Similar to the preceding embodiments, a processor within a peripheral device coupled to the computer by a cable may function as the auxiliary processor. For example, the processor within a printer, an external multi-function device, an external modem, an external router, an external compact disc (CD) player, or an external DVD player could serve as the auxiliary processor of the various embodiments.

In the various embodiments, processes may be implemented to ensure that current operating states, system data and application data are maintained while processing control shifts from the computing device CPU to the auxiliary processor and back again.

Figure 12:
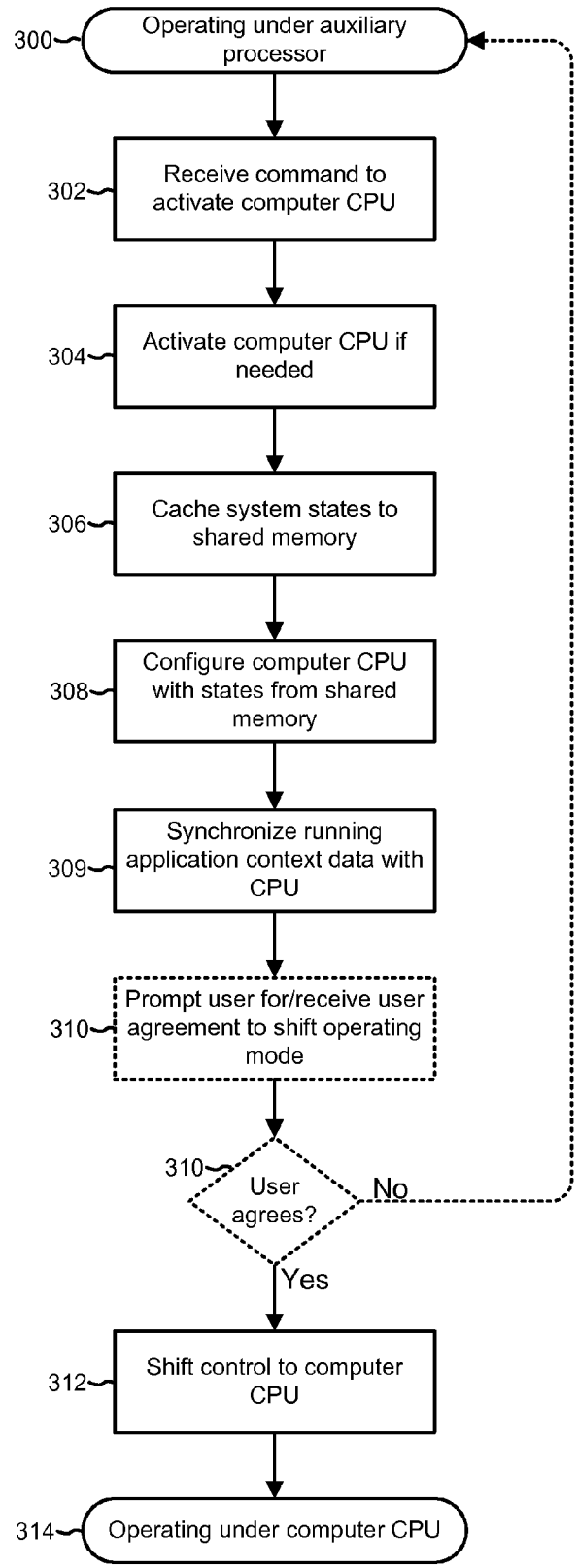
FIG. 12 is a process flow diagram of an embodiment method for shifting processing control from a wireless modem processor to a computer CPU.

An example embodiment method by which processing control may be shifted from an auxiliary processor (e.g., a wireless modem processor) to the computing device CPU is illustrated in FIG. 12. Before the transition illustrated in FIG. 12 begins, the computing device is operating under the control of the auxiliary processor, step 300. Various actions or events may require or prompt the transfer of control to the computing device CPU. For example, a user may initiate activation of the computer's CPU, such as by selecting a menu, pressing a particular button, or opening the display portion of a notebook or netbook computer. As another example, a user interaction with an application may require activation of the computer's CPU, such as when a user makes inputs to edit a document (e.g., text, spread sheet, image, e-mail message, calendar entry, etc.) that is being displayed in a document viewing application running on the auxiliary processor. If the user editing command is not supported by the auxiliary processor application, the CPU may be activated so the corresponding CPU application can be used to implement the user's action. A further example is a message received from a network, such as a wireless network, including a command to activate the computer's CPU to perform a particular function. Regardless of the source, the auxiliary processor may receive the command or signal to activate the computer's CPU, step 302. In this step, the determination to activate the CPU may be made automatically, such as when the auxiliary processor determines it cannot support a function indicated by a user action, by user action, such as a but press or memory selection to activate the CPU mode, or automatically with a prompt requesting user approval to switch to the CPU mode. If the computer's CPU is presently deactivated, such as in a powered down, standby or sleep mode, the auxiliary processor may signal the computer's CPU to begin its startup sequence, step 304. This step enables the computer's CPU to begin its boot or standby recovery process so that the CPU will be ready to take over processing. If the computer's CPU is already activated, this step may not be necessary.

To prepare for transitioning control to the computer's CPU, the auxiliary processor may cache system state information, overall system data, current application data and application context data in shared memory, step 306. In doing so, the auxiliary processor may load into the shared memory all of the information that the computer's CPU will require in order to take over processing with minimal disruption to the user. Cached system information may include data associated with the current display, state information regarding current processes, state information regarding the current power management condition, identification of the applications currently operating, and application data associated with the operating condition.

Instead of caching system information in shared memory, the CPU may communicate system information to the auxiliary processor via a communication channel (e.g., communication channel 56 described above with reference to FIG. 2) in step 306. In this step 306, the information required by the auxiliary processor to take over control may be communicated, including such information as the currently open applications, memory addresses of data stored in random access memory (i.e., shared memory) of currently open applications, as well as other state information.

In a further embodiment, the CPU may store a portion of system state information, overall system data, current application data and application context data in shared memory and communicate the remaining portion of system state information, overall system data, current application data and application context data via a shared channel in step 306.

If the computer's CPU is active or as it becomes activated, it may execute a transition routine to access the state information stored in the shared memory and/or received via a communication channel, and configure itself to take over control of the computer functions, step 308. As part of this step, the CPU may use the state information stored in the shared memory to configure its own states so that a comparable operating condition can be executed upon taking control. Also, the CPU may determine the applications currently running on the auxiliary processor, load the corresponding full versions of those applications, and load application data from shared memory.

As part of preparing for a transition of control from the auxiliary processor to the CPU currently running applications may be synchronized between the two processors, step 309. The objective of synchronizing running applications is to provide a smooth transition of application functionality from the user's perspective. Further description of the process of synchronizing applications is provided below with reference to FIG. 14.

Optionally, the computer's CPU or the auxiliary processor may generate a display prompting a user to confirm or agree with transferring operational control, and thus changing operating modes, prior to shifting control to the CPU, optional step 310. In this step, a display may be generated warning the user that a shift in control to the CPU is about to occur and requesting the user to strike one or more keys to agree such a shift or strike one or more other keys to abort the control shift process. The auxiliary processor and computer's CPU may receive the user's input and determine whether the user has agreed to the control switch, optional determination 311. If the auxiliary processor and computer's CPU determine that the user input corresponds to agreement (i.e., determination 311="Yes"), the auxiliary processor and computer's CPU may accomplish the control shift by proceeding to step 312. If the auxiliary processor and computer's CPU determine that the user input corresponds to disagreement or a command to abort the process (i.e., determination 311="No"), the control switch may be aborted by returning to processing under control of the auxiliary processor, returning to operating condition 300. The requirement for a user confirmation may not be implemented, may be implemented as an integral process, or may be implemented as user-configurable functionality.

Once the computer's CPU has configured itself for operation and loaded the appropriate applications and application data into working memory, and optionally received user authorization to proceed, the auxiliary processor and computer's CPU cooperate to shift control to the CPU, step 312. This shift in control may occur in a single step or may be accomplished in a series of steps depending upon the implementation. Once the shift is accomplished, processing can continue under control of the computer's CPU, step 314. At this point, the auxiliary processor may shift into the normal operating mode, which in the case of a wireless modem processor may be limited to supporting wireless modem card functions.

In an embodiment, the auxiliary processor may utilize FLASH memory when operating applications. In such an embodiment, the auxiliary processor may copy overall system data, application data and application context data from its FLASH memory to random access memory more available to the CPU, such as memory on the computer motherboard 50. Such FLASH memory may be within the component (e.g., MSM/MDM card), on the motherboard 50 or on both platforms.

Figure 13:
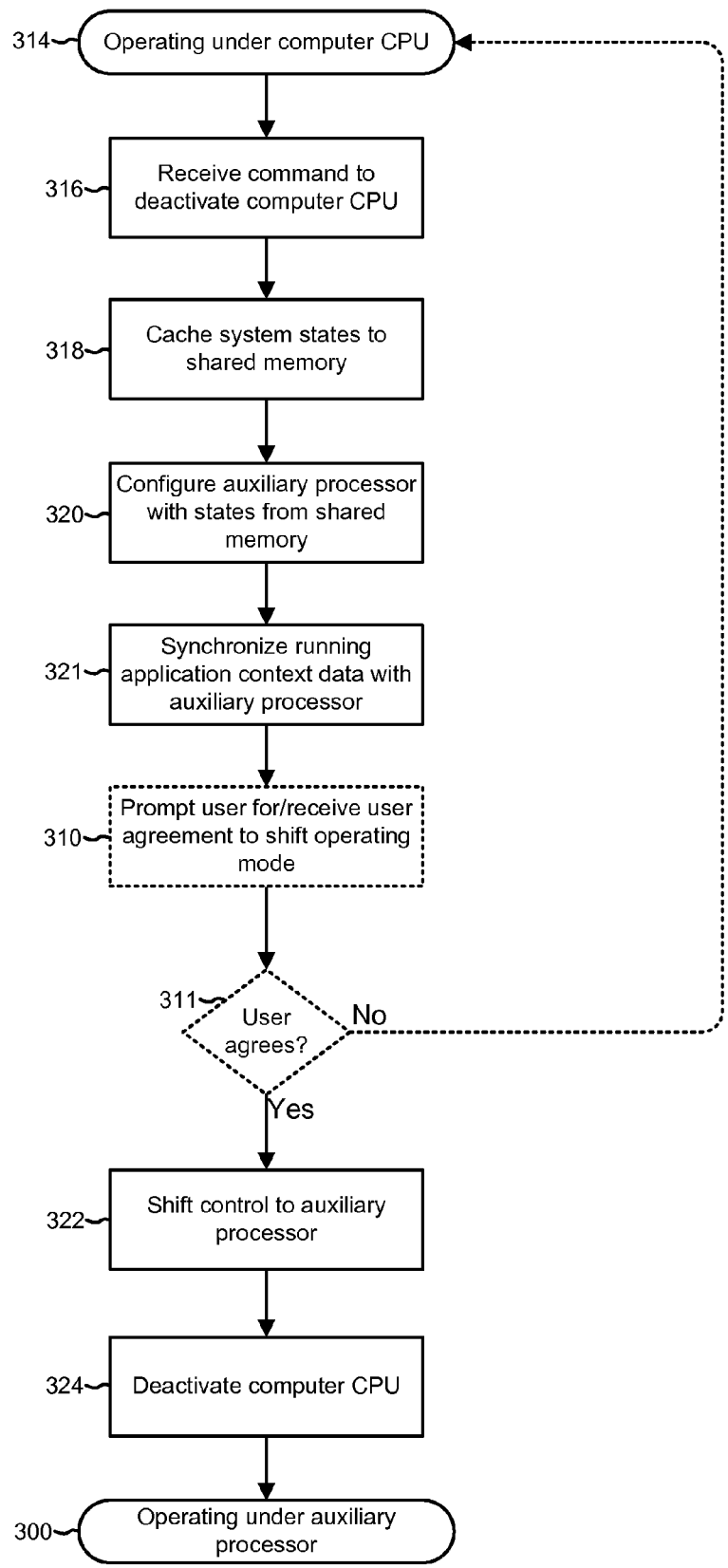
FIG. 13 is a process flow diagram of an embodiment method for shifting processing control from a computer CPU to a wireless modem processor.

An example embodiment method by which processing control may be shifted from the computing device CPU to an auxiliary processor (e.g., a wireless modem processor) is illustrated in FIG. 13. Before the transition illustrated in FIG. 13 begins, the computing device is operating under the control of the computer's CPU, step 314. Various actions or events may require or prompt the transfer of control to the auxiliary processor. For example, a user may initiate actions to conserve the computer's battery life, such as by selecting a menu, pressing a particular button, or closing the display portion of a notebook computer. As another example, a user interaction with an application may trigger activation of the auxiliary power mode, such as when a user activates an audio or DVD player application. A further example is a message received from a network, such as a wireless network including a command to activate the auxiliary power mode. Regardless of the source, the computer's CPU may receive the command or signal to transition to the auxiliary power mode, step 316. Since the auxiliary processor may already be energized, such as when it is a component of a wireless modem card, there may be no need to activate that processor is part of initiating the transition.

To prepare for transitioning control to the auxiliary processor, the computer's CPU may cache system state information, overall system data, current application data and application context data in shared memory, step 318. In doing so, the computer's CPU may load into the shared memory all of the information that the auxiliary processor will require in order to take over processing with minimal disruption to the user. Cached system information may include data associated with the current display, state information regarding current processes, state information regarding the current power management condition, identification of the applications currently operating, and application data associated with the operating condition.

Instead of caching system information in shared memory, the auxiliary processor may communicate system information, overall system data, current application data and application context data to the CPU via a communication channel in step 318. In this alternative step 318, the information required by the CPU to take over control from the auxiliary processor may be communicated, including such information as the currently open applications, memory addresses of data stored in random access memory (i.e., shared memory) of currently open applications, as well as other state information.

In a further embodiment, the auxiliary processor may store a portion of system state information, overall system data, current application data and application context data in shared memory and communicate the remaining portion of system state information, overall system data, current application data and application context data via a shared channel in step 318.

The auxiliary processor may execute a transition routine to access the state information stored in the shared memory and/or received via a communication channel, and configure itself to take over control of the computer functions, step 320. As part of this step, the auxiliary processor may use the state information stored in the shared memory to configure its own states so that a comparable operating condition can be executed upon taking control. Also, the auxiliary processor may determine the applications currently running on the computer's CPU, load the corresponding scaled down versions of those applications, and load application data from shared memory.

As part of preparing for a transition of control from the CPU to the auxiliary processor currently running applications may be synchronized between the two processors, step 321. Again, the objective of synchronizing running applications is to provide a smooth transition of application functionality from the user's perspective. Further description of the process of synchronizing applications is provided below with reference to FIG. 14.

As described above with reference to FIG. 13, the computer's CPU or the auxiliary processor may optionally generate a display prompting a user to confirm or agree with transferring operational control, and thus changing operating modes, prior to shifting control to the auxiliary processor, optional step 310. In this step, a display may be generated warning the user that a shift in control to the auxiliary processor is about to occur and requesting the user to strike one or more keys to agree such a shift or strike one or more other keys to abort the control shift process. The auxiliary processor or computer's CPU may receive the user's input and determine whether the user has agreed to the control switch, optional determination 311. If the auxiliary processor and computer's CPU determine that the user input corresponds to agreement (i.e., determination 311="Yes"), the auxiliary processor and computer's CPU may accomplish the control shift by proceeding to step 322. If the auxiliary processor and computer's CPU determine that the user input corresponds to disagreement or a command to abort the process (i.e., determination 311="No"), the control switch may be aborted by returning to processing under control of the CPU, returning to operating condition 314. As mentioned above, this optional user confirmation step may not be implemented, may be implemented as an integral process, or may be implemented as user-configurable functionality.

Once the auxiliary processor has configured itself for operation and loaded the appropriate applications and application data into working memory, the modem processor and computer's CPU may cooperate to shift control to the auxiliary processor, step 322. This shift in control may occur in a single step or may be accomplished in a series of steps depending upon the implementation. Once the shift is accomplished, processing can continue under control of the auxiliary processor, step 300. At this point, the computer's CPU may be powered down or placed in a low power state, such as a standby or sleep mode, in order to conserve battery power. In addition to powering down the computer's CPU, other computer components and peripherals may be powered down to further conserve battery power.

As part of transitioning from the CPU to the auxiliary processor, or vice versa, applications running on the auxiliary processor may be synchronized with corresponding applications running on the computing device CPU. As mentioned above, the CPU and the auxiliary processor may operate under different operating systems (e.g., Windows® vs. BREW®) and run different applications. For example, the auxiliary processor may run document viewers without full editing functions or slimmed down versions of applications that run on the CPU. To enhance the user's experience, the corresponding applications that run on the two processors may behave in a substantially similar and consistent manner and have access to substantially the same set of application data. Further, it would be beneficial if the transition from one processor to the other has minimal impact on the user's interaction with open applications. If such performance is achieved the user may be mostly unaware of the particular processor that is in control, and the user's ability to use an application may be minimally impacted by the processor in control or the switch from one processor to the other.

One method for synchronizing applications among the CPU and the auxiliary processor uses a dual port access to the computing device hard drive 48. At the hardware level this may be accomplished by multiplexing a SATA or parallel ATA interface 34a to the hard drive 48, such as illustrated in FIGS. 2-9. Frequent use of the hard drive 48 while operating under control of the auxiliary processor will increase power consumption and reduce the duration of operation under the battery. Therefore, applications running on the auxiliary processor may be configured to minimize accesses of the hard drive 48.

Figure 14:
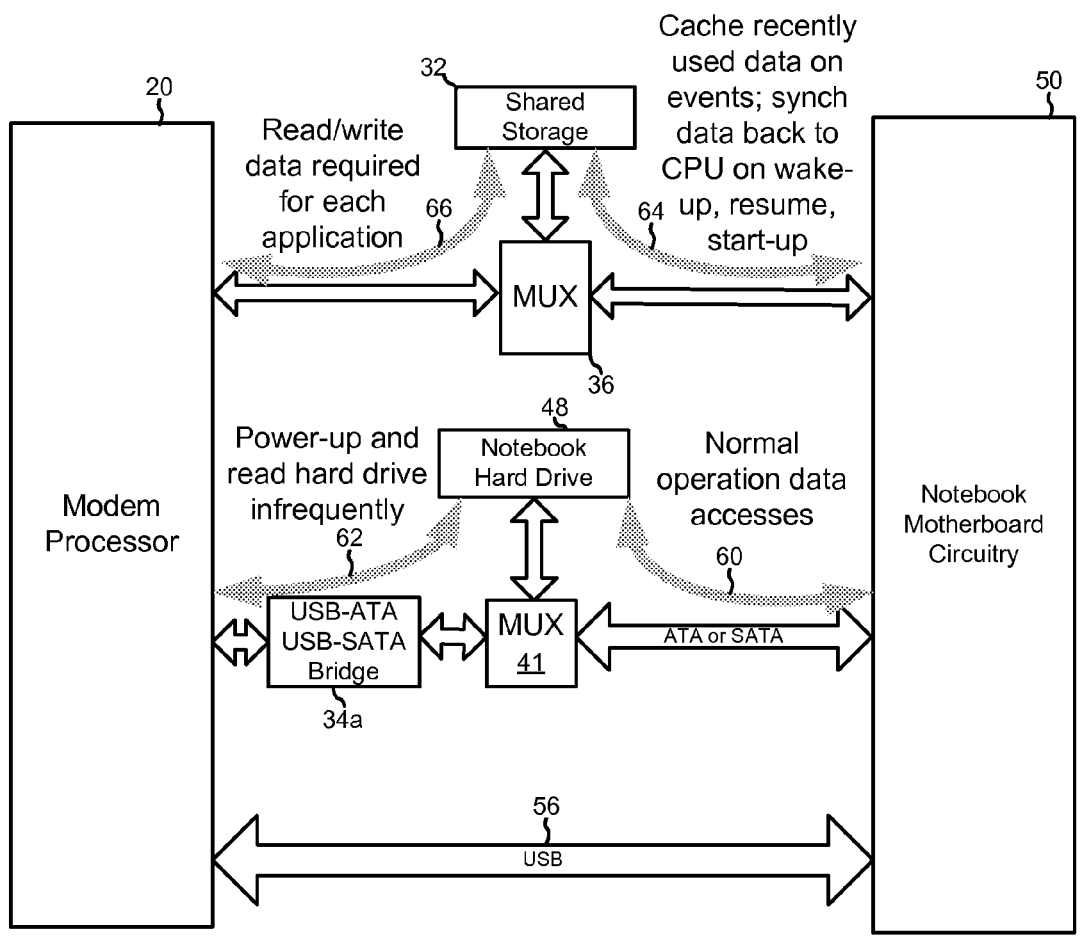
FIG. 14 is a circuit block diagram of a portion of a computer showing data flows among components and data storage components according to a further alternative embodiment.

Another method for synchronizing applications employs common shared storage that is configured to act as a cache for frequently used shared system and application data, including open application data. A simple diagram of this concept is illustrated in FIG. 14. When the notebook computer is powered up in the CPU mode, the shared storage and the hard drive may be accessed by the CPU. Conflicting accesses to shared storage and the hard drive may be minimized since only the processor in control will normally access such components. Conflicts during a control transition process may be avoided by signaling between the two processors. When the CPU begins to shutdown, or go into a standby or hibernation state, overall system data and frequently used application data may be written to the shared flash storage. Doing so may enable the auxiliary processor to access the data when it is active and in control of processing. Occasionally the applications operating on the auxiliary processor may need access to data that has not been cached in the shared storage. In that case the auxiliary processor may power up the hard drive 48 and read the required information, store the information locally in RAM or in the shared storage, and then power down the hard drive 48. When the CPU has a wake-up, resume, or start-up event, the application data and application context stored in the shared flash storage may be synchronized with data on the hard drive 48.

A second synchronization process involves file compatibility and synchronization of application data and application context between the CPU and the auxiliary processor. This synchronization may be accomplished for every auxiliary processor application that has a corresponding application in the CPU operational mode. To enable this synchronization work well, an open interface data definition may be provided for every application. Alternatively, the applications running on the auxiliary processor may be of a compatible type, such as Microsoft Windows Mobile® applications which should synchronize well with their Windows XP® counterparts. Where compatible applications do not currently exist, new auxiliary processor applications may be written that can operate with the same file structure of corresponding CPU applications, such as iTunes, Eudora, and Firefox.

In the process of synchronizing the applications, the application context data should be transferred as well (see step 310 in FIG. 12 and step 321 in FIG. 13). Table 1 below lists some examples of the application context data as well as application data that may be synchronized across the two processors for common applications. As mentioned above, the application context data may be synchronized between the two processors by storing the data in shared storage or by communicating the data from one processor to the other through a communication channel 56.

TABLE 1

| Application | App. Data | App. Context Examples |
|---|---|---|
| Email | Email messages<br>Mail folders<br>attachments | Messages that have been opened<br>All email client preferences<br>email accounts information |

TABLE 1-continued

| Application | App. Data | App. Context Examples |
|---|---|---|
| Calendar | Calendar items | Calendar app preferences |
| Media player | Media library<br>(compatible file<br>formats, and DRM<br>compatibility | Playlists<br>User preferences<br>Media play-count, personal rating,<br>audio volume |
| Browser | Bookmarks/Links | User preferences<br>Security settings<br>Plug-ins (e.g. Google Toolbar) and<br>their preferences<br>Favicons |
| DVD player | n/a | Chapter and time of currently<br>playing DVD |

An embodiment process utilizing shared memory is illustrated in FIG. 14. In this embodiment, the communication channel 56 between the motherboard circuitry 50 and the auxiliary processor 20 may be used for network (e.g., WAN) communications during operations under control of the CPU, as well as for signaling that a transition from one processor to the other may commence. During CPU operations the hard drive 48 may be accessed frequently by the CPU 50 in the normal manner via data access 60, but during auxiliary processor operations, the hard drive 48 may be accessed by the auxiliary processor 20 only infrequently via data access 62 in order to minimize the power drain on the battery. Prior to or at the time of a switch of control from the CPU 50 to the auxiliary processor 20, such as CPU on events like standby, hibernate or shutdown, the CPU may cache recently used data to the shared storage 32 via data access 64. To synchronize application data and application context data with corresponding applications running on the auxiliary processor 20, the auxiliary processor may read such data for each application from the shared storage 32 via data access 66. When control is shifted back from the auxiliary processor 20 to the CPU 50, the process may be reversed, with the CPU synchronizing data back to the CPU from the shared storage 32 upon a wake-up, resume or start-up event.

To enable the auxiliary processor to take over control from the CPU, and vice versa, a variety of information must be communicated from one processor to the other. This information may include, for example, a list of applications currently running, application data being used by running applications, and application context data as described above. Examples of application information include, e-mail messages, attachments of e-mail messages, open documents, book marks on a web browser, media libraries, etc. Additionally, information regarding computer systems and peripherals may be communicated, such as on-going network connections and wireless data calls (e.g., IP addresses and port numbers of connected services and sockets), peripheral device usage and status, and power system status and condition. Other system state information may also need to be communicated from one processor to the other. For ease of reference without limiting the scope of the disclosure or the claims, the application, peripheral and computer status information communicated between the two processors in a transfer of control is sometimes referred to herein as "operating state information" since the information concerns or describes the operating state of the computer at the time control is transferred. As used herein, the term "operating state information" is not limited to information of a state machine.

Figure 15:
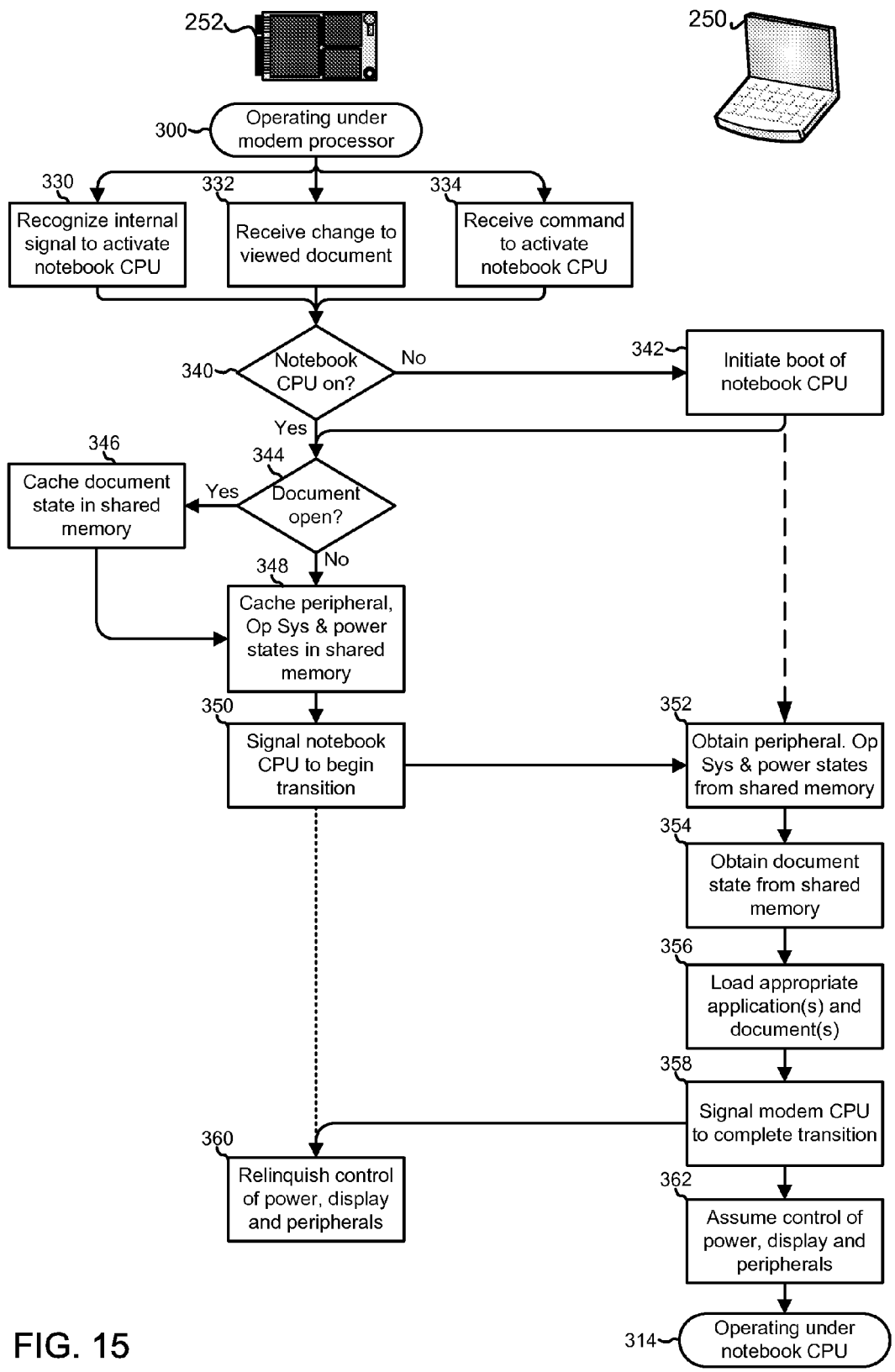
FIG. 15 is a process flow diagram of embodiment methods that may be implemented within a wireless modem processor and a computer CPU for shifting processing control from the wireless modem processor to the computer CPU.

FIG. 15 illustrates processes of a particular embodiment for transferring operational control from a wireless modem card 252 within a notebook computer 250 to the notebook computer's CPU. When the computer is operating under control of the modem processor, step 300, it may receive a variety of signals informing it to begin a shift of control to the computer's CPU. As a first example, the modem processor may recognize internal signals to activate the computer's CPU, step 330, such as in response to a received message or recognized condition in an application. As a second example, the modem processor may receive user input indicating a desire to change a document which is presented on the displayed by a document viewer application that is unable to support editing or similar modifications, step 332. As a third example, the modem processor may receive a command input from a user to activate the computer's CPU, step 334, such as a press of the computer's power button, selection of a power up menu option, opening of the notebook computer, or other user input.

When the modem processor recognizes a need to activate the computer's CPU it may determine whether the CPU is currently energized, determination 340. If the CPU is not energized (i.e., determination 340="No"), the modem processor may issue a command to boot up the CPU, step 342. The processes involved in energizing the computer's CPU will depend upon the state in which the CPU exists at the time. If the CPU is completely de-energized, a cold boot routine may need to be executed. On the other hand, if the CPU is in a standby or sleep mode, and then only those processes associated with restoring the CPU to full power functioning will be ex-cute.

If the computer CPU is active (i.e., determination 340="Yes") or after the CPU boot process has been initiated (step 342), the modem processor may determine whether there are any documents currently open on the computer, determination 340. If a document is open (i.e., determination 340="Yes"), the modem processor may cache the document and state in shared memory, step 346. If no document is open (i.e., determination 340="No") or after the open document state has been saved in shared memory (step 346), the modem processor may save into shared memory information regarding the state of the computer's peripherals, operating system, power management, and similar operational conditions, step 348.

As described above, instead of caching system information in shared memory, the CPU may communicate system information to the auxiliary processor via a communication channel in steps 346 and 348. In this alternative, the operating state information required by the auxiliary processor to take over control may be communicated, including such information as the currently open applications, memory addresses of data stored in random access memory (i.e., shared memory) of currently open applications, as well as other state information.

Once all of the application data and operating state information has been cashed in shared memory or communicated to the modem processor, the modem processor may signal to the computer's CPU that it is ready to switch control to the CPU, step 350. This signal may be in the form of an interrupt or memory flag that the computer's CPU can access to determine when it should proceed with the processes to switch control.

When the computer's CPU is booted and receives a signal from the modem processor that the control transition can begin, the CPU may access the shared memory to obtain operating state information regarding the peripherals, operating system state, power management condition and other computer peripherals, step 352. The CPU may use this operating state information to prepare to take over control of all of peripherals in a manner consistent with that of the current operating condition. The computer's CPU may obtain information from the shared memory indicating a state of any documents currently open on the computer, step 354. For example, if a text document is open, the shared memory may indicate the particular portion of the document that appears on the display. Alternatively, the shared memory may be large enough to contain the full document data. The computer's CPU may further determine the applications currently running on the computer from operating state information in shared memory and load the appropriate normal versions of those applications, step 356. Alternatively, the information required for the CPU to take over operations and run corresponding applications may be communicated by the auxiliary processor via a communication link between the two processors.

With applications loaded, the computer's CPU may also load documents that are currently open on the computer associated with the launched applications. For example, if a Word® document was being viewed on the computer operating under the auxiliary power mode, the computer's CPU may load the full Word® application and then load the full document from memory (e.g., hard disk memory). As another example, if an electronic mail message was open while the computer was operating under the auxiliary power mode, the CPU may load the e-mail application (e.g., Microsoft Office®) and then load open e-mail message from memory (e.g., shared memory or hard disk memory). As part of loading documents, the computer's CPU may also open the document to the particular page or aspect that is currently presented on the display using the document's application data and application context data obtained from shared memory (e.g., information obtained in step 354).

Once the computer's CPU has configured itself to implement the appropriate state, loaded the appropriate applications and documents, and is otherwise ready to take control of processing, it may signal the modem processor that it is about to take control, step 358. At this point, the computer's CPU may take control of the computer, its display, its power management system, and its peripherals, step 362, while the modem processor relinquishes control of the computer peripherals, step 360. The process of taking control may be accomplished by signaling switches or multiplexer circuits (such as multiplexer circuits 36, 38, 40, 41, 42, and 52 illustrated in FIGS. 6-9) to begin routing control signals to and from the computer's CPU. Once the computer's CPU has taken control, operation of the computer can proceed in the normal operating mode, step 314.

Figure 16:
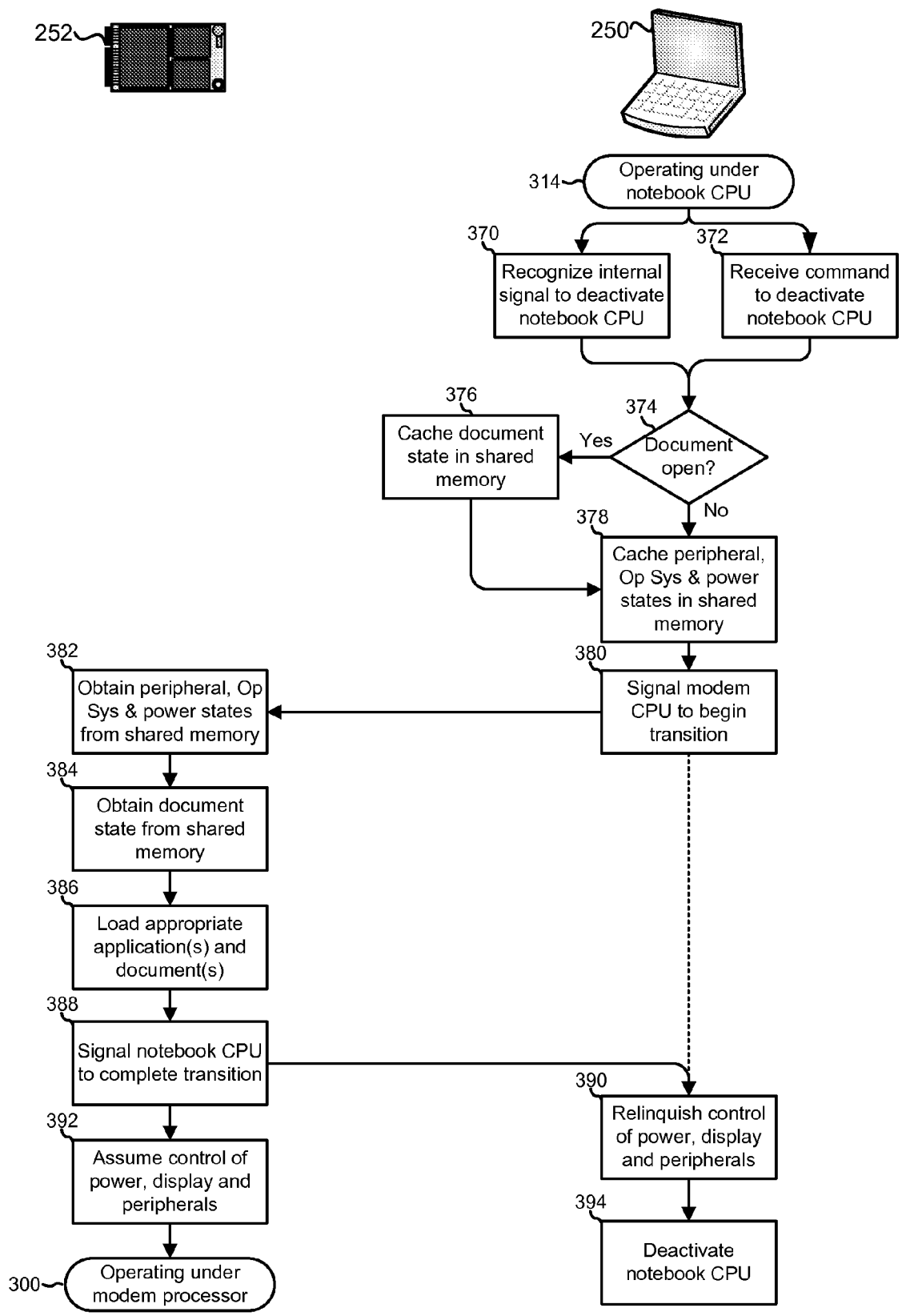
FIG. 16 is a process flow diagram of embodiment methods that may be implemented within a wireless modem processor and a computer CPU for shifting processing control from the computer CPU to the wireless modem processor.

FIG. 16 illustrates processes of a particular embodiment for transferring operational control from a notebook computer 250 CPU to a wireless modem card 252 installed in that computer. When the computer is operating under the computer's CPU step 314, it may receive a variety of signals informing it to begin a shift of control to the modem processor. As a first example, the computer's CPU may recognize an internal signal indicating that it should shift to the auxiliary processor mode, step 370. For example, the CPU may determine that the user has not interacted with the computer in a predetermined period of time, at which point the CPU may initiate the transition to the auxiliary processor mode in order to conserve battery power (versus shutting down or going into sleep mode as is currently practiced). As another example, the computer's CPU may recognize that the application currently activated can run in the auxiliary processor mode, such as a DVD or audio player. Switching to the ancillary processor mode for such applications may allow users to enjoy the application for a much longer period of time on the same battery charge. As another example, the computer may receive an electronic message including a code instructing the computer's CPU to activate the auxiliary power mode, such as an SMS message instructing it to conserve battery power. As a second example, the CPU may receive a command directing it to deactivate the CPU, step 372, such as a user pressing the power button, activating a menu option, or closing the display of the notebook computer.

When the computer's CPU recognizes or receives a signal to activate the auxiliary processor mode, it may determine whether there are any documents currently open, determination 374. If one or more documents are currently open (i.e., determination 374="Yes"), the CPU may cache the state of those documents in shared memory, step 376. The information stored in shared memory may be sufficient to enable the modem processor to present a similar display of the document when it takes control. If no document is open (i.e., determination 374="No") or after the open document state has been saved in shared memory (step 376), the computer's CPU may save into shared memory information regarding the state of the computer's peripherals, operating system, power management, and similar operational conditions, step 378.

As described above, instead of caching system information in shared memory, the CPU may communicate application data and operating state information to the auxiliary processor via a communication channel in steps 376 and 378. In this alternative, the information required by the auxiliary processor to take over control may be communicated, including such information as the currently open applications, memory addresses of data stored in random access memory (i.e., shared memory) of currently open applications, as well as other operating state information.

Once the application data and operating state information has been cashed in shared memory, the computer's CPU may signal to the modem processor that it is ready to switch control, step 380. This signal may be in the form of an interrupt or memory flag that the modem processor can access to determine when it should proceed with the processes to switch control.

When the modem processor receives a signal from the computer's CPU that the control transition can begin, the modem processor may access the shared memory to obtain peripheral state information regarding the peripherals, operating system state, power management condition and other computer peripherals, step 382. The modem processor may use this peripheral state information to prepare to take over control of at least some of peripherals in a manner consistent with that of the current operating condition. The modem processor may obtain operating state information from the shared memory indicating a state of any documents currently open on the computer, step 384. For example, if an e-mail message or text document is open, the shared memory (or a data communication via a communication channel between the processors) may indicate the particular portions of the document or documents that appear on the display. Alternatively, the shared memory may be large enough to contain the full document data. The modem processor may further determine the applications currently running on the computer from operating state information in shared memory and load the appropriate scaled down versions of those applications, step 386. With applications loaded, the modem processor may also load documents that are currently open on the computer associated with the launched applications. For example, if a Word® document was open while the computer was in the normal operating mode, the modem processor may load a Word® document viewer application and then load at least a portion of the document from memory (e.g., shared memory or hard disk memory). As another example, if an electronic mail message was open while the computer was in the normal operating mode, the modem processor may load an e-mail viewer application and then load open e-mail message from memory (e.g., shared memory or hard disk memory). As part of loading documents, the modem processor may also open the document to the particular page or aspect that is currently presented on the display using document application and application context data obtained from the operating state information stored shared memory (e.g., information obtained in step 384) or communicated via an intra-processor communication channel.

Once the modem processor has configured itself to implement the appropriate state, loaded the appropriate applications and documents and is otherwise ready to take control of processing, it may signal the computer's CPU that it is about to take control, step 388. At this point, the modem processor may take control of the computer, its display, its power management system, and its peripherals, step 392, while the computer's CPU relinquishes control of the computer peripherals, step 390. The process of taking control may be accomplished by signaling switches or multiplexer circuits (such as multiplexer circuits are 36, 38, 40, 41, 42, and 52 illustrated in FIGS. 6-9) to begin routing control signals to and from the modem processor. Once the modem processor has taken control, operation of the computer can proceed in the auxiliary processor, step 300. Also, once the modem processor has taken control, the computer's CPU may begin a normal shutdown process to deactivate or enter a low power state such as a standby or sleep mode, step 394.

Figure 17:
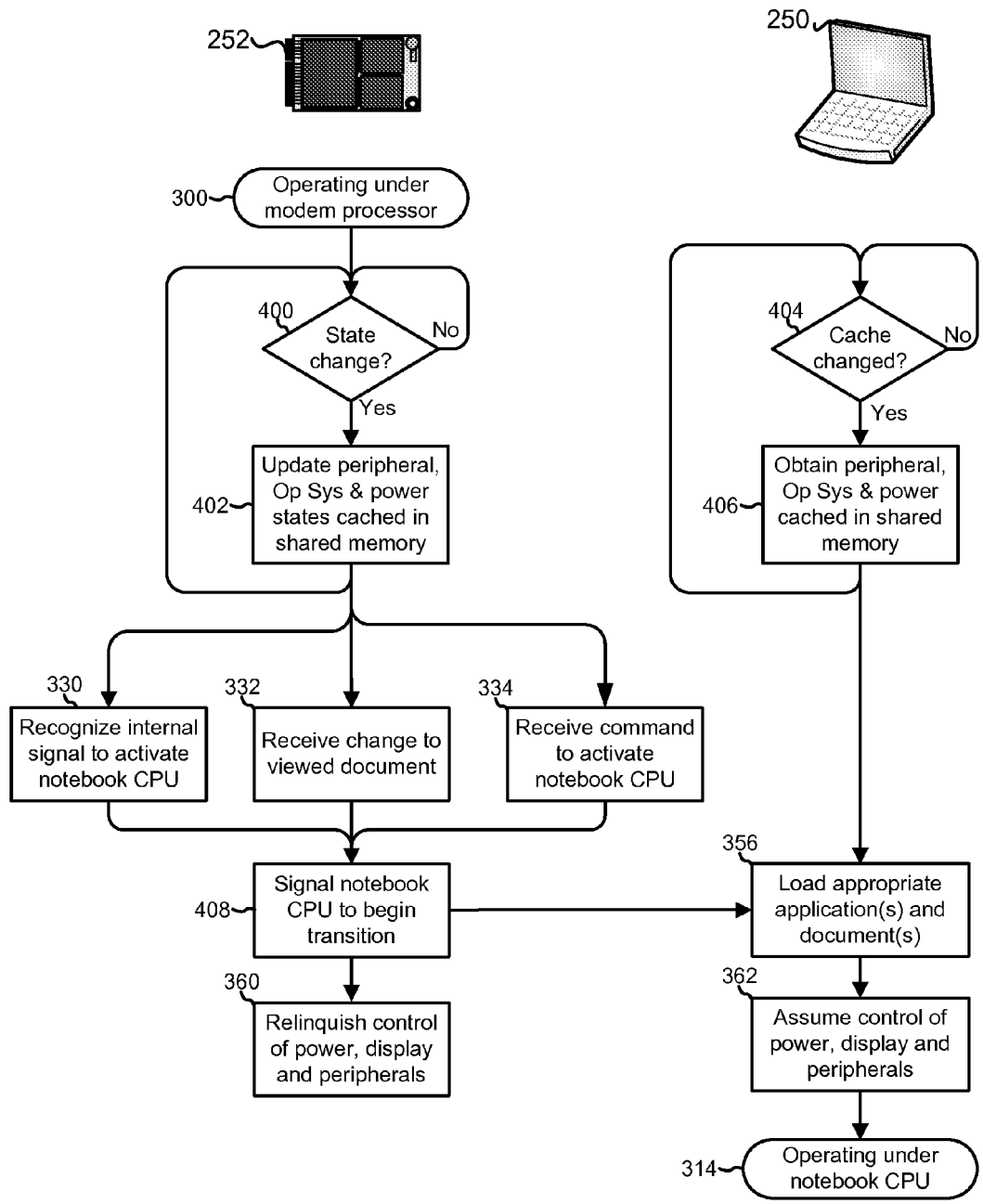
FIG. 17 is a process flow diagram of alternative embodiment methods that may be implemented within a wireless modem processor and a computer CPU for shifting processing control from the wireless modem processor to the computer CPU.

In an alternative embodiment, the processor in control of the computer may frequently update state data stored within the shared memory so that this shared memory accurately reflects the current operating condition. This embodiment may enable faster transitions between the two operating modes since state data does not need to be stored to the shared memory before the control transfer can take place. FIG. 17 illustrates an example method for transferring control from a modem processor to the computer's CPU according to this embodiment. While the computer is operating under control of the modem processor, step 300, part of the overhead processing in the modem may include periodically determining whether the current operating state has changed from that which is stored in shared memory, determination 400. This determination may be made by comparing operating state information to the operating state information stored in the shared memory, or by recording when an operation has changed the current operating state (e.g., terminating an application or ending a modem data call). If no state change has occurred (i.e., determination 400="No"), the processing may continue until the next determination is made. When the modem processor determines that a state change has occurred (i.e., determination 400="Yes"), the processor may store updated operating state information (i.e., status and configuration information regarding the computer peripherals, operating system condition, power states, open applications, and other aspects) in the shared memory, step 402. With the operating state information updated, the processor may continue with its normal process routine.

In order to be prepared to take control of operations, the computer's CPU may periodically access the shared memory while in the auxiliary processor mode to determine whether there has been a change in the cached information, determination 404. This determination may be made by comparing the information stored in the shared memory to information in another memory location, by accessing a flag accessible to the CPU set by the modem processor when an update is made (i.e., set as part of step 402), or receiving a signal or interrupt from the modem processor that an update is being made (such as sent as part of step 402). If there has been no change in the cached information (i.e., determination 404="No"), the CPU may return to whatever processing it was performing. For example, if the CPU were in a low power mode, such as standby or sleep mode, it may periodically activate sufficient to check the shared memory or status flags. Alternatively, the computer's CPU may only make the determination regarding whether the cache has changed upon receiving a signal or interrupt from the modem processor. When the computer's CPU determines that a change has been made to the state information stored in shared memory (i.e., determination 404="Yes"), the CPU may access the shared memory to obtain the updated state information and store it within its own state memory, step 406.

Since the computer's CPU has maintained its state information in sync with the state information stored by the modem processor, the CPU can take control of the computer very quickly in this embodiment. Thus, when the modem processor receives a signal indicating that a shift to a normal operating mode should be accomplished, steps 330, 332, 334, it may immediately signal the computer's CPU to begin the control transfer process, step 408. Upon receiving this signal, the computer's CPU may load the appropriate applications and documents consistent with those currently operating on the modem processor, step 356, and when loaded, assumed control of the computer, the display, the power management system, and other peripherals, step 362. Thereafter, the modem processor may relinquish control of the computer peripherals, step 360, and the computer may proceed to operate in the normal operating mode under control of the CPU, step 314.

Figure 18:
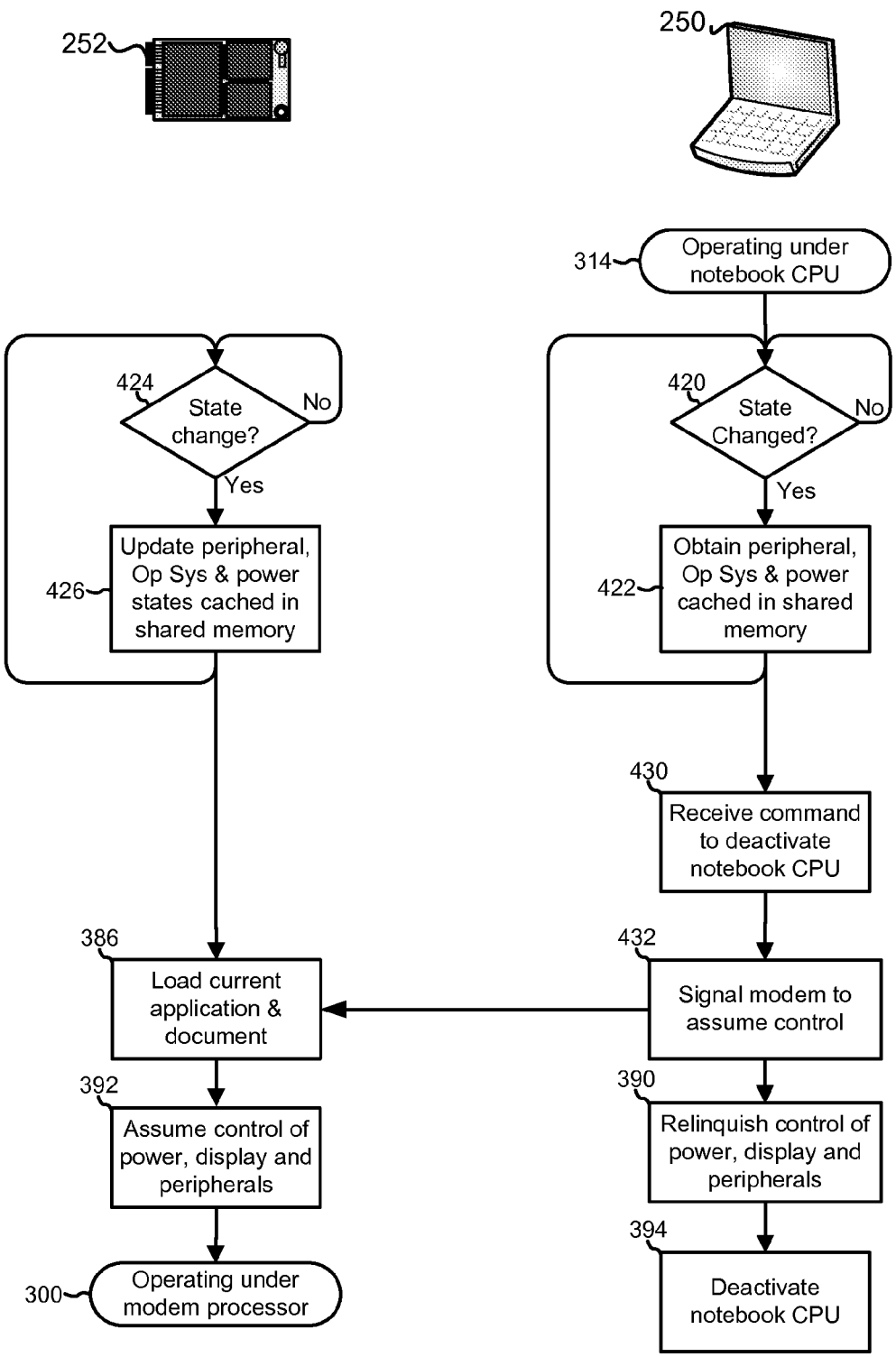
FIG. 18 is a process flow diagram of alternative embodiment methods that may be implemented within a wireless modem processor and a computer CPU for shifting processing control from the computer CPU to the wireless modem processor.

FIG. 18 illustrates an example method for transferring control from the computer's CPU to a modem processor according to this embodiment. While the computer is operating in the normal operating mode, step 314, part of the overhead processing in the CPU may include periodically determining whether the current operating state has changed from that stored in shared memory, determination 420. This determination may be made by comparing state information to that stored in shared memory or by recording when an operation has changed the current state. If no state change has occurred (i.e., determination 420="No"), the processing may continue until the next determination is made. When the computer's CPU determines that a state change has occurred (i.e., determination 420="Yes"), the CPU may store updated state information regarding the computer peripherals, operating system condition, power states and other aspects in the shared memory, step 422. With the state information updated, the CPU may continue with its normal processes.

In order to be prepared to take control of operations, the modem processor may periodically access the shared memory while in the normal operating mode to determine whether there has been a change in the cached information, determination 424. This determination may be made by comparing the information stored in the shared memory to information in another memory location, by accessing a flag accessible to the modem processor set by the CPU (e.g., part of step 422), or receiving a signal or interrupt from the computer's CPU sent as part of step 422. If there has been no change in the cached information (i.e., determination 424="No"), the processor may return to whatever processing it was performing. For example, the modem processor may return to performing modem related functions. Alternatively, the computer's CPU may send a signal to the modem processor whenever a change is made to the information stored in the shared memory (such as part of step 422). When the modem processor determines that a change has been made to the state information stored in shared memory (i.e., determination 424="Yes"), the modem processor may access the shared memory to obtain the updated state information and store it within its own state memory, step 426.

Since the modem processor has maintained its state information in sync with the state information stored by the computer's CPU in shared memory, the modem processor can take control of the computer very quickly. Thus, when the computer's CPU receives a signal indicating that a shift to a normal operating mode should be accomplished, step 430, it may immediately signal the modem processor to begin the control transfer process, step 432. Upon receiving this signal, the modem processor may load the appropriate applications and documents consistent with those currently operating on the computer's CPU, step 386, and when loaded, assumed control of the computer, the display, the power management system, and other peripherals, step 392. Thereafter, the computer's CPU may relinquish control of the computer peripherals, step 390, and the computer may begin operating in the auxiliary processor mode under control of the modem processor, step 300. Once control has been switched to the modem processor, the computer's CPU may deactivate or go into a low-power state, step 394.

The various embodiments described above have a number of useful applications, particularly because an auxiliary processor on a wireless modem card can maintain communications with an external wireless network while in the low-power auxiliary processor mode. Thus, even when a notebook computer 250 is in auxiliary processor mode it may remain connected to communication networks such as that illustrated in FIG. 19. In such a communication network, the notebook computer 250 may communicate with external networks, such as the Internet 433 via wired connections 434, as well as via wireless communications 420 with a wireless communication network. Such a wireless communication network may include a base station antenna 422 coupled to network routing equipment 426. The wireless communication network may provide data communication to a server 428 which may be coupled to the Internet 430. Thus, when a notebook computer 250 is in auxiliary processor mode, it may communicate with a distant computer 432 via wireless communication 420 that can link to the Internet 430 via a network server 428. Such communications may be via any known communication method, including, for example, SMS or MMS message, e-mail, a cellular data network or a mobile broadcast network.

A notebook computer 250 with a wireless modem card configured to operate the computer in the auxiliary processor mode according to any of the various embodiments may be addressed via a variety of wireless messages that may be used to remotely control computer operations. Some example applications in which the wireless modem card operating in auxiliary processor mode can receive a message to wake up an application or the computer CPU are described below with reference to FIGS. 20-27. Further descriptions of the network components and methods implemented by other computing devices within a communication network that may be utilized in such applications are described in U.S. patent application Ser. No. 12/430,642 entitled "Method And System For Activating Computer Applications With SMS Messaging" filed Apr. 27, 2009, the entire contents of which are hereby incorporated by reference.

Figure 20:
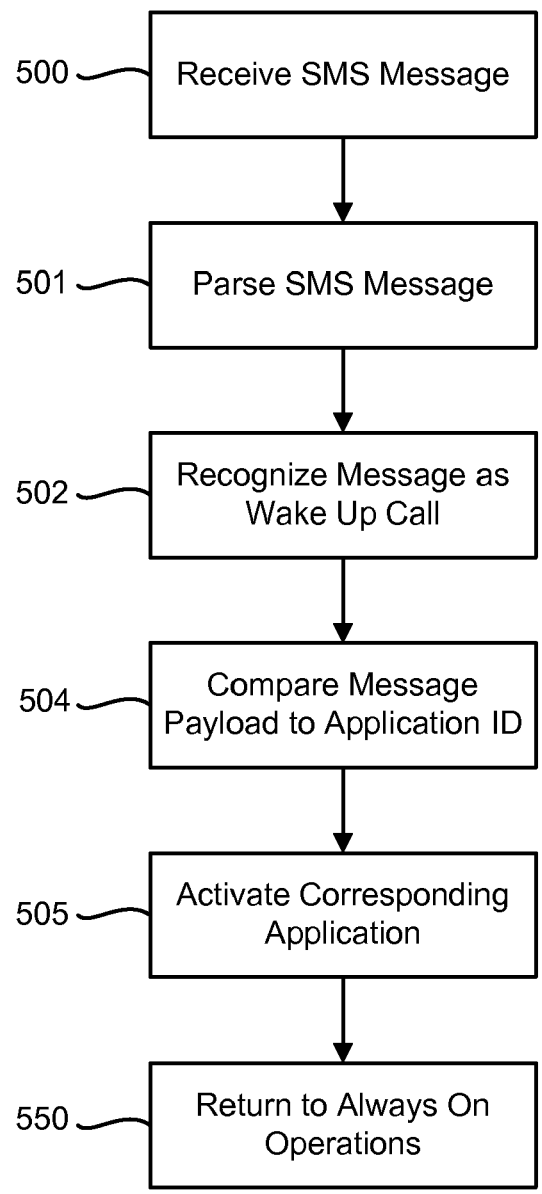
FIG. 20 is a process flow diagram of an embodiment method by which a user can remotely activate an application on a computer implementing an embodiment.

FIG. 20 illustrates an application in which a user may send a simple message service (SMS) message to a computer having a wireless modem card configured to take over operation of the computer in auxiliary processor mode according to an embodiment in order to activate an application on that computer. When the computer is in auxiliary processor mode, the wireless modem may receive an SMS message, step 500. The modem processor may be configured to parse the received SMS message in order to interrogate its components, step 501. If the SMS message is configured as a wake-up call, examples of which are discussed in further detail below with reference to FIGS. 28A-28C, the modem processor will recognize that message as requiring special processing, step 502. In that case, the modem processor may obtain the message payload and use it to determine an application that should be started, step 504. For example, the message payload may include an identifier for an application which can be interpreted by comparing the payload to a data table to obtain the name or memory address of the application that should be started. Using this information, the modem processor can activate the corresponding application, step 505. Once that application is running or completed, the modem processor may return to the prior state such as providing always on or always connected functionality, step 550.

Figure 21:
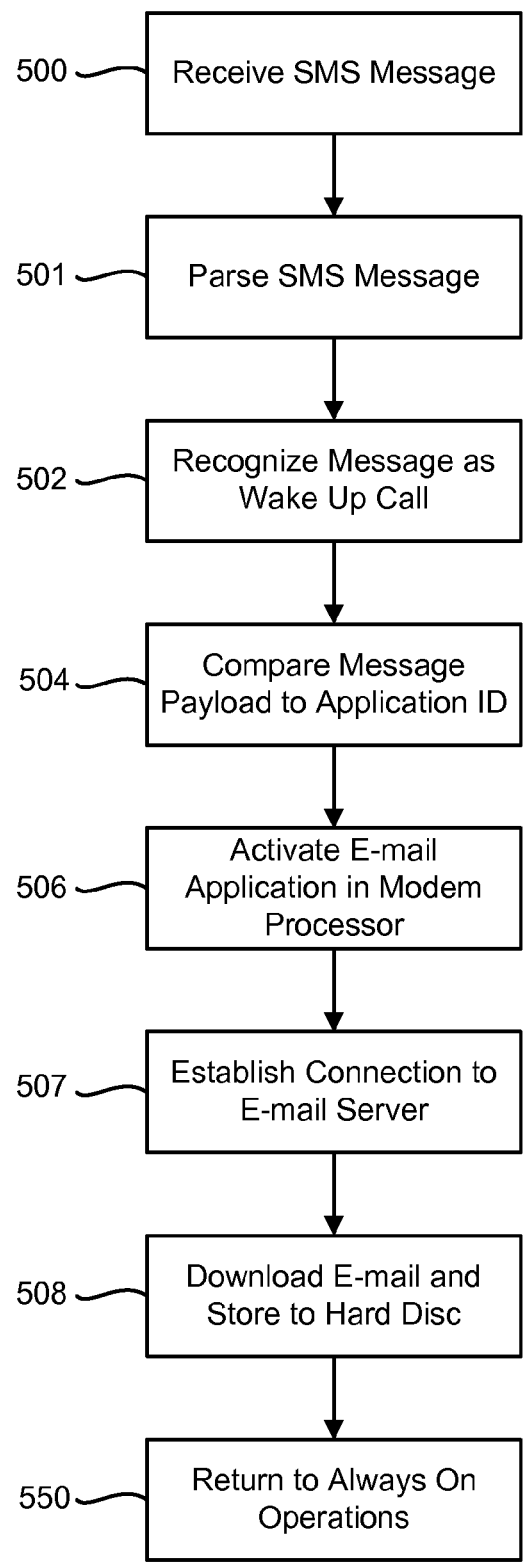
FIG. 21 is a process flow diagram of an example application of the various embodiments.

The method steps 500 through 505 described above with reference to FIG. 20 may be implemented to achieve a number of useful functions depending upon the particular application that is activated. FIG. 21 illustrates an example application of the embodiments in which the activated application is an electronic mail program which may be remotely activated to download e-mail, and thus clear out an inbox folder in an e-mail server. A user may send an SMS or similar message to the user's computing device including a command to activate the e-mail application and download incoming e-mail. Such a message will be received by the wireless modem operating in the auxiliary processor mode, step 500, and evaluated as described above with reference to FIG. 20 (steps 501-504) to determine that the e-mail application should be activated within the modem processor, step 506. The e-mail application or another network management application may then establish a data communication link to a network, such as the Internet, step 507, and through that network to the user's e-mail server. With a connection established in the e-mail server, the e-mail application will then download e-mails pending in the user's e-mail inbox and store them on the computer's hard drive, step 508. Depending upon the user's e-mail server settings and account, the e-mail server may then delete the transmitted e-mails from an e-mail inbox folder, thereby allowing further e-mails to be received. Once the e-mails have been downloaded, the modem processor may return to the functions associated with the always connected feature, step 550.

Figure 22:
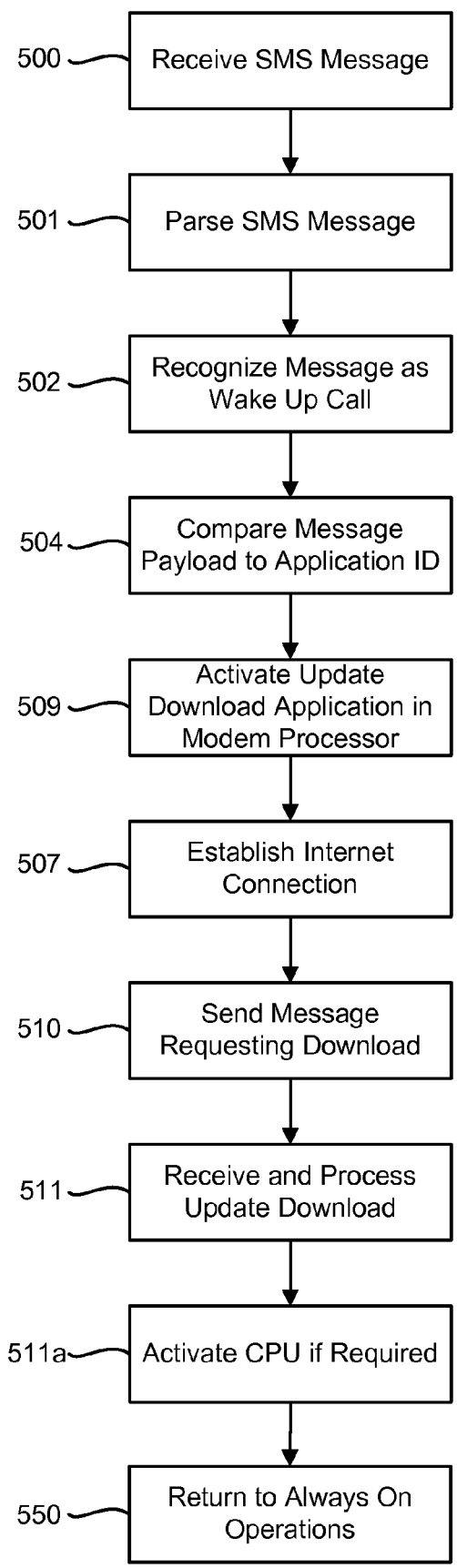
FIG. 22 is a process flow diagram of another example application of the various embodiments.

FIG. 22 illustrates another example application of the embodiments in which a user may send a SMS or similar message to a computer operating in the auxiliary processor mode to download a application or application upgrade from a network. The SMS or similar message will be received by the wireless modem and processed as described above with reference to FIG. 20 (steps 500-504) to determine that the message includes a command to activate a program download or update download application. The specified program download or program update download application is activated in the modem processor, step 509. That application or the modem processor may then establish a network connection, such as a connection to the Internet, and via that network to a server storing the program or update to be downloaded step 507. The IP address or URL of the source of the download may be included within the SMS message payload. The download application may request download of the particular program or program update from the source server, step 510. The particular program or update to be downloaded may be identified by a file name or in a URL included within the SMS message payload. The download application then cooperates with the contacted server to receive and process the program or program update download, step 511. In some cases, completing installation of a program or program update may require processing by the computer's CPU, in which event, the modem processor may signal the CPU that a transfer of operational control must be accomplished in order to complete the download processing, step 511 a. Such a transfer of control to the computer's CPU and back to the modem processor may occur as described above with reference to FIGS. 12-18. Once the download processing is completed, the computer may return to the auxiliary processor mode in which the always connected feature is provided, step 550.

Figure 23:
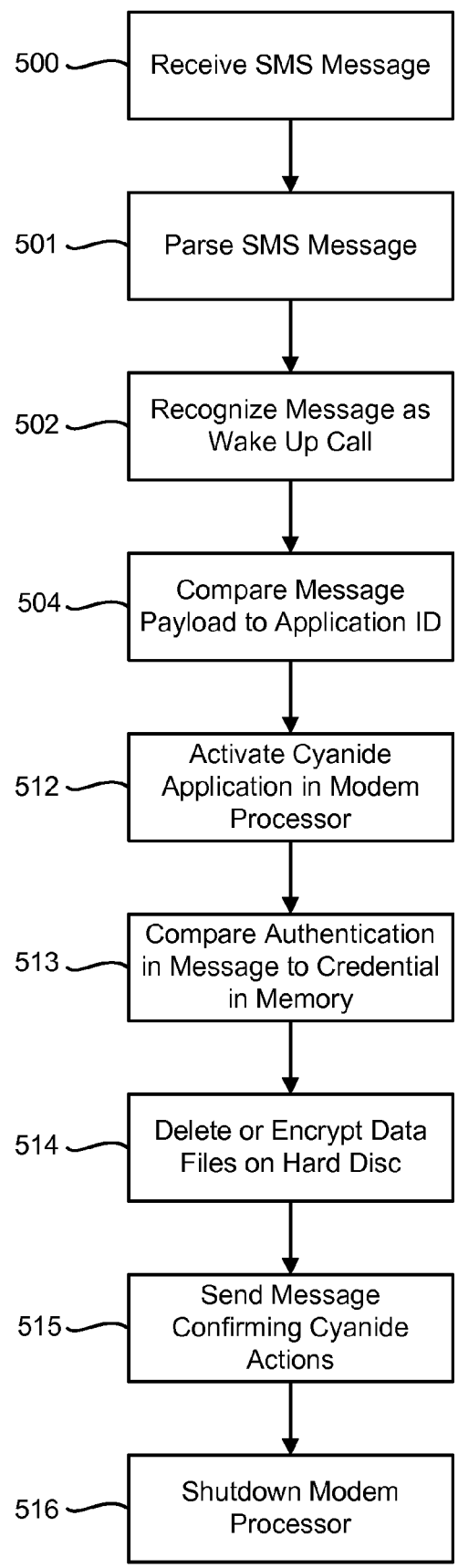
FIG. 23 is a process flow diagram of another example application of the various embodiments.

FIG. 23 illustrates another example application of the embodiments in which a user may send an SMS or similar message to a computer in order to cause it to delete files from its hard drive and otherwise secure personal information. Since deletion of all files on a computer's hard drive may render the computer useless, this file deletion utility is referred to as a "cyanide" application. Such a utility may be useful in the event that a computer containing proprietary information is lost or stolen since it enables users to remotely activate the file destruction process. To ensure that a thief does not detect and deactivate this functionality, the computer may be configured in advance to always function in the auxiliary processor mode with the always connected feature activated when not in the normal operating mode. In other words, the auxiliary processor mode may be the computer's effective "off" condition. As mentioned above, the various embodiments enable such a computer to maintain connection to or periodically access a cellular or similar wireless data network in order to receive messages. To activate the cyanide application, a user may send an SMS message (such as from a cellular telephone) to the computer containing a secret authentication code (secret so that only an authorized user can initiate the cyanide application). The SMS or similar message may be received by the wireless modem and processed as described above with reference to FIG. 20 (steps 500-504) to determine that the cyanide application should be activated. The modem processor may then activate the cyanide application, step 512, which may compare the secret authentication code received in the SMS message to an authentication value or encrypted credential stored in memory in order to confirm that the cyanide command is authentic, step 513. The authentication code may be encrypted or the comparison process may use well-known encryption authentication techniques in order to ensure the cyanide application cannot be defeated or inadvertently activated. If the received cyanide command is authenticated, the modem processor may execute a routine which deletes all data from the computer's hard drive as well as nonvolatile memory, step 514. Once the cyanide actions are completed, the modem processor may send a reply message to the sender of the original SMS message confirming that the actions have been taken, step 515. Such a message may give users reassurance that their computer has been protected. Finally, the modem processor may execute a complete shutdown of the computer, including shutting down the modem processor, step 516. If the CPU operating system or boot up commands were deleted from the hard drive, shutting down the modem processor may render the computer useless without a boot disk. Thus, the computer may be only useful once the computer hard drive has been reformatted and a new operating system loaded. In order to further protect stored data, the modem processor may be configured to delete files using known techniques which actually delete information from the hard drive rather than simply clearing the disk indexing record.

Figure 24:
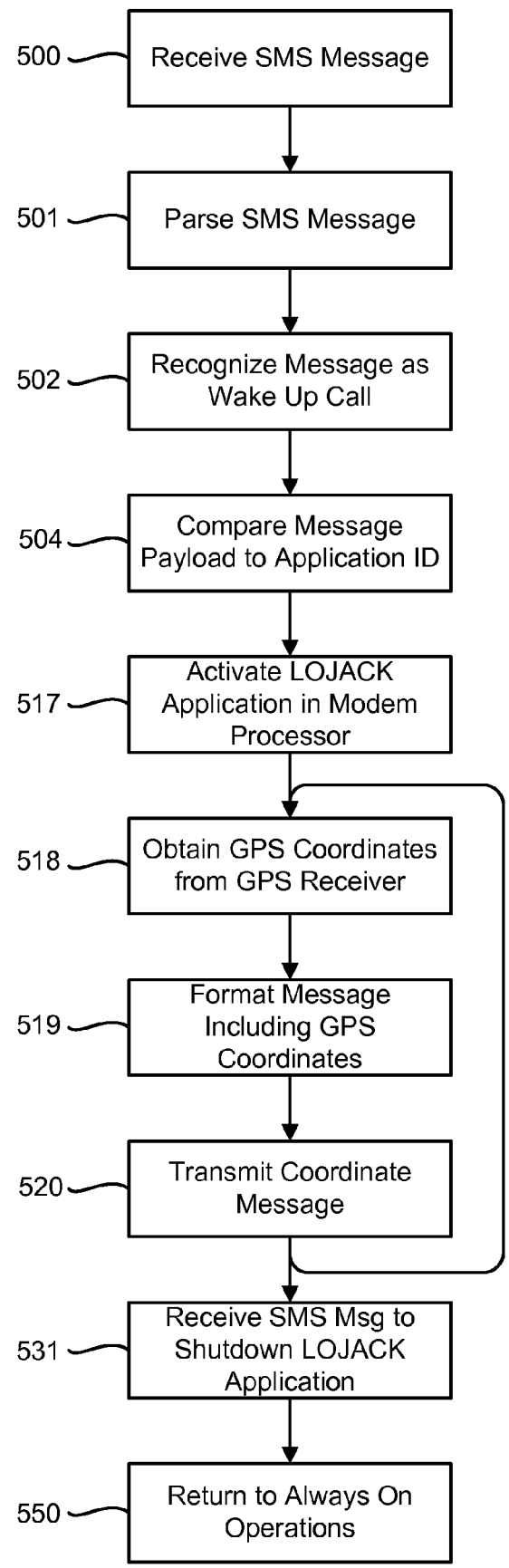
FIG. 24 is a process flow diagram of another example application of the various embodiments.

FIG. 24 illustrates another example application of the embodiments in which a user may send an SMS or similar message to the computer to have it report its current location by wireless data message. This application may be useful when a computer is lost or stolen since it will enable users to locate their computer even when it is in the "off" when state. Since this functionality is similar to the auto theft protection service known as LoJack®, this remotely-activated position reporting application is referred to herein as a LoJack application. To ensure that a thief does not detect and deactivate this functionality, the computer may be configured so that the computer's "off" condition is the auxiliary processor mode implementing the always connected feature. To activate the LoJack application, a user may send an SMS message to the computer identifying that application for activation. The SMS or similar message may be received by the wireless modem and processed as described above with reference to FIG. 20 (steps 500-504) to determine that the LoJack application should be activated. The modem processor may activate the LoJack application, step 517. The LoJack application activates the GPS receiver in the computer (which may be part of the wireless modem card in an embodiment) and begins obtaining GPS coordinates of the computer, step 518. When GPS coordinates have been received, the LoJack application may generate a message, such as an SMS or e-mail message addressed to the sender of the activation message received in step 500 (or to another address that may be specified in advance and stored in memory), step 519. The modem processor may transmit the coordinate message using a currently established wireless data connection or by establishing a data connection to a different network, such as the Internet, before transmitting a message, step 520. The LoJack application may repeat the process of obtaining location coordinates and transmitting them to a destination address, repeating steps 518-520, in order to inform the user or authorities of the computers present location. A user or authorities may deactivate the LoJack application by sending another SMS or similar message with a deactivation command, step 531. Such a message will be received and processed in the manner described above with reference to FIG. 20 (step 500-504). When such a message is received, the modem processor may return to the auxiliary processor mode in which the always connected feature is provided, step 550.

Such LoJack application software may be included within the firmware of the wireless modem so that the functionality may not be interfered with without removing the modem. Since the wireless modem may have a direct connection to the notebook computer battery, the modem processor may remain active and listening for a LoJack activation message even when the computer is completely shutdown (i.e., not in either normal operating mode or auxiliary processor mode). In an embodiment in which the wireless modem card includes the GPS receiver, the LoJack functionality may be provided by the wireless modem card without accessing any other computer component other than antennas.

Figure 25:
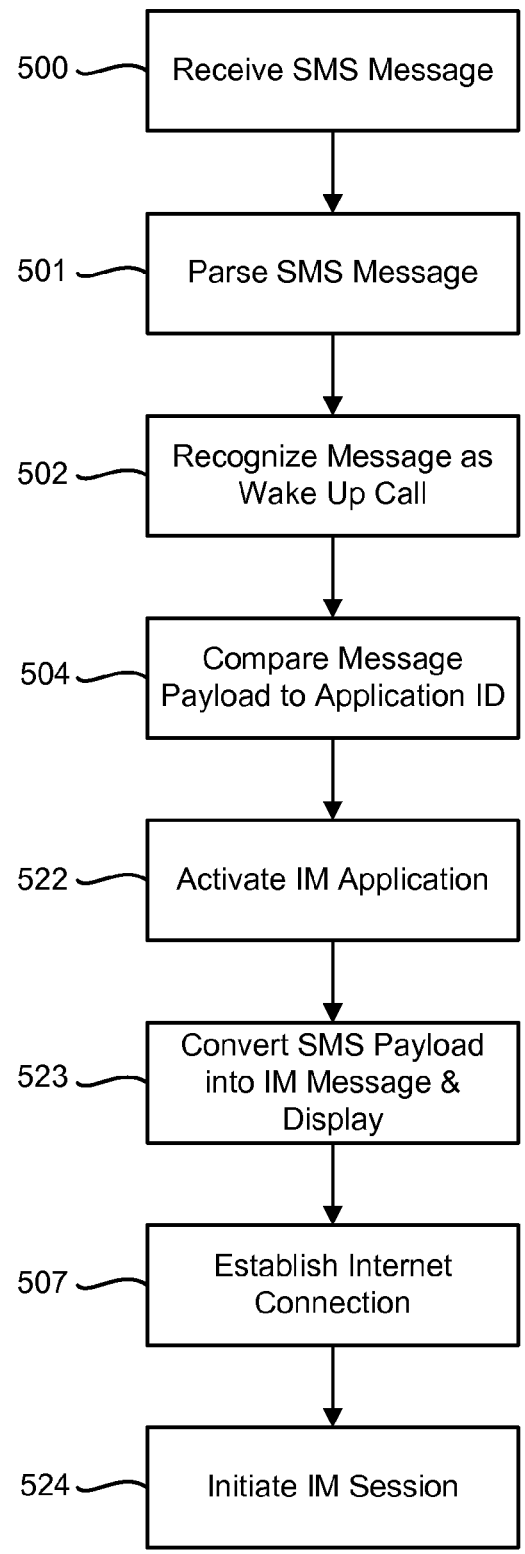
FIG. 25 is a process flow diagram of another example application of the various embodiments.

FIG. 25 illustrates another example application of the embodiments that enables individuals to prompt a user of a computer to begin an instant messaging (IM) session when the user's computer is in the auxiliary processor mode. When an individual desires to begin an IM session, that individual may send the user's computer an SMS or similar message informing it to activate the IM application. Such a message may be received by the wireless modem and processed as described above with reference to FIG. 20 (steps 500-504) to determine that the IM application should be activated, step 522. The modem processor or the IM application running on the modem processor may determine from the message payload an initial IM message for display, as well as the address of the sender for use in replying with an IM message, step 523. The modem processor may also establish a connection to a network, such as the Internet, step 507, and then initiate an IM session in the normal fashion, step 524. This application may be useful when users frequently communicate via IM messages but need to operate their computers in the auxiliary processor mode in order to extend their battery life.

Figure 26:
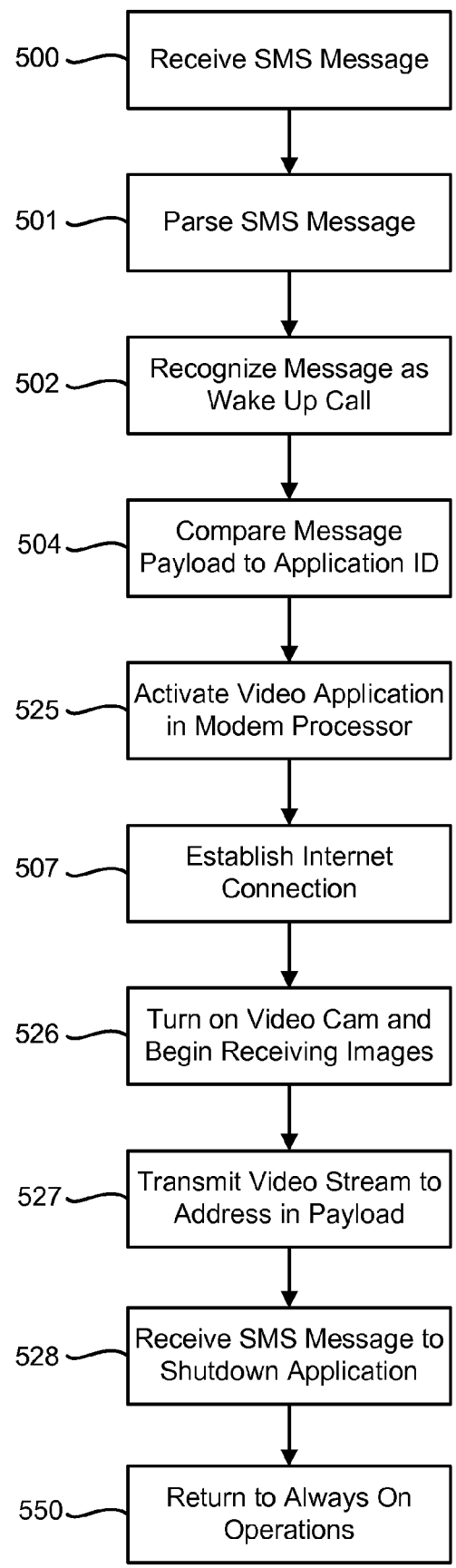
FIG. 26 is a process flow diagram of another example application of the various embodiments.

FIG. 26 illustrates another example application of the embodiments that enables users to remotely activate a video camera by sending an SMS or similar message to the computer. Such a message may be received by the wireless modem and processed as described above with reference to FIG. 20 (steps 500-504) to determine that a video application should be activated in the modem processor, step 525. The modem processor or the video application may also establish a connection to a network, such as the Internet, step 507, in order to transmit captured video images to a particular destination address, such as a URL or e-mail address. Such a destination address may be included in the payload of the SMS (or similar) message that activated the application. The video application may activate a video camera coupled to the computer and begin receiving images, step 526. The modem processor may transmit the received video to the address included within the activating message, step 527. In the case of a URL destination address, such video images may be sent as a video stream. In the event that the destination address is a messaging address (e.g., an e-mail address), video clips may be recorded and the clips sent sequentially in separate messages. Video transmissions may continue until another SMS or similar message is received instructing the computer to terminate the video application, step 528. Such a termination message may be processed as described above with reference to FIG. 20 (steps 500-504). When the video application is terminated, the modem processor may return to the auxiliary processor mode in which the always connected feature is provided, step 550.

Figure 27:
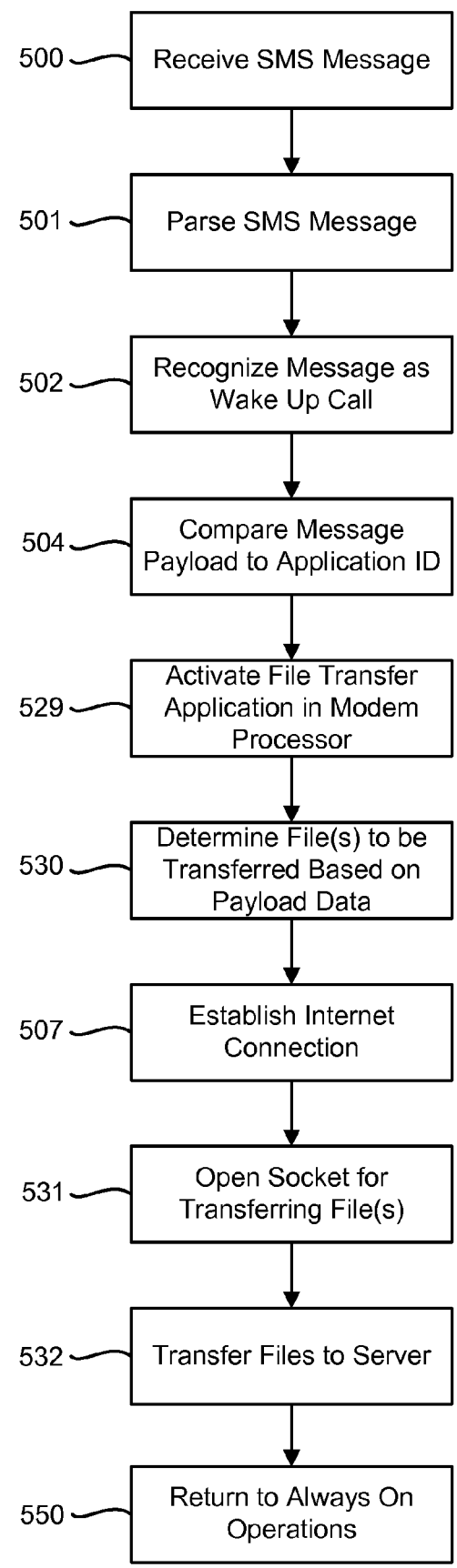
FIG. 27 is a process flow diagram of another example application of the various embodiments.

FIG. 27 illustrates another example application of the embodiments in which a user may remotely command a computer to transfer a file stored on its hard drive. This application may enable users to leave their computer in the auxiliary processor mode and be able to download files to another location by sending a simple SMS or similar activation message identifying the file to be downloaded and the destination server to which this file should be sent. Such an activation message will be received by the wireless modem and processed as described above with reference to FIG. 20 (steps 500-504) to determine that the file transfer application should be activated in the modem processor, step 529, and the files that should be transmitted, step 530. The modem processor or the file transfer application may establish a connection to a network, such as the Internet, step 507, and opened a data communication connection, such as an open socket through which the file transfer will be accomplished, step 531. A destination server address, such as a URL, may be included in the SMS activation message payload and obtained by the modem processor to use in the establishing an open socket. Once an open socket has been established, the modem processor may begin transferring the files identified in the activation message from the computer's hard drive (or other memory) to the destination server, step 532. Once the file transfer has been completed, the file transfer application may be terminated and the modem processor returned to the auxiliary processor mode in which the always connected feature is provided, step 550.

Figure 28A:
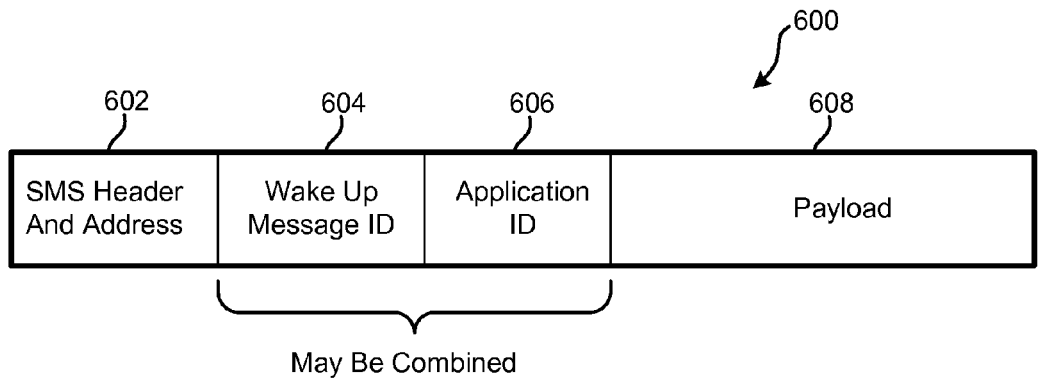
FIGS. 28A-28C are example message structures for simple message system messages that may be used to implement one or more of the example applications illustrated in FIGS. 20-27.
Figure 28B:
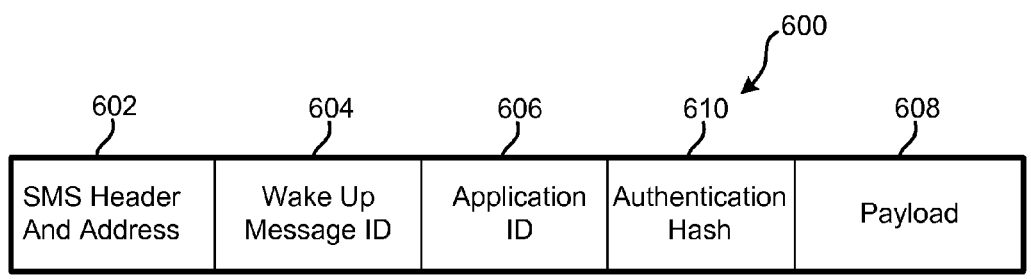
Figure 28C:
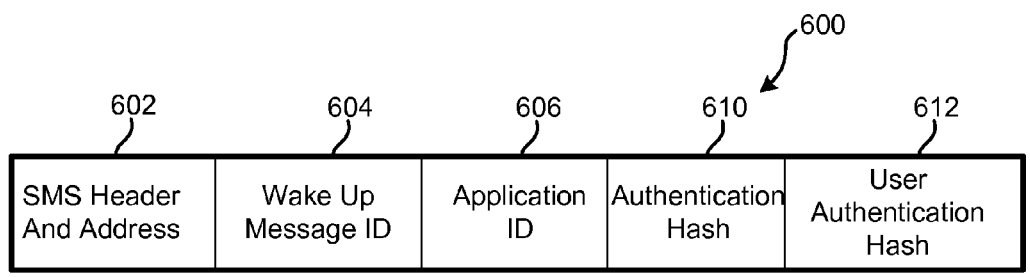

The SMS or similar message used to activate the various applications described above with reference to FIGS. 20-27 may use formats similar to the examples illustrated in FIG. 28A-28C. For example, an activation message 600 may include the fields illustrated in FIG. 28A. Such a message may include a header portion 602 including addresses associated with delivering the message as well as identifying the sender of the message, and an identifier or code that the modem processor can recognize as indicating that the message should be interpreted as an activation message, such as a "wake-up" message ID 604. The message may also include an application identifier field 606 which includes information or code identifying the particular application that the modem processors should activate. As may be appreciated by one of skill in the art, codes identifying an application to be started and identifying the message as an activation message may easily be combined into a single code that the modem processor can recognize. Additionally, the activation message may also include a payload field 608 which may include information to an application activated by the message. For example, the payload field 608 may be used to convey addresses or a URL for establishing a data communication link, names of files to be accessed or transferred, messages to be displayed, or application activation codes.

In order to ensure that an activation message is authentic, the message may include authentication codes or tokens which the receiving modem processor can authenticate as illustrated in FIG. 28B. This may be accomplished by including an authentication field 610 within the message. This authentication field 610 may be used to include a token, code or cryptographic hash value that the modem processor can use to authenticate the communication. Authentication may be accomplished using any of a variety of well-known cryptographic authentication techniques.

In order to provide further security, the activation message may also include a user authentication field 612, as illustrated in FIG. 28C, to ensure that only authenticated users can remotely activate a computer. Like the message authentication field 610, the user authentication field 612 may include a token, code or cryptographic hash value that the modem processor can use to authenticate the user. Such user authentication may be accomplished using any of a variety of well-known cryptographic authentication techniques.

The foregoing example applications are just a sample of the uses to which the various embodiments may be employed. Other useful applications include:
  maintaining presence information, such as information regarding the current location, businesses or other establishments nearby, and other information relevant to the current location, thereby enabling a notebook computer to function like a GPS system with an extended battery life;
  allowing users to play mobile games locally or play interactive web games via a 3G network without draining the battery of the notebook computer;
  allowing users to quickly browse the Internet for restaurants, movies, directories, news, etc. without having to activate the notebook computer processor;
  allowing users to obtain directions via GPS and Internet mapping applications, like Google™ Maps, Google Earth, or Microsoft's Live Search™ Maps without having to activate the notebook computer processor;
  allowing users to make and receive telephone calls via a wired or Bluetooth headset coupled to the computer without having to activate the notebook computer processor; and
  allowing users to watch mobile broadcast television, such as MediaFLO or other mobile TV broadcast systems, or video streaming via the Internet without having to activate the notebook computer processor.

Figure 29:
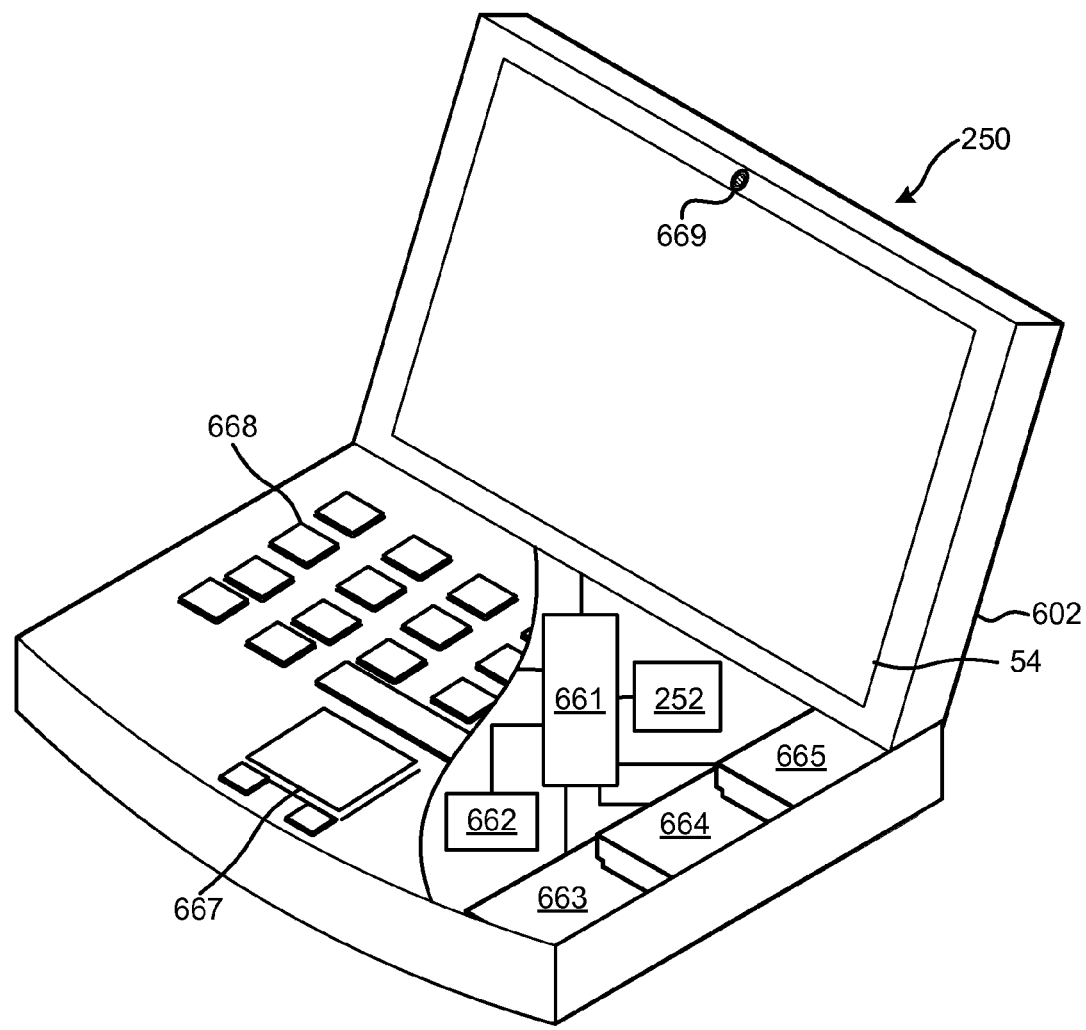
FIG. 29 is a component block diagram of a notebook computer suitable for use with the various embodiments.

The embodiments described above may be implemented on any of a variety of computing devices, such as a notebook computer 250 illustrated in FIG. 29. Such a notebook computer 250 typically includes a housing 602 that contains a processor 661 coupled to a wireless modem card 252. The computer 250 will also typically include volatile memory 662 and a large capacity nonvolatile memory, such as a hard disc drive 663 coupled to both the processor 661 and the wireless modem card 252. The computer 250 may also include a floppy disc drive 664 and a compact disc (CD) or DVD drive 665 coupled to the processor 661 and the wireless modem card 252. The computer housing 602 typically also includes a touchpad 667, keyboard 668, and the display 54 that are coupled to both the processor 661 and the wireless modem card 252. In some embodiments, the notebook computer 250 (or other computer) may include a video camera 669 that is coupled to both the processor 661 and the wireless modem card 252.

FIG. 29 also illustrates component configurations that may be implemented in embodiments in which the auxiliary processor is included within a CD or DVD drive 665 which will typically include a co-processor.

The various embodiments may be implemented by a computer processor 661 and a modem processor 20 within the wireless modem card 252 (or other component like the DVD drive 665) executing software instructions configured to implement one or more of the described methods. Such software instructions may be stored in memory 662, 663 as separate applications, or as compiled software implementing an aspect method. Further, the software instructions and databases may be stored on any form of tangible processor-readable memory, including: a random access memory 13, 662, hard disc memory 663, a floppy disk (readable in a floppy disc drive 664), a compact disc (readable in a CD drive 665), electrically erasable/programmable read only memory (EEPROM), read only memory (such as FLASH memory 13), and/or a memory module (not shown) plugged into the computer 250, such as an external memory chip or a USB-connectable external memory (e.g., a "flash drive") plugged into a USB network port (not shown in FIG. 29).

As mentioned above, in an embodiment, the auxiliary processor may be in the form of an MSM/MDM including within a small form package including a USB hub to form a portable modem device. FIG. 30 illustrates components that may be included within such a portable modem device 700. Specifically, a portable modem device 700 may include an MSM/MDM chipset 703 including an internal processor, a memory 702, such as a FLASH memory, coupled to the MSM/MDM chipset 703, an antenna 704 coupled to the MSM/MDM chipset 703, and a USB interface or hub circuit 705 coupled to the MSM/MDM chipset 703 and to a USB connector 706. The portable modem device 700 may further include a battery 708, which may be a rechargeable battery which can be recharged from power received via the USB connector 706 when the portable modem device 700 is connected to a computer USB port. The components of the portable modem device 700 may be incorporated within a housing 704 to enable the device to be rugged and easy to handle.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of operating a computer including a central processing unit (CPU) and an auxiliary processor, comprising:
    communicating operating state information from the CPU to the auxiliary processor, wherein the auxiliary processor is a processor within a wireless modem coupled to the CPU;
    configuring the auxiliary processor using the operating state information;
    shifting control of computer peripherals to the auxiliary processor;
    placing the CPU into a low power or deactivated state; and
    maintaining a communication link with a wireless network via the wireless modem while control of computer peripherals is shifted to the auxiliary processor,
    wherein the CPU and the auxiliary processor are configured to anticipate operating mode transitions.

2. The method of claim 1, wherein communicating operating state information comprises storing operating state information from the CPU into shared memory accessible by the CPU and the auxiliary processor.

3. The method of claim 1, wherein communicating operating state information comprises communicating the operating state information via a communication channel between the CPU and the auxiliary processor.

4. The method of claim 1, wherein communicating operating state information comprises storing a portion of the operating state information from the CPU into shared memory accessible by the CPU and the auxiliary processor and communicating a portion of the operating state information via a communication channel between the CPU and the auxiliary processor.

5. The method of claim 1, further comprising signaling the auxiliary processor to assume control of computer peripherals in response to the CPU receiving a signal selected from a button press, closing of a portion of the computer, a command included within a received electronic message, activation of a particular application, and a menu selection input received from a user.

6. The method of claim 1, further comprising:
    monitoring user interactions with the computer to determine whether current usage can be supported by the auxiliary processor; and
    automatically signaling the auxiliary processor to assume control of computer peripherals in response to determining that usage can be supported by the auxiliary processor.

7. The method of claim 6, further comprising generating a display prompting a user to indicate agreement to shift control to the auxiliary processor, wherein automatically signaling the auxiliary processor to assume control of computer peripherals occurs when a user input is received indicating agreement to proceed with a shift of control.

8. The method of claim 1, further comprising:
determining an application active on the CPU; and
activating a corresponding application on the auxiliary processor, the corresponding application accessing application data stored in memory by the application on the CPU.

9. The method of claim 8, wherein activating a corresponding application on the auxiliary processor is accomplished prior to the auxiliary processor assuming control of the computer peripherals.

10. The method of claim 1, further comprising synchronizing an operating state of the auxiliary processor with an operating state of the CPU.

11. The method of claim 1, further comprising:
signaling the CPU to activate;
communicating operating state information from the auxiliary processor to the CPU;
configuring the CPU using the communicated operating state information;
returning control of the computer peripherals to the CPU; and
relinquishing control of computer peripherals by the auxiliary processor.

12. The method of claim 11, wherein communicating operating state information comprises storing operating state information from the auxiliary processor into shared memory accessible by the CPU and the auxiliary processor.

13. The method of claim 11, wherein communicating operating state information comprises communicating the operating state information via a communication channel between the auxiliary processor and the CPU.

14. The method of claim 11, wherein communicating operating state information comprises storing a portion of the operating state information from the CPU into shared memory accessible by the CPU and the auxiliary processor and communicating a portion of the operating state information via a communication channel between the CPU and the auxiliary processor.

15. The method of claim 11, wherein signaling the CPU to activate is accomplished in response to the auxiliary processor receiving a signal selected from a button press, opening of a portion of the computer, a command included within a received electronic message, and a menu selection input received from a user.

16. The method of claim 11, further comprising:
monitoring user interactions with the computer to determine whether a user action cannot be supported by the auxiliary processor; and
automatically signaling the CPU to assume control of computer peripherals in response to determining that a user action cannot be supported by the auxiliary processor.

17. The method of claim 16, further comprising generating a display prompting a user to indicate agreement to shift control to the CPU, wherein automatically signaling the CPU to assume control of computer peripherals occurs when a user input is received indicating agreement to proceed with a shift of control.

18. The method of claim 16, further comprising:
displaying a document on a computer display; and
receiving a user edit command related to the document, wherein determining that a user action cannot be supported by the auxiliary processor comprises determining that the user edit command is not supported by an application operating.

19. The method of claim 1, further comprising:
maintaining a communication link with a wireless network via the wireless modem while control of computer peripherals is returned to the CPU.

20. The method of claim 1, further comprising:
receiving an electronic message via the maintained communication link;
processing the received electronic message to recognize an included application activation command; and
activating on the auxiliary processor an application identified in the received electronic message when the electronic message is recognized to include an application activation command.

21. The method of claim 1, wherein operating state information comprises:
overall system data;
application data; and
application context data.

22. The method of claim 1, wherein:
the auxiliary processor is a processor within a mobile service modem or mobile data modem (MSM/MDM); and
the MSM/MDM is packaged within a portable device comprising:
an antenna coupled to the MSM/MDM;
a battery coupled to the MSM/MDM; and
an interface connector coupled to the MSM/MDM and configured to couple the MSM/MDM to the CPU,
the method further comprising maintaining a communication link with a wireless network via the MSM/MDM when the portable modem device is removed from the computer.

23. The method of claim 22, further comprising:
receiving messages via the maintained communication link while the portable modem device is removed from the computer; and
making the received messages available to the computer when the portable modem device is plugged into the computer.

24. The method of claim 22, wherein the MSM/MDM is packaged within a cellular telephone.

25. The method of claim 22, wherein the interface connector is a universal serial bus (USB) hub circuit coupled to the MSM/MDM and a USB connector coupled to the USB hub circuit.

26. A computer, comprising:
a memory;
a central processor unit (CPU) coupled to the memory;
an auxiliary processor coupled to the memory, wherein the auxiliary processor is a processor within a wireless modem coupled to the CPU;
wherein the CPU and the auxiliary processor are configured with processor-executable instructions to perform steps comprising:
communicating operating state information from the CPU to the auxiliary processor;
configuring the auxiliary processor using the operating state information;
shifting control of computer peripherals to the auxiliary processor;
placing the CPU into a low power or deactivated state; and maintaining a communication link with a wireless network via the wireless modem while control of computer peripherals is shifted to the auxiliary processor, wherein the CPU and the auxiliary processor are configured to anticipate operating mode transitions.

27. The computer of claim 26, wherein the CPU and the auxiliary processor are configured with processor-executable instructions such that communicating operating state information comprises storing operating state information from the CPU into shared memory accessible by the CPU and the auxiliary processor.

28. The computer of claim 26, wherein the CPU and the auxiliary processor are configured with processor-executable instructions such that communicating operating state information comprises communicating the operating state information via a communication channel between the CPU and the auxiliary processor.

29. The computer of claim 26, wherein the CPU and the auxiliary processor are configured with processor-executable instructions such that communicating operating state information comprises:
   storing a portion of the operating state information from the CPU into shared memory accessible by the CPU and the auxiliary processor; and
   communicating a portion of the operating state information via a communication channel between the CPU and the auxiliary processor.

30. The computer of claim 26, wherein the CPU and the auxiliary processor are configured with processor-executable instructions to perform steps further comprising signaling the auxiliary processor to assume control of computer peripherals in response to the CPU receiving a signal selected from a button press, closing of a portion of the computer, a command included within a received electronic message, activation of a particular application, and a menu selection input received from a user.

31. The computer of claim 26, wherein the CPU and the auxiliary processor are configured with processor-executable instructions to perform steps further comprising:
   monitoring user interactions with the computer to determine whether current usage can be supported by the auxiliary processor; and
   automatically signaling the auxiliary processor to assume control of computer peripherals in response to determining that usage can be supported by the auxiliary processor.

32. The computer of claim 31, wherein the CPU and the auxiliary processor are configured with processor-executable instructions to perform steps further comprising generating a display prompting a user to indicate agreement to shift control to the auxiliary processor, wherein automatically signaling the auxiliary processor to assume control of computer peripherals occurs when a user input is received indicating agreement to proceed with a shift of control.

33. The computer of claim 26, wherein the CPU and the auxiliary processor are configured with processor-executable instructions to perform steps further comprising:
   determining an application active on the CPU; and
   activating a corresponding application on the auxiliary processor, the corresponding application accessing application data stored in memory by the application on the CPU.

34. The computer of claim 33, wherein the CPU and the auxiliary processor are configured with processor-executable instructions such that activating a corresponding application on the auxiliary processor is accomplished prior to the auxiliary processor assuming control of the computer peripherals.

35. The computer of claim 26, wherein the CPU and the auxiliary processor are configured with processor-executable instructions to perform steps further comprising synchronizing an operating state of the auxiliary processor with an operating state of the CPU.

36. The computer of claim 26, wherein the CPU and the auxiliary processor are configured with processor-executable instructions to perform steps further comprising:
   signaling the CPU to activate;
   communicating operating state information from the auxiliary processor to the CPU;
   configuring the CPU using the communicated operating state information;
   returning control of the computer peripherals to the CPU; and
   relinquishing control of computer peripherals by the auxiliary processor.

37. The computer of claim 36, wherein the CPU and the auxiliary processor are configured with processor-executable instructions such that communicating operating state information comprises storing operating state information from the auxiliary processor into shared memory accessible by the CPU and the auxiliary processor.

38. The computer of claim 36, wherein the CPU and the auxiliary processor are configured with processor-executable instructions such that communicating operating state information comprises communicating the operating state information via a communication channel between the auxiliary processor and the CPU.

39. The computer of claim 36, wherein the CPU and the auxiliary processor are configured with processor-executable instructions such that communicating operating state information comprises:
   storing a portion of the operating state information from the CPU into shared memory accessible by the CPU and the auxiliary processor; and
   communicating a portion of the operating state information via a communication channel between the CPU and the auxiliary processor.

40. The computer of claim 36, wherein the CPU and the auxiliary processor are configured with processor-executable instructions such that signaling the CPU to activate is accomplished in response to the auxiliary processor receiving a signal selected from a button press, opening of a portion of the computer, a command included within a received electronic message, and a menu selection input received from a user.

41. The computer of claim 36, wherein the CPU and the auxiliary processor are configured with processor-executable instructions to perform steps further comprising:
   monitoring user interactions with the computer to determine whether a user action cannot be supported by the auxiliary processor; and
   automatically signaling the CPU to assume control of computer peripherals in response to determining that a user action cannot be supported by the auxiliary processor.

42. The computer of claim 41, wherein the CPU and the auxiliary processor are configured with processor-executable instructions to perform steps further comprising generating a display prompting a user to indicate agreement to shift control to the CPU, wherein automatically signaling the CPU to assume control of computer peripherals occurs when a user input is received indicating agreement to proceed with a shift of control.

43. The computer of claim 41, wherein the CPU and the auxiliary processor are configured with processor-executable instructions to perform steps further comprising:
  displaying a document on a computer display; and
  receiving a user edit command related to the document,
  wherein determining that a user action cannot be supported by the auxiliary processor comprises determining that the user edit command is not supported by an application operating.

44. The computer of claim 26, wherein the auxiliary processor is configured with processor-executable instructions to perform steps further comprising:
  maintaining a communication link with a wireless network via the wireless modem while control of computer peripherals is returned to the CPU.

45. The computer of claim 26, wherein the auxiliary processor is configured with processor-executable instructions to perform steps further comprising:
  receiving an electronic message via the maintained communication link;
  processing the received electronic message to recognize an included application activation command; and
  activating on the auxiliary processor an application identified in the received electronic message when the electronic message is recognized to include an application activation command.

46. The computer of claim 26, wherein operating state information comprises:
  overall system data;
  application data; and
  application context data.

47. The computer of claim 26, wherein the auxiliary processor is a processor within an external component coupled to the computer via a cable.

48. The computer of claim 26, wherein:
  the auxiliary processor is a processor within a mobile service modem or mobile data modem (MSM/MDM); and
  the MSM/MDM is packaged within a portable device comprising:
    an antenna coupled to the MSM/MDM;
    a battery coupled to the MSM/MDM; and
    an interface connector coupled to the MSM/MDM and configured to couple the MSM/MDM to the CPU,
  wherein the auxiliary processor is configured with processor-executable instructions to perform steps further comprising maintaining a communication link with a wireless network via the MSM/MDM when the portable modem device is removed from the computer.

49. The computer of claim 48, wherein the auxiliary processor is configured with processor-executable instructions to perform steps further comprising:
  receiving messages via the maintained communication link while the portable modem device is removed from the computer; and
  making the received messages available to the computer when the portable modem device is plugged back into the computer.

50. The computer of claim 48, wherein the MSM/MDM is packaged within a cellular telephone.

51. The computer of claim 48, wherein the interface connector is a universal serial bus (USB) hub circuit coupled to the MSM/MDM and a USB connector coupled to the USB hub circuit.

52. A computer, comprising:
  a central processor unit (CPU);
  an auxiliary processor, wherein the auxiliary processor is a processor within a wireless modem coupled to the computer;
  means for communicating operating state information from the CPU to the auxiliary processor;
  means for configuring the auxiliary processor using the operating state information;
  means for shifting control of computer peripherals to the auxiliary processor;
  means for placing the CPU into a low power or deactivated state;
  means for maintaining a communication link with a wireless network via the wireless modem while control of computer peripherals is shifted to the auxiliary processor; and
  means for anticipating operating mode transitions.

53. The computer of claim 52, wherein means for communicating operating state information comprises means for storing operating state information from the CPU into shared memory accessible by the CPU and the auxiliary processor.

54. The computer of claim 52, wherein means for communicating operating state information comprises means for communicating the operating state information via a communication channel between the CPU and the auxiliary processor.

55. The computer of claim 52, wherein means for communicating operating state information comprises:
  means for storing a portion of the operating state information from the CPU into shared memory accessible by the CPU and the auxiliary processor; and
  means for communicating a portion of the operating state information via a communication channel between the CPU and the auxiliary processor.

56. The computer of claim 52, further comprising:
  means for monitoring user interactions with the computer to determine whether current usage can be supported by the auxiliary processor; and
  means for automatically signaling the auxiliary processor to assume control of computer peripherals in response to determining that usage can be supported by the auxiliary processor.

57. The computer of claim 56, further comprising means for generating a display prompting a user to indicate agreement to shift control to the auxiliary processor, wherein means for automatically signaling the auxiliary processor to assume control of computer peripherals comprises means for automatically signaling the auxiliary processor when a user input is received indicating agreement to proceed with a shift of control.

58. The computer of claim 52, further comprising:
  means for determining an application active on the CPU; and
  means for activating a corresponding application on the auxiliary processor, the corresponding application accessing application data stored in memory by the application on the CPU.

59. The computer of claim 58, wherein means for activating a corresponding application on the auxiliary processor comprises means for activating the corresponding application prior to the auxiliary processor assuming control of the computer peripherals.

60. The computer of claim 52, further comprising means for synchronizing an operating state of the auxiliary processor with an operating state of the CPU.

61. The computer of claim 52, further comprising:
means for signaling the CPU to activate;
means for communicating operating state information from the auxiliary processor to the CPU;
means for configuring the CPU using the communicated operating state information;
means for returning control of the computer peripherals to the CPU; and
means for relinquishing control of computer peripherals by the auxiliary processor.

62. The computer of claim 61, wherein means for communicating operating state information comprises means for storing operating state information from the auxiliary processor into shared memory accessible by the CPU and the auxiliary processor.

63. The computer of claim 61, wherein means for communicating operating state information comprises means for communicating the operating state information via a communication channel between the auxiliary processor and the CPU.

64. The computer of claim 61, wherein means for communicating operating state information comprises:
means for storing a portion of the operating state information from the CPU into shared memory accessible by the CPU and the auxiliary processor; and
means for communicating a portion of the operating state information via a communication channel between the CPU and the auxiliary processor.

65. The computer of claim 61, wherein means for signaling the CPU to activate comprises means for signaling in response to the auxiliary processor receiving a signal selected from a button press, opening of a portion of the computer, a command included within a received electronic message, and a menu selection input received from a user.

66. The computer of claim 61, further comprising:
means for monitoring user interactions with the computer to determine whether a user action cannot be supported by the auxiliary processor; and
means for automatically signaling the CPU to assume control of computer peripherals in response to determining that a user action cannot be supported by the auxiliary processor.

67. The computer of claim 66, further comprising means for generating a display prompting a user to indicate agreement to shift control to the CPU,
wherein means for automatically signaling the CPU to assume control of computer peripherals comprises means for signaling the CPU to assume control of the computer peripherals when a user input is received indicating agreement to proceed with a shift of control.

68. The computer of claim 66, wherein the CPU and the auxiliary processor are configured with processor-executable instructions to perform steps further comprising:
displaying a document on a computer display; and
receiving a user edit command related to the document,
wherein determining that a user action cannot be supported by the auxiliary processor comprises determining that the user edit command is not supported by an application operating.

69. The computer of claim 52, further comprising:
means for maintaining a communication link with a wireless network via the wireless modem while control of computer peripherals is returned to the CPU.

70. The computer of claim 52, further comprising:
means for receiving an electronic message via the maintained communication link;
means for processing the received electronic message to recognize an included application activation command; and
means for activating on the auxiliary processor an application identified in the received electronic message when the electronic message is recognized to include an application activation command.

71. The computer of claim 52, wherein operating state information comprises:
overall system data;
application data; and
application context data.

72. The computer of claim 59, wherein the auxiliary processor is a processor within an external component coupled to the computer via a cable.

73. The computer of claim 52, wherein:
the auxiliary processor is a processor within a mobile service modem or mobile data modem (MSM/MDM); and
the MSM/MDM is packaged within a portable device comprising:
an antenna coupled to the MSM/MDM;
means for powering the MSM/MDM; and
means for connecting the MSM/MDM to the CPU,
wherein the auxiliary processor further comprises means for maintaining a communication link with a wireless network via the MSM/MDM when the portable modem device is removed from the computer.

74. The computer of claim 73, further comprising:
means for receiving messages via the maintained communication link while the portable modem device is removed from the computer; and
means for making the received messages available to the computer when the portable modem device is plugged back into the computer.

75. The computer of claim 73, wherein the MSM/MDM is packaged within a cellular telephone.

76. The computer of claim 73, means for connecting the MSM/MDM to the CPU comprises a universal serial bus (USB) hub circuit coupled to the MSM/MDM and a USB connector coupled to the USB hub circuit.

77. A non-transitory computer-readable storage medium having stored thereon processor-executable instructions configured to cause a processor to perform operations, comprising:
communicating operating state information from a central processor unit (CPU) to an auxiliary processor, wherein the auxiliary processor is a processor within a wireless modem coupled to the CPU;
configuring the auxiliary processor using the operating state information;
shifting control of computer peripherals, including a primary user interface display, to the auxiliary processor;
placing the CPU into a low power or deactivated state; and
maintaining a communication link with a wireless network via the wireless modem while control of computer peripherals is shifted to the auxiliary processor,
wherein the CPU and the auxiliary processor are configured to anticipate operating mode transitions.

78. The non-transitory computer readable medium of claim 77 wherein the stored processor-executable instructions are configured to cause a processor to perform operations further comprising:
storing operating state information from the CPU into shared memory accessible by the CPU and the auxiliary processor.

79. The non-transitory computer readable medium of claim 77 wherein the stored processor-executable instructions are configured to cause a processor to perform operations further comprising:
communicating the operating state information via a communication channel between the CPU and the auxiliary processor.

80. The non-transitory computer readable medium of claim 77 wherein the stored processor-executable instructions are configured to cause a processor to perform operations further comprising:
storing a portion of the operating state information from the CPU into shared memory accessible by the CPU and the auxiliary processor; and
communicating a portion of the operating state information via a communication channel between the CPU and the auxiliary processor.

81. The non-transitory computer readable medium of claim 77 wherein the stored processor-executable instructions are configured to cause a processor to perform operations further comprising:
signaling the auxiliary processor to assume control of computer peripherals in response to the CPU receiving a signal selected from a button press, closing of a portion of the computer, a command included within a received electronic message, activation of a particular application, and a menu selection input received from a user.

82. The non-transitory computer readable medium of claim 77 wherein the stored processor-executable instructions are configured to cause a processor to perform operations further comprising:
monitoring user interactions with the computer to determine whether current usage can be supported by the auxiliary processor; and
automatically signaling the auxiliary processor to assume control of computer peripherals in response to determining that usage can be supported by the auxiliary processor.

83. The non-transitory computer readable medium of claim 82, wherein the stored processor-executable instructions are configured to cause a processor to perform operations further comprising:
generating a display prompting a user to indicate agreement to shift control to the auxiliary processor,
wherein automatically signaling the auxiliary processor to assume control of computer peripherals is executed when a user input is received indicating agreement to proceed with a shift of control.

84. The non-transitory computer readable medium of claim 77, wherein the stored processor-executable instructions are configured to cause a processor to perform operations further comprising:
determining an application active on the CPU; and
activating a corresponding application on the auxiliary processor, the corresponding application accessing application data stored in memory by the application on the CPU.

85. The non-transitory computer readable medium of claim 84, wherein processor-executable instruction configured to cause the processor to activate a corresponding application on the auxiliary processor is executed prior to the auxiliary processor assuming control of the computer peripherals.

86. The non-transitory computer readable medium of claim 77 wherein the stored processor-executable instructions are configured to cause a processor to perform operations further comprising:
synchronizing an operating state of the auxiliary processor with an operating state of the CPU.

87. The non-transitory computer readable medium of claim 77 wherein the stored processor-executable instructions are configured to cause a processor to perform operations further comprising:
signaling the CPU to activate;
communicating operating state information from the auxiliary processor to the CPU;
configuring the CPU using the communicated operating state information;
returning control of the computer peripherals to the CPU; and
relinquishing control of computer peripherals by the auxiliary processor.

88. The non-transitory computer readable medium of claim 87, wherein the stored processor-executable instructions are configured to cause a processor to perform operations further comprising:
storing operating state information from the auxiliary processor into shared memory accessible by the CPU and the auxiliary processor.

89. The non-transitory computer readable medium of claim 87, wherein the stored processor-executable instructions are configured to cause a processor to perform operations further comprising:
communicating the operating state information via a communication channel between the auxiliary processor and the CPU.

90. The non-transitory computer readable medium of claim 87, wherein the stored processor-executable instructions are configured to cause a processor to perform operations further comprising:
storing a portion of the operating state information from the CPU into shared memory accessible by the CPU and the auxiliary processor; and
communicating a portion of the operating state information via a communication channel between the CPU and the auxiliary processor.

91. The non-transitory computer readable medium of claim 87, wherein the processor-executable instruction configured to cause the processor to perform the operation of signaling the CPU to activate is executed in response to the auxiliary processor receiving a signal selected from a button press, opening of a portion of the computer, a command included within a received electronic message, and a menu selection input received from a user.

92. The non-transitory computer readable medium of claim 87, wherein the stored processor-executable instructions are configured to cause a processor to perform operations further comprising:
monitoring user interactions with the computer to determine whether a user action cannot be supported by the auxiliary processor; and
automatically signaling the CPU to assume control of computer peripherals in response to determining that a user action cannot be supported by the auxiliary processor.

93. The non-transitory computer readable medium of claim 92, wherein the stored processor-executable instructions are configured to cause a processor to perform operations further comprising:
generating a display prompting a user to indicate agreement to shift control to the CPU,
wherein the processor-executable instruction configured to cause the processor to perform the operation of automatically signaling the CPU to assume control of computer peripherals is executed when a user input is received indicating agreement to proceed with a shift of control.

94. The non-transitory computer readable medium of claim 92, wherein the stored processor-executable instructions are configured to cause a processor to perform operations further comprising:
displaying a document on the primary user interface display; and
receiving a user edit command related to the document,
wherein the processor-executable instruction configured to cause the processor to perform the operation of processor-executable instruction configured to cause the processor to perform the operation of determining that a user action cannot be supported by the auxiliary processor comprises a processor-executable instruction configured to cause the processor to perform the operation of determining that the user edit command is not supported by an application operating.

95. The non-transitory computer readable medium of claim 77, wherein the stored processor-executable instructions are configured to cause a processor to perform operations further comprising:
maintaining a communication link with a wireless network via the wireless modem while control of computer peripherals is returned to the CPU.

96. The non-transitory computer readable medium of claim 77, wherein the stored processor-executable instructions are configured to cause a processor to perform operations further comprising:
receiving an electronic message via the maintained communication link;
processing the received electronic message to recognize an included application activation command; and
activating on the auxiliary processor an application identified in the received electronic message when the electronic message is recognized to include an application activation command.

97. The non-transitory computer readable medium of claim 77, wherein operating state information comprises:
overall system data;
application data; and
application context data.

98. The non-transitory computer readable medium of claim 77, wherein the stored processor-executable instructions are configured to cause a processor to perform operations further comprising:
maintaining a communication link with a wireless network via a wireless modem when the wireless modem is removed from the computer.

99. The non-transitory computer readable medium of claim 98, wherein the stored processor-executable instructions are configured to cause a processor to perform operations further comprising:
receiving messages via the maintained communication link while the wireless modem is removed from the computer; and
making the received messages available to the computer when the wireless modem is plugged into the computer.

* * * * *